(12) United States Patent  
Yokote et al.

(10) Patent No.: US 11,572,120 B2  
(45) Date of Patent: Feb. 7, 2023

(54) SUPPORT DEVICE FOR COMPONENT GRIPPING DEVICE AND VEHICLE DOOR DETACHING DEVICE

(71) Applicant: DAIFUKU CO., LTD., Osaka (JP)

(72) Inventors: Hideyuki Yokote, Miyawaka (JP); Hiroaki Terasawa, Tokyo (JP); Shinji Marui, Miyawaka (JP); Kozo Hasegawa, Tokyo (JP)

(73) Assignee: DAIFUKU CO., LTD., Osaka (JP)

( * ) Notice: Subject to any disclaimer, the term of this patent is extended or adjusted under 35 U.S.C. 154(b) by 0 days.

(21) Appl. No.: 17/429,156

(22) PCT Filed: Feb. 4, 2020

(86) PCT No.: PCT/JP2020/004008  
§ 371 (c)(1),  
(2) Date: Aug. 6, 2021

(87) PCT Pub. No.: WO2020/170787  
PCT Pub. Date: Aug. 27, 2020

(65) Prior Publication Data  
US 2022/0033020 A1 Feb. 3, 2022

(30) Foreign Application Priority Data  
Feb. 19, 2019 (JP) .............................. JP2019-027467

(51) Int. Cl.  
*B62D 65/06* (2006.01)  
*B23P 19/04* (2006.01)  
(Continued)

(52) U.S. Cl.  
CPC .............. *B62D 65/06* (2013.01); *B23P 19/04* (2013.01); *B23P 21/002* (2013.01); *B25J 17/0283* (2013.01)

(58) Field of Classification Search  
CPC ....... B62D 65/06; B62D 65/024; B23P 19/04; B23P 21/002; B25J 15/0061; B25J 17/0283  
See application file for complete search history.

(56) References Cited

U.S. PATENT DOCUMENTS 8,950,050 B2 * 2/2015 Asamizu ................ B62D 65/06  
29/879  
2012/0163948 A1 * 6/2012 Asamizu ................ B25J 9/0087  
414/590

FOREIGN PATENT DOCUMENTS

JP 8-257970 A 10/1996  
JP 8-257971 A 10/1996  
(Continued)

OTHER PUBLICATIONS

International Search Report dated Mar. 24, 2020 for PCT/JP2020/004008 and English translation.

(Continued)

*Primary Examiner* — Bayan Salone  
(74) *Attorney, Agent, or Firm* — Lucas & Mercanti, LLP

(57) ABSTRACT

A support device supports a component gripping device including an engagement part to be engaged with a predetermined component. The component gripping device grips the component in a state in which the engagement part is caused to be engaged with the component. The support device contains a support body part, a first shift mechanism part, a second shift mechanism part, a third shift mechanism part, a first rotation mechanism part, a second rotation mechanism part, and a third rotation mechanism part.

8 Claims, 59 Drawing Sheets

(51) Int. Cl.
      *B23P 21/00*      (2006.01)
      *B25J 17/02*      (2006.01)

(56) References Cited

FOREIGN PATENT DOCUMENTS

| | | | | | |
|---|---|---|---|---|---|
| JP | 08257970 | A | * | 10/1996 | |
| JP | 08257971 | A | * | 10/1996 | |
| JP | 11-300545 | A | | 11/1999 | |
| JP | 11300545 | A | * | 11/1999 | |
| JP | 2006142416 | A | * | 6/2006 | |
| JP | 2006142416 | A | | 6/2006 | |
| JP | 2008137107 | A | * | 6/2008 | |
| JP | 2008137107 | A | | 6/2008 | |
| JP | 2012140023 | A | * | 7/2012 | ............ B25J 9/0087 |
| JP | 2012140023 | A | | 7/2012 | |

OTHER PUBLICATIONS

Office Action dated Aug. 16, 2022 for the corresponding Japanese Application No. 2019-027467, with English translation.

\* cited by examiner (a)

(b)

SUPPORT DEVICE FOR COMPONENT GRIPPING DEVICE AND VEHICLE DOOR DETACHING DEVICE

CROSS REFERENCE TO RELATED APPLICATION

This Application is a 371 of PCT/JP2020/004008 filed on Feb. 4, 2020 which, in turn, claimed the priority of Japanese Patent Application No. 2019-027467 filed on Feb. 19, 2019, both applications are incorporated herein by reference.

TECHNICAL FIELD

The present invention relates to a support device for a component gripping device that is for supporting a component gripping device attached to a robot when a component such as a car door, for example, is detached, and to a vehicle door detaching device.

BACKGROUND ART

In a process of manufacturing a car, a painting process is performed in a state in which doors are attached to a vehicle body, and a door detaching process of detaching the doors once from the vehicle body is then carried out to perform assembly and the like of components onto the vehicle body and the doors. In regard to the door detaching process, there is a technique of gripping a door attached to a vehicle body and causing the door detached from the vehicle body to move to a predetermined location through robot operations in the related art (see Patent Literature 1, for example).

Patent Literature 1 discloses a door detaching system including a dual-armed robot provided with a first arm and a second arm. Each of the first arm and the second arm has, at a distal end part thereof, a gripping jig that serves as a component gripping device for gripping a door.

According to the door detaching system in Patent Literature 1, a door is opened by one of the arms, a door gripping pad included in the gripping jig of each arm is engaged with an opening part provided in an inner panel of the door, and the door is thereby gripped by the two arms of the dual-armed robot. Thereafter, fastening of a door bolt to a hinge that supports the door at the vehicle body is released, and the door gripped by the dual-armed robot is caused to move through a cooperative operation of the two arms and is carried to a predetermined location.

CITATION LIST

Patent Literature

Patent Literature 1: Japanese Patent Laid-Open No. 2012-140023

SUMMARY OF INVENTION

Technical Problem

Incidentally, a posture of a door may three-dimensionally change depending on an opening angle of the door as a vehicle property of a car. Examples of indicators of a change in posture of a door include the amount of movement of the door in a rotating direction (a surface fall-down direction in which the door falls down on a left or right side) in a rear view of a vehicle body, the amount of movement of the door in the rotating direction (surface rotating direction) in a side view of the vehicle body, and the like with reference to a state in which the door is attached to the vehicle body.

Also, in a case in which a door is automatically opened by a robot, it is difficult to constantly set an opening angle of the door to the same angle because there are variations in posture of the vehicle body on a transport line, for example. In other words, a door in an opened state is a target to be gripped by a component gripping device supported by a robot in a door opening operation of the robot, and it is difficult to constantly keep the same posture of the door in the opened state due to variations in posture of the vehicle body. How the posture of the door changes depending on the opening angle of the door in this manner also differs between a front door and a rear door.

In such a configuration in which a robot performs a door opening operation, the posture of the door varies depending on the opening angle of the door, and the position of an engaged part of the door that is engaged with an engagement part of the component gripping device on the transport line of the vehicle body thus varies. Therefore, there may be a case in which the position of the engaged part on the door side deviates relative to the engagement part of the component gripping device that is caused to move to a predetermined position through a robot operation when the robot that performs a predetermined operation on the basis of a predetermined program created through teaching, for example, grips the door.

The deviation between the positions of the engagement part of the component gripping device on the robot side and of the engaged part on the door side may cause the following failure. In other words, there is a probability that the engagement part or the like of the component gripping device interferes with the door and the door is damaged. Also, the component gripping device does not grip the door normally, and a state in which an unintended load acts on the door in a door gripped state is achieved. In such a state, there is a probability that the door interferes with components (for example, a fender and a pillar) in the surroundings thereof with off-loading caused by the fastening of the bolt to the hinge being released, for example, and this has adverse influences such as scratching on these components.

The present invention was made in view of the problem as described above, and an object thereof is to provide a support device for a component gripping device and a vehicle door detaching device that enables a component gripping device to accurately grip a component such as a car door regardless of variations in posture of the component when the component is automatically gripped through a robot operation or the like.

Solution to Problem

A support device for a component gripping device according to the present invention is a support device for a component gripping device that is for supporting a component gripping device including an engagement part to be engaged with a predetermined component, the component gripping device gripping the component in a state in which the engagement part is caused to be engaged with the component, the support device for a component gripping device including: a support body part that supports the component gripping device; a first shift mechanism part that supports the support body part such that the support body part is movable in a first direction; a second shift mechanism part that supports the support body part such that the support body part is movable in a second direction that perpendicularly intersects the first direction; a third shift mechanism part that supports the support body part such that the support body part is movable in a third direction that perpendicularly intersects the first direction and the second direction; a first rotation mechanism part that supports the support body part such that the support body part is rotatable with a center axis direction in the first direction; a second rotation mechanism part that supports the support body part such that the support body part is rotatable with a center axis direction in the second direction; and a third rotation mechanism part that supports the support body part such that the support body part is rotatable with a center axis direction in the third direction.

Also, another aspect of the support device for a component gripping device according to the present invention is the support device for a component gripping device in which each of the first shift mechanism part, the second shift mechanism part, and the third shift mechanism part includes a shift-lock mechanism that causes the support body part to stop moving in a direction in which each of the first shift mechanism part, the second shift mechanism part, and the third shift mechanism part movably supports the support body part, and each of the first rotation mechanism part, the second rotation mechanism part, and the third rotation mechanism part includes a rotation locking mechanism that causes the support body part to stop rotating in a rotational direction in which each of the first rotation mechanism part, the second rotation mechanism part, and the third rotation mechanism part rotatably supports the support body part.

Also, another aspect of the support device for a component gripping device according to the present invention is the support device for a component gripping device in which the third direction is an up-down direction, and the second rotation mechanism part includes a cylinder mechanism provided to have an extension/contraction direction which is an inclined direction inclined relative to the third direction, and the support body part rotatably supported by a predetermined rotational shaft along the second direction is floating-supported for rotation about the rotational shaft through an extension/contraction operation of the cylinder mechanism.

A vehicle door detaching device according to the present invention is a vehicle door detaching device that is for detaching a door attached to a vehicle body, the vehicle door detaching device including: a component gripping device including an engagement part to be engaged with the door and a gripping part that is for gripping the door, the component gripping device gripping the door with the gripping part in a state in which the engagement part is caused to be engaged with the door; and a support device for a component gripping device that is for supporting the component gripping device, in which the support device for a component gripping device includes a support body part that supports the component gripping device, a first shift mechanism part that supports the support body part such that the support body part is movable in a first direction, a second shift mechanism part that supports the support body part such that the support body part is movable in a second direction that perpendicularly intersects the first direction, a third shift mechanism part that supports the support body part such that the support body part is movable in a third direction that perpendicularly intersects the first direction and the second direction, a first rotation mechanism part that supports the support body part such that the support body part is rotatable with a center axis direction in the first direction, a second rotation mechanism part that supports the support body part such that the support body part is rotatable with a center axis direction in the second direction, and a third rotation mechanism part that supports the support body part such that the support body part is rotatable with a center axis direction in the third direction.

Also, another aspect of the vehicle door detaching device according to the present invention is the vehicle door detaching device further including: a fastening release unit that includes an attachment base that is to be attached to the support device for a component gripping device, and a fastening release device that is movably supported at the attachment base, is engaged with a fastening component for supporting the door at the vehicle body, and releases fastening of the fastening component.

In addition, another aspect of the vehicle door detaching device according to the present invention is the vehicle door detaching device further including: a door opening device that includes a locking part for the door and opens the door by moving along with the support device for a component gripping device in a state in which the locking part is caused to be locked at a predetermined portion of the door.

Advantageous Effect of Invention

According to the present invention, accurate gripping of a component such as a car door can be achieved by a component gripping device regardless of variations in posture of the component when the component is automatically gripped through a robot operation or the like.

DESCRIPTION OF EMBODIMENTS

According to the present invention, a configuration of a support device that supports a component gripping device that grips a door attached to a vehicle body, for example, as a component in a vehicle door detaching device for detaching the door is contrived to enable three-dimensional floating-support of the component gripping device. The present invention thus enables the component gripping device to accurately grip the component regardless of variations in posture of the component when the component is automatically gripped through a robot operation or the like. Hereinafter, an embodiment of the present invention will be described.

Figure 1:
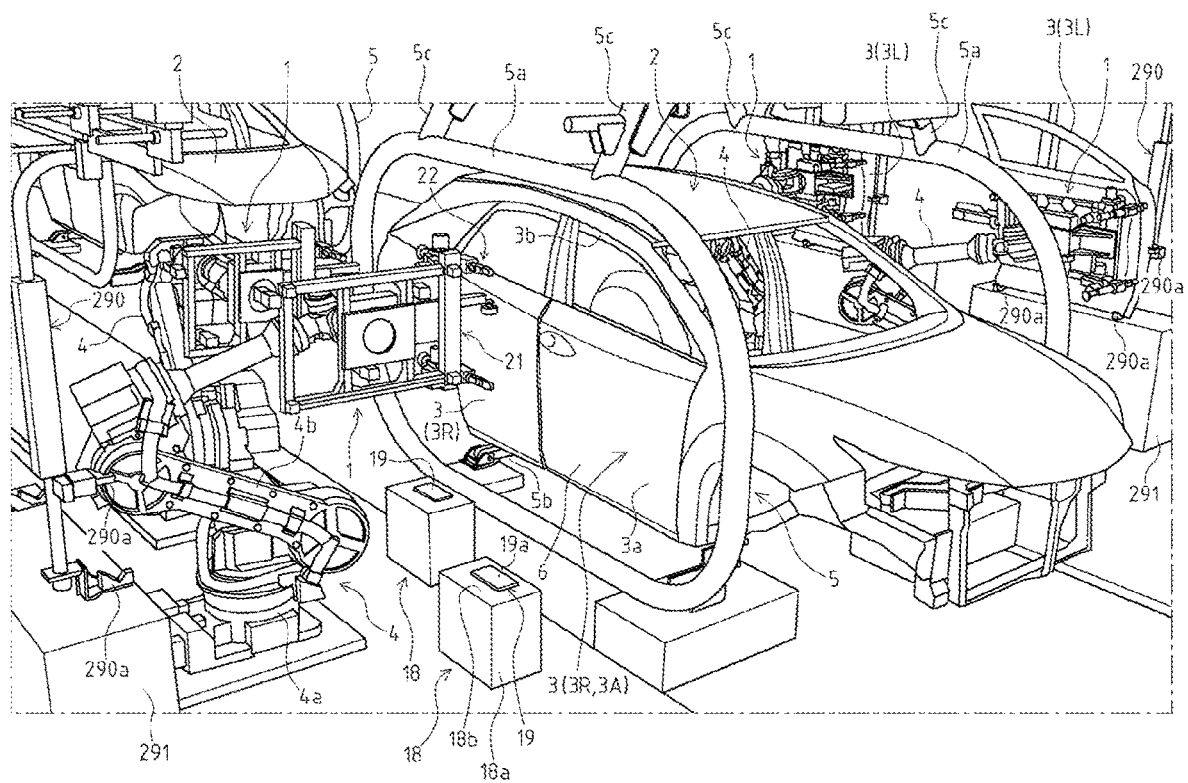
FIG. 1 is a diagram illustrating an application example of a support device for a component gripping device and a vehicle door detaching device according to an embodiment of the present invention.
Figure 2:
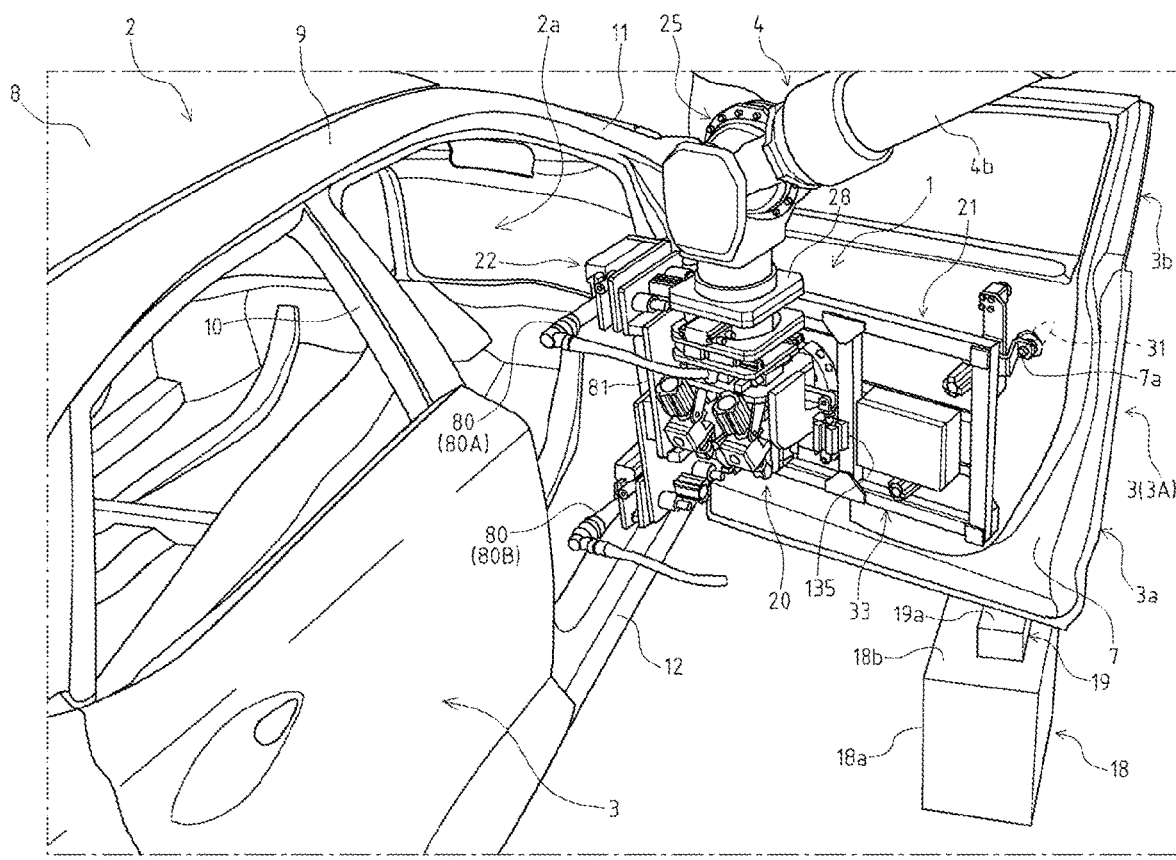
FIG. 2 is a diagram illustrating a state in which the vehicle door detaching device is gripping a door according to the embodiment of the present invention.

The present embodiment will be described on the basis of an exemplary case in which a target component to be gripped by a component gripping device supported by a support device for a component gripping device is a car door (side door). In other words, a floating unit 20 that serves as a support device for a component gripping device according to the present embodiment is a support device that is for supporting a material handling device 21 that serves as a component gripping device that grips a door 3 that is a predetermined component as illustrated in FIGS. 1 and 2. Also, the present embodiment will be described on the basis of an exemplary case in which the floating unit 20 is applied to a vehicle door detaching device (hereinafter, referred to as a "door detaching device") 1 that detaches a car door 3.

As illustrated in FIGS. 1 and 2, the door detaching device 1 according to the present invention is a device for detaching the door 3 attached to a vehicle body 2 of the car. In a process of manufacturing the car, a painting process is performed in a state in which the door 3 is attached to the vehicle body 2, and a door detaching process of detaching the door 3 once from the vehicle body 2 is then carried out to perform assembly and the like of components onto each of the vehicle body 2 and the door 3. FIG. 1 illustrates an example of equipment with which the door detaching process is performed.

As illustrated in FIG. 1, the door detaching device 1 is attached to a robot 4 and is operated to move through operations of the robot 4. In the door detaching process, the door detaching device 1 that has been caused to approach the door 3 through an operation of the robot 4 grips the door 3 and detaches the door 3 from the vehicle body 2, and the door 3 detached from the vehicle body 2 is caused to move to a predetermined location through an operation of the robot 4. A door detaching system is configured with the configuration including the door detaching device 1 and the robot 4.

In the example illustrated in FIG. 1, a device configuration for detaching the door 3 from the vehicle body 2 is provided for each of four front, rear, left, and right doors 3 attached to the vehicle body 2. In other words, four robots 4 with the door detaching devices 1 attached thereto are provided to correspond to the number of doors 3 included in one vehicle body 2. In FIG. 1, the two doors 3 (3R) on the right side of the vehicle body 2 are in a state before the doors 3 are detached from the vehicle body 2, and the two doors 3 (3L) on the left side of the vehicle body 2 are in a state after the doors 3 are detached from the vehicle body 2. Since the device configurations for detaching the doors 3 are a common configuration except for that the device configurations are symmetric in the left-right direction, the device configuration provided for the door 3 (3A) that is a front door on the right side from among the four doors 3 attached to the vehicle body 2 will be described as an example in the following description.

On a manufacturing line on which the door detaching process is performed, the vehicle body 2 is transported in a predetermined direction by a vehicle body transport device. As illustrated in FIG. 1, the vehicle body transport device transports the vehicle body 2 in a state in which the vehicle body 2 is supported with transport hangers 5 suspended from rails disposed in the transport direction of the vehicle body 2, which are not illustrated, via wheels or the like.

The transport hangers 5 have side frames 5a with a substantially rectangular frame shape, support frames 5b provided inside lower end parts of the left and right side frames 5a, and upper frames 5c provided above the side frames 5a. The vehicle body 2 is placed and supported on the support frames 5b between the left and right side frames 5a relative to the transport hangers 5. The vehicle body transport device causes the transport hangers 5 supporting the vehicle body 2 to move from an upstream side to a downstream side of a transport path of the vehicle body 2 and causes the transport hangers 5 to temporarily stop at a predetermined door detaching position where the door 3 is detached. Note that the configuration of the vehicle body transport device for transporting the vehicle body 2 is not particularly limited. As the vehicle body transport device, a floor carriage-type configuration using a floor carriage provided on a floor surface, for example, may be employed as well as the suspension-type configuration using the transport hangers 5 as in the present embodiment.

The robot 4 is a configuration for supporting the door detaching device 1 and causing the door detaching device 1 to move. In other words, the robot 4 functions as a moving device that causes the door detaching device 1 to change the position and the posture thereof relative to the vehicle body 2 in a state in which the vehicle body 2 is supported by the transport hangers 5 stopping at the door detaching position.

The robot 4 has a base part 4a and a robot arm part 4b provided on the base part 4a and is configured as a flexible robot arm (articulated robot), the posture of which is controlled at various positions and angles. The door detaching device 1 three-dimensionally moves in an arbitrary direction within its movable range through an operation of the robot arm part 4b. The robot 4 is, for example, a six-axis robot with six joints.

The robot 4 is connected to a control unit that controls operations and the like of the robot 4 and operates in response to control signals from the control unit. The control unit of the robot 4 includes, for example, a central processing unit (CPU) that performs various kinds of numerical calculation, information processing, device control, and the like on the basis of programs, a semiconductor memory that is a main storage device, and the like. The control unit of the robot 4 causes the robot 4 to perform operations based on predetermined programs created through teaching, for example. The position and the orientation (posture) of the door detaching device 1 relative to the vehicle body 2 are controlled, and the door 3 is detached from the vehicle body 2, through operations of the robot 4.

Figure 3:
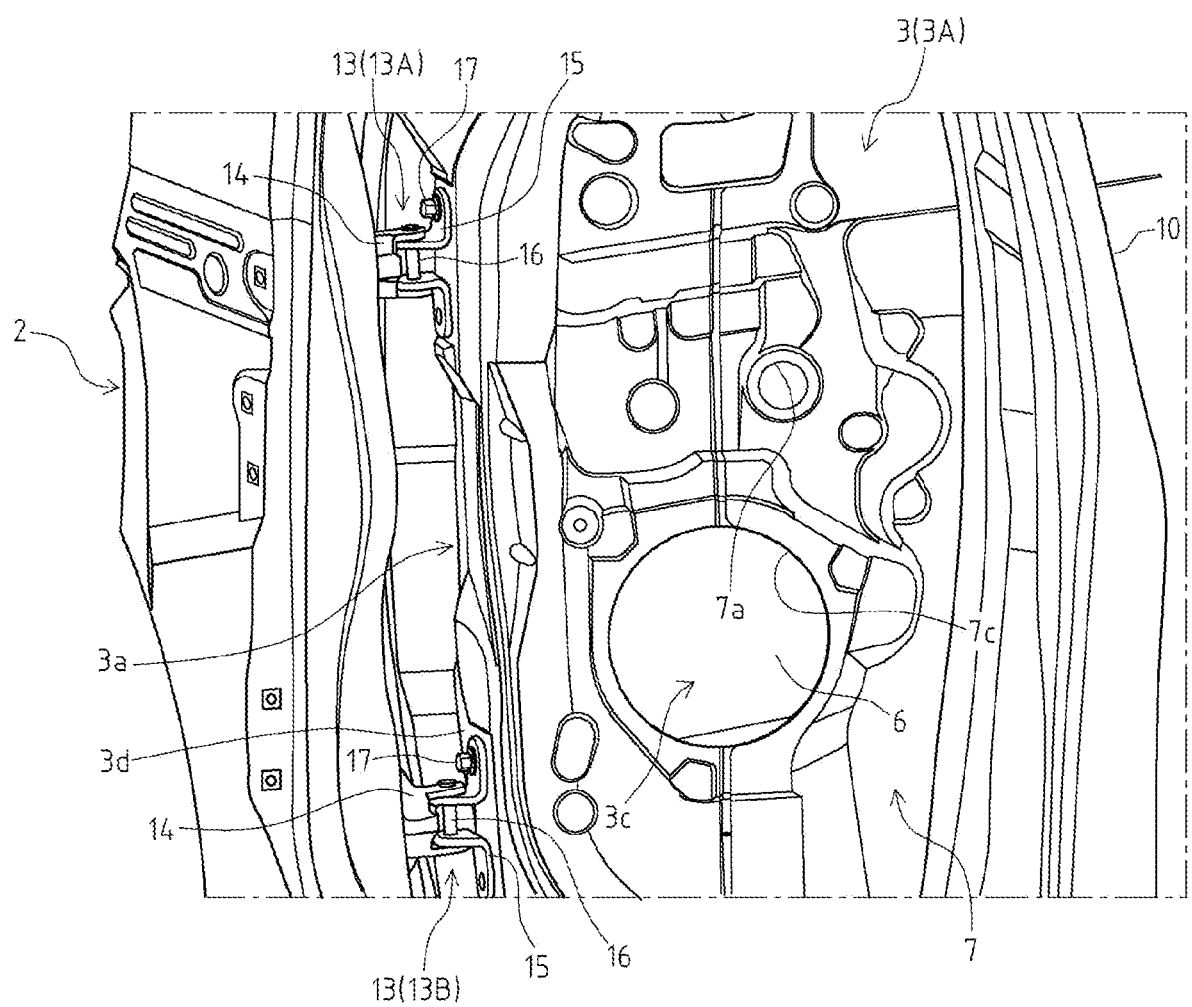
FIG. 3 is a perspective view illustrating a configuration of the door according to the embodiment of the present invention.
Figure 4:
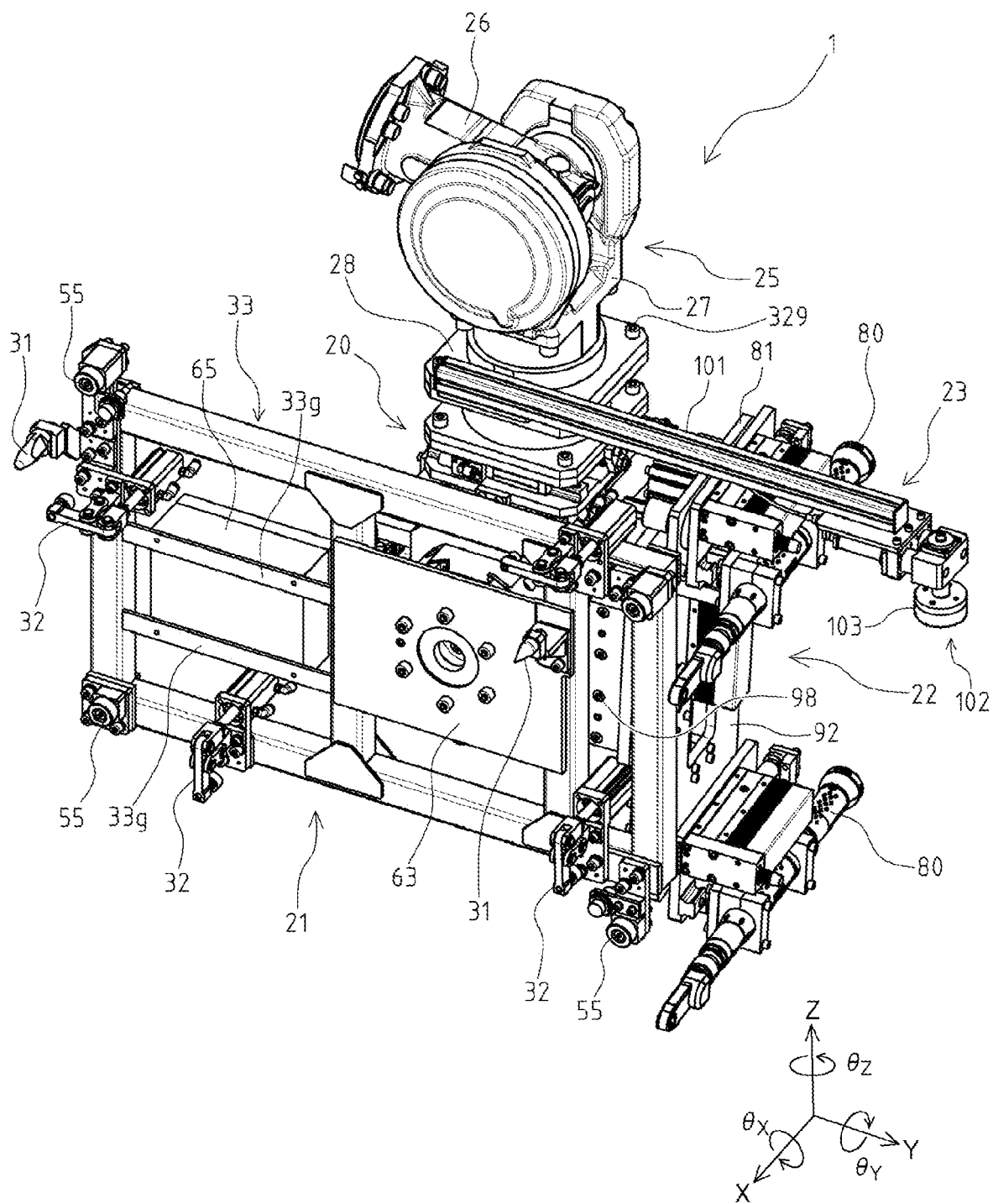
FIG. 4 is a perspective view illustrating the door detaching device according to the embodiment of the present invention.
Figure 5:
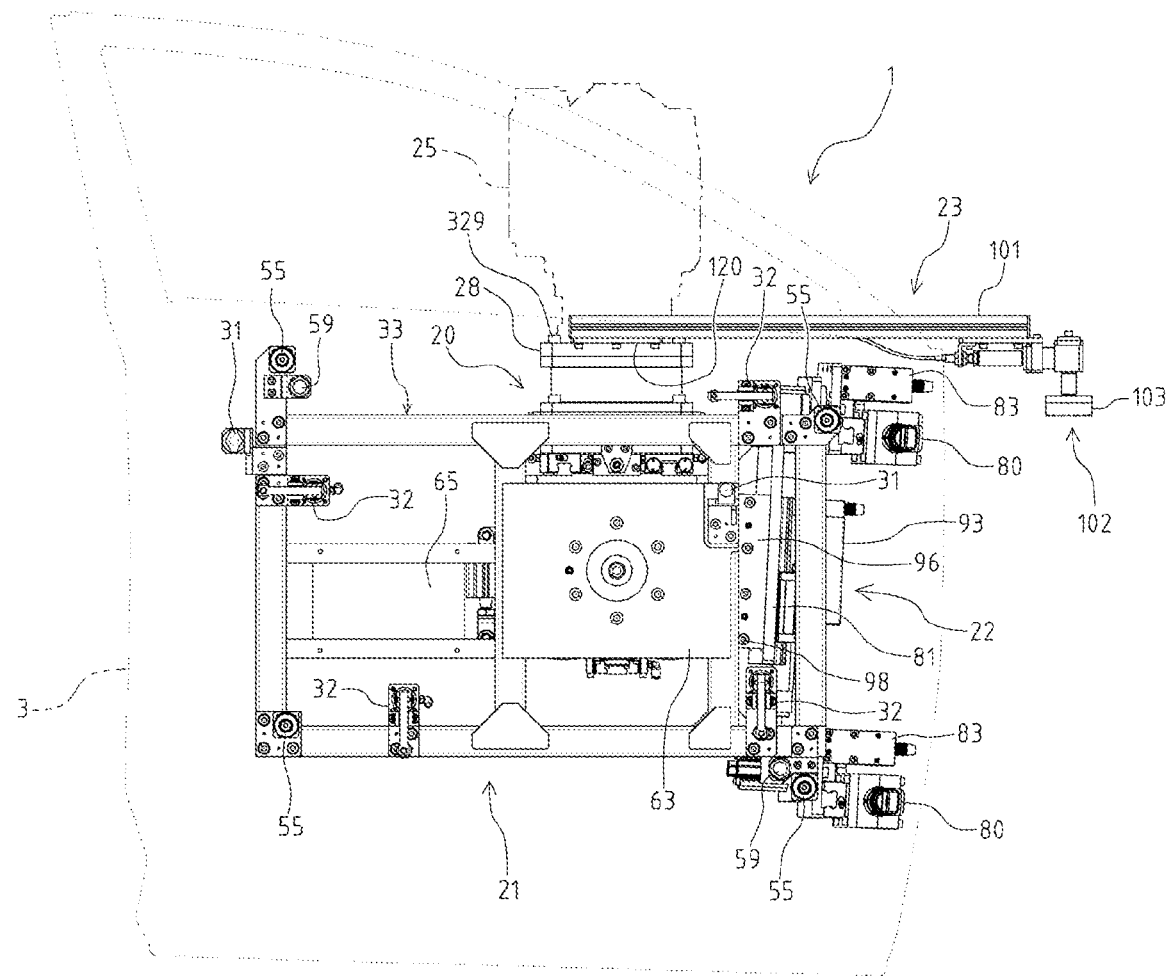
FIG. 5 is a front view illustrating the door detaching device according to the embodiment of the present invention.
Figure 6:
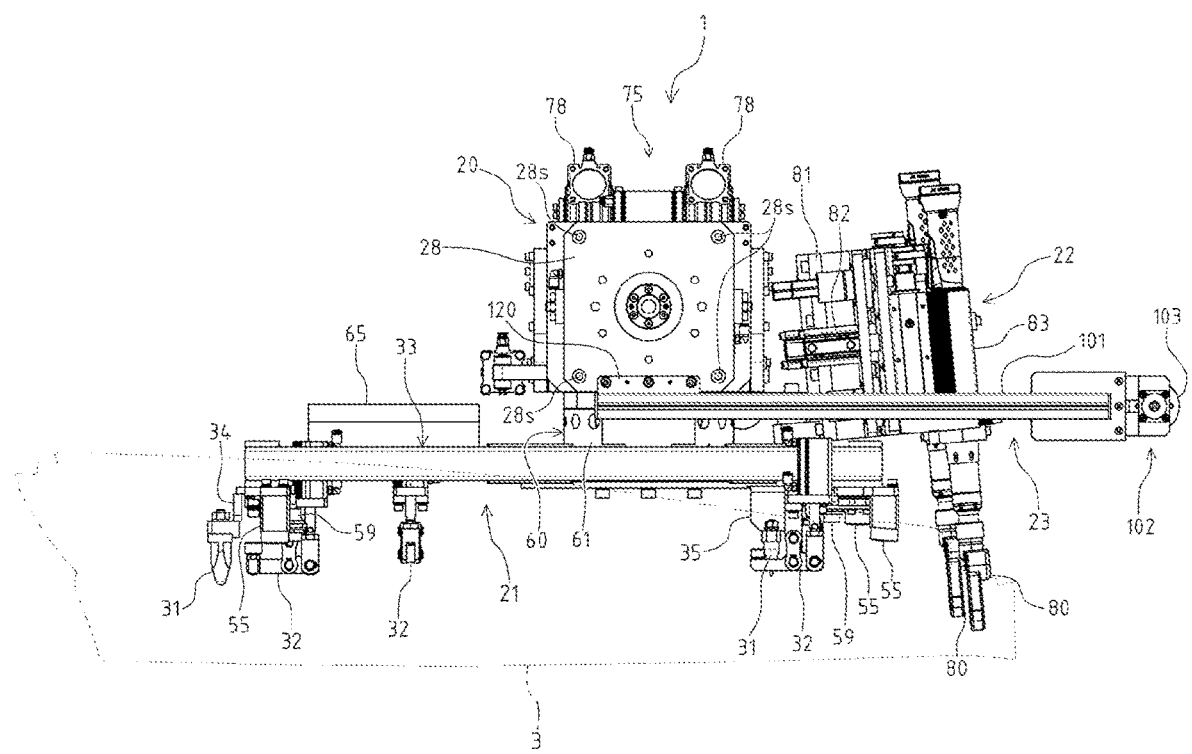
FIG. 6 is a plan view illustrating the door detaching device according to the embodiment of the present invention.
Figure 7:
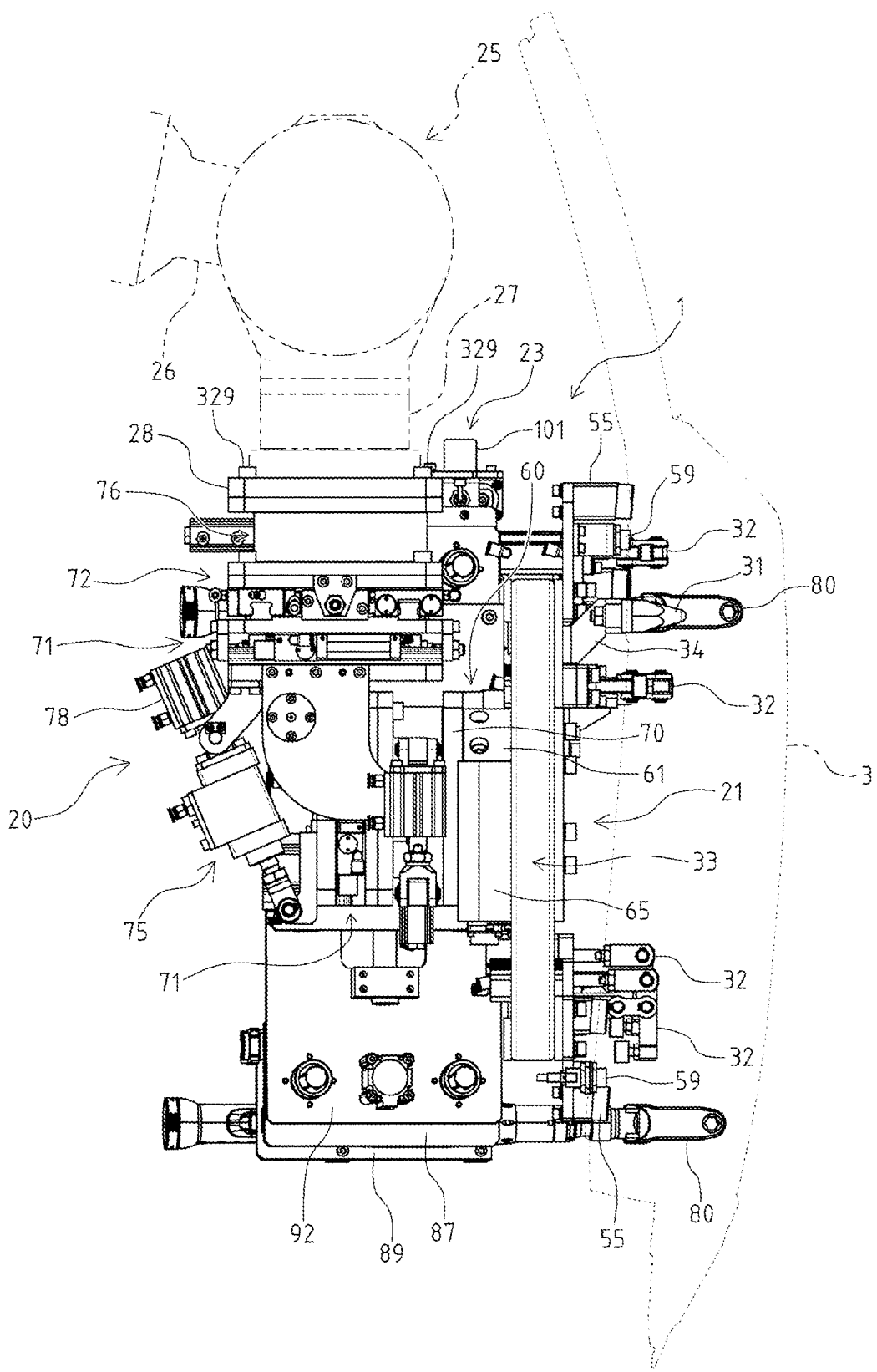
FIG. 7 is a side view illustrating the door detaching device according to the embodiment of the present invention.
Figure 8:
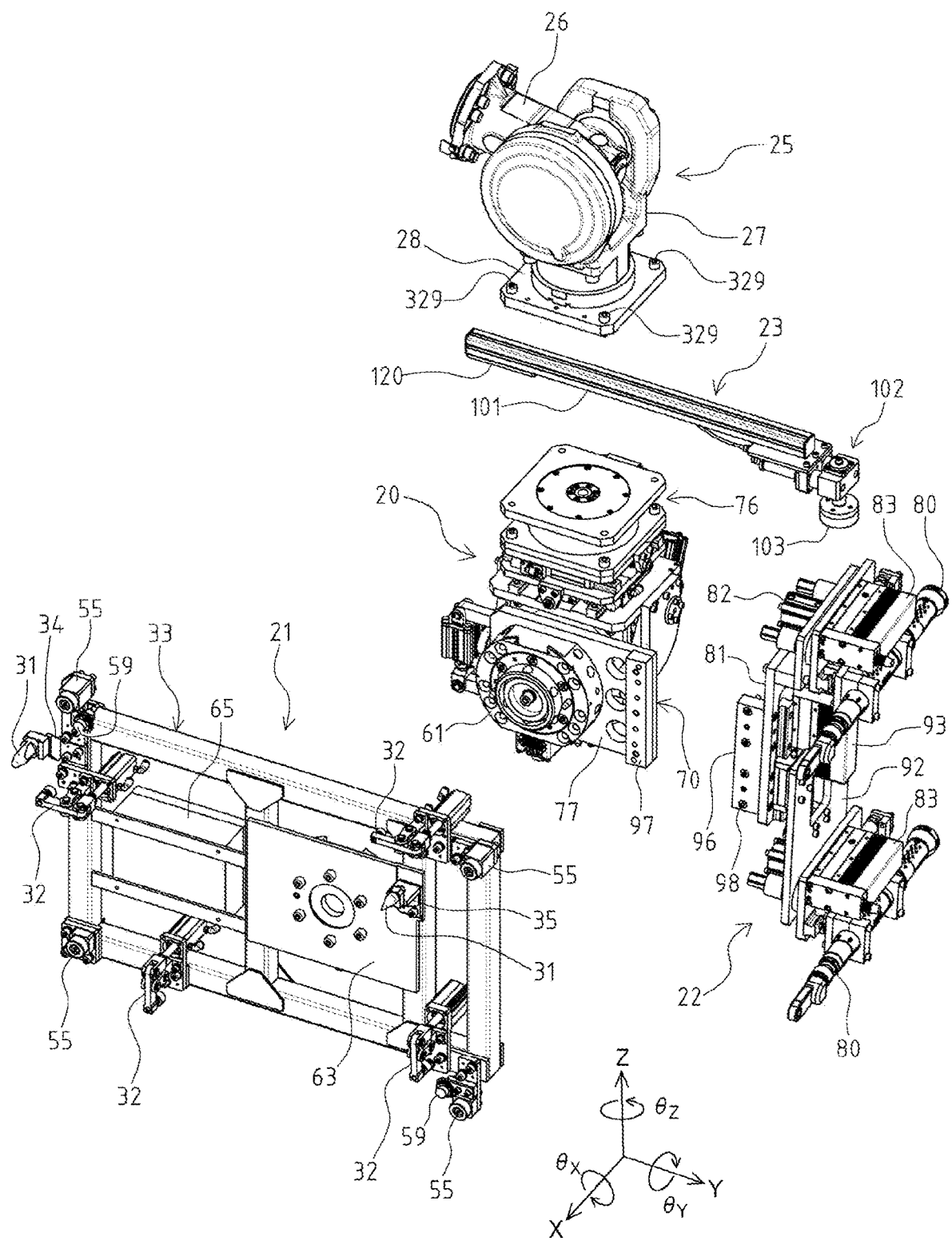
FIG. 8 is an exploded perspective view illustrating the door detaching device according to the embodiment of the present invention.
Figure 9:
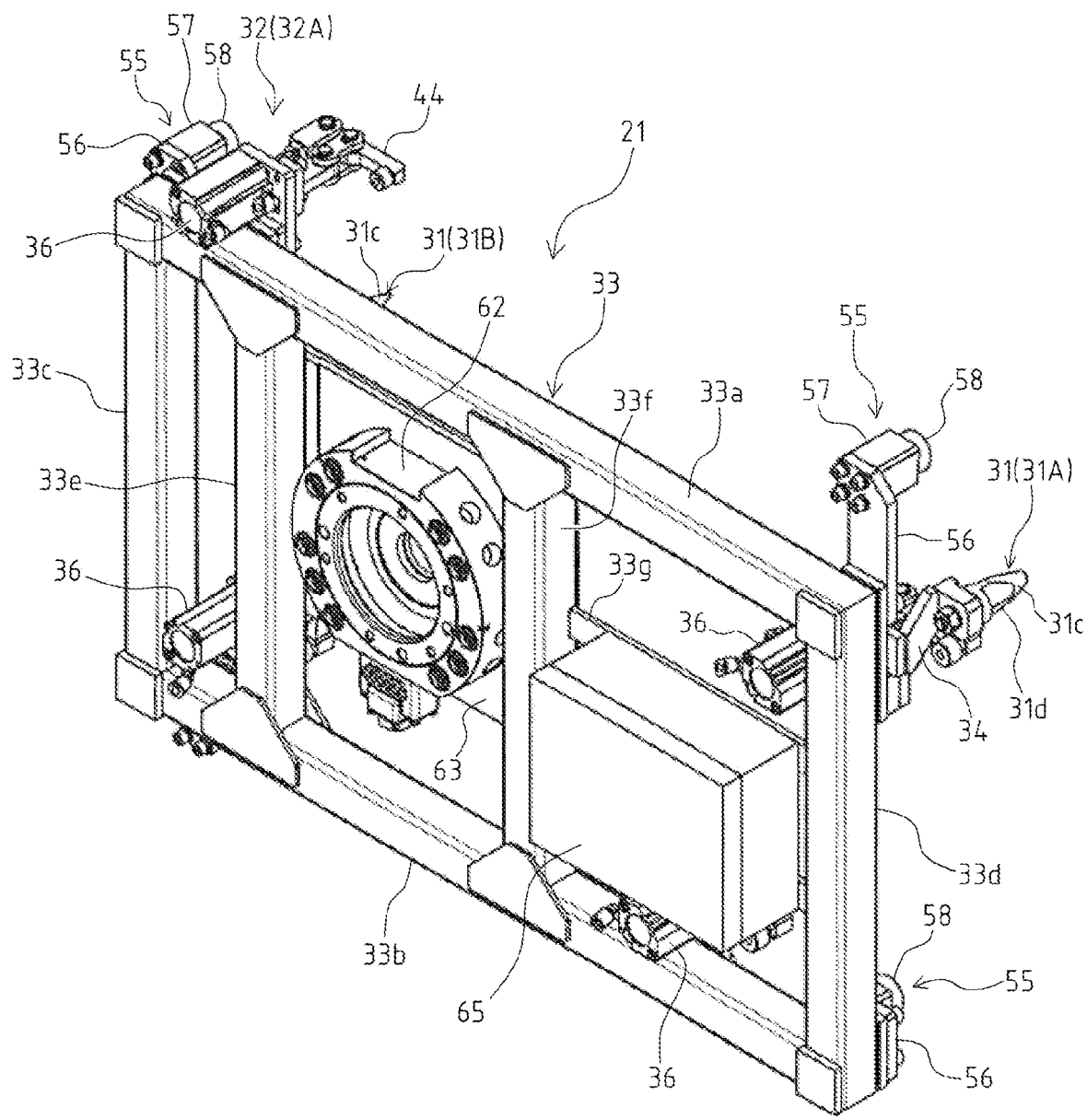
FIG. 9 is a perspective view of a material handling device from a rear surface side according to the embodiment of the present invention.

Next, the door 3 that is a target to be detached by the door detaching device 1 will be described. As illustrated in FIGS. 1 to 3, the door 3 has a door body part 3a that is a portion to be attached to the vehicle body 2 and a window frame part 3b that is formed above the door body part 3a. The door 3 has a door outer panel 6 configuring an outer portion of the door 3 and a door inner panel 7 configuring an inner portion of the door 3, and a door inside space 3c is formed between these panels. A door front-side wall part 3d that is a plate-shaped portion with a thickness direction in a substantially front-back direction in a state in which the door 3 is closed is formed at a front end part of the door 3 (see FIGS. 3 and 17).

The door 3 opens and closes a door opening part 2a formed at the vehicle body 2 through a rotating operation relative to the vehicle body 2. In a case of a door opening part on the rear side of the vehicle body 2, the door opening part 2a is formed by, for example, a roof side rail 9 that follows each of left and right side edge of a roof panel 8 configuring the vehicle body 2, a center pillar 10 provided to extend substantially in the up-down direction from an intermediate part of the roof side rail 9, a front pillar 11 provided in front of the center pillar 10, a rocker (side sill) 12 provided to extend in the front-back direction at a lower part of the vehicle body, and the like.

As illustrated in FIG. 3, the door 3 is attached to the vehicle body 2 with hinge parts 13 such that the door 3 is rotatable about a predetermined rotation shaft along substantially the up-down direction and opens and closes the door opening part 2a of the vehicle body 2 through the rotating operation. The hinge parts 13 are provided at two upper and lower locations between the front end part of the door 3 and the vehicle body 2.

Each hinge part 13 has a vehicle body-side piece 14 secured on the side of the vehicle body 2, a door-side piece 15 secured on the side of the door 3, and a pivot 16 that penetrates through the vehicle body-side piece 14 and the door-side piece 15 and axially supports the vehicle body-side piece 14 and the door-side piece 15. The door-side piece 15 is secured to the door front-side wall part 3d with hinge bolts 17. Although the door-side piece 15 is originally secured to the door front-side wall part 3d with two upper and lower hinge bolts 17, the door-side piece 15 is temporarily secured to the door front-side wall part 3d with one hinge bolt 17 for the door detaching process. FIG. 3 illustrates a state in which the door-side piece 15 is temporarily secured with the hinge bolt 17 on the upper side.

Also, on the manufacturing line on which the door detaching process is performed, door opened position holding devices 18 that hold the doors 3 in an opened state at their opened positions are provided on both sides of the transport path of the vehicle body 2 using the transport hangers 5. The door opened position holding devices 18 are provided at positions at which the door opened position holding devices can support, from the lower side, the doors 3 in an opened state relative to the vehicle body 2 in a state in which the vehicle body 2 is supported by the transport hangers 5. In the example illustrated in FIG. 1, the door opened position holding device 18 is provided for each of the four front, rear, left, and right doors 3 attached to the vehicle body 2.

Each door opened position holding device 18 has a body part 18a with a box shape placed on the floor surface and a movement support part 19 that is provided in an upper surface 18b of the body part 18a to be movable in the up-down direction. The movement support part 19 is provided to appear from the upper surface 18b of the body part 18a using a moving mechanism such as an air cylinder mechanism, for example. The movement support part 19 is a portion with a block shape, and the upper surface thereof is caused to serve as a support surface 19a which abuts on the door 3 from the lower side. The movement support part 19 abuts on a portion of a lower end edge of the door 3 that is close to an outward side in an opened state (a rear side in a closed state). The support surface 19a is formed of an elastic member such as urethane rubber.

The door opened position holding device 18 is provided so as not to interfere with the opened door 3 in a non-operating state in which the movement support part 19 is positioned on the lower side. Then, after the door 3 is opened through an operation of the robot 4, the movement support part 19 is caused to project upward from the upper surface 18b of the body part 18a to achieve an operating state, the support surface 19a is caused to abut on the door 3 from the lower side, and the position of the door 3 in an opened state is then held.

The door detaching device 1 according to the present embodiment will be described. As illustrated in FIGS. 4 to 8, the door detaching device 1 includes the material handling device 21 that serves as a component gripping device, the floating unit 20 that serves as a support device for a component gripping device, a nut runner unit 22 that serves as a fastening release unit, and a door opening arm 23 that serves as a door opening device.

The door detaching device 1 is attached to a rotation support unit 25 provided on a distal end side of the robot arm part 4b. The rotation support unit 25 configures a wrist portion of the robot arm part 4b and has an arm part 26 attached on a main body side of the robot arm part 4b, a rotation part 27 rotatably supported at the arm part 26 by a predetermined rotational shaft, and an attachment plate 28 provided on a distal end side (lower end side) of the rotation part 27. The attachment plate 28 is a portion to which the floating unit 20 is attached as will be described later.

The door detaching device 1 causes the rotation support unit 25 to support the floating unit 20 and supports the material handling device 21, the nut runner unit 22, and the arm 23 at the floating unit 20. Particularly, the floating unit 20 is configured to three-dimensionally floating-support the material handling device 21 and the nut runner unit 22. In other words, the door detaching device 1 three-dimensionally floating-support the material handling device 21 and the nut runner unit 22 relative to the robot arm part 4b via the floating unit 20.

[Configuration of Material Handling Device]

Figure 10:
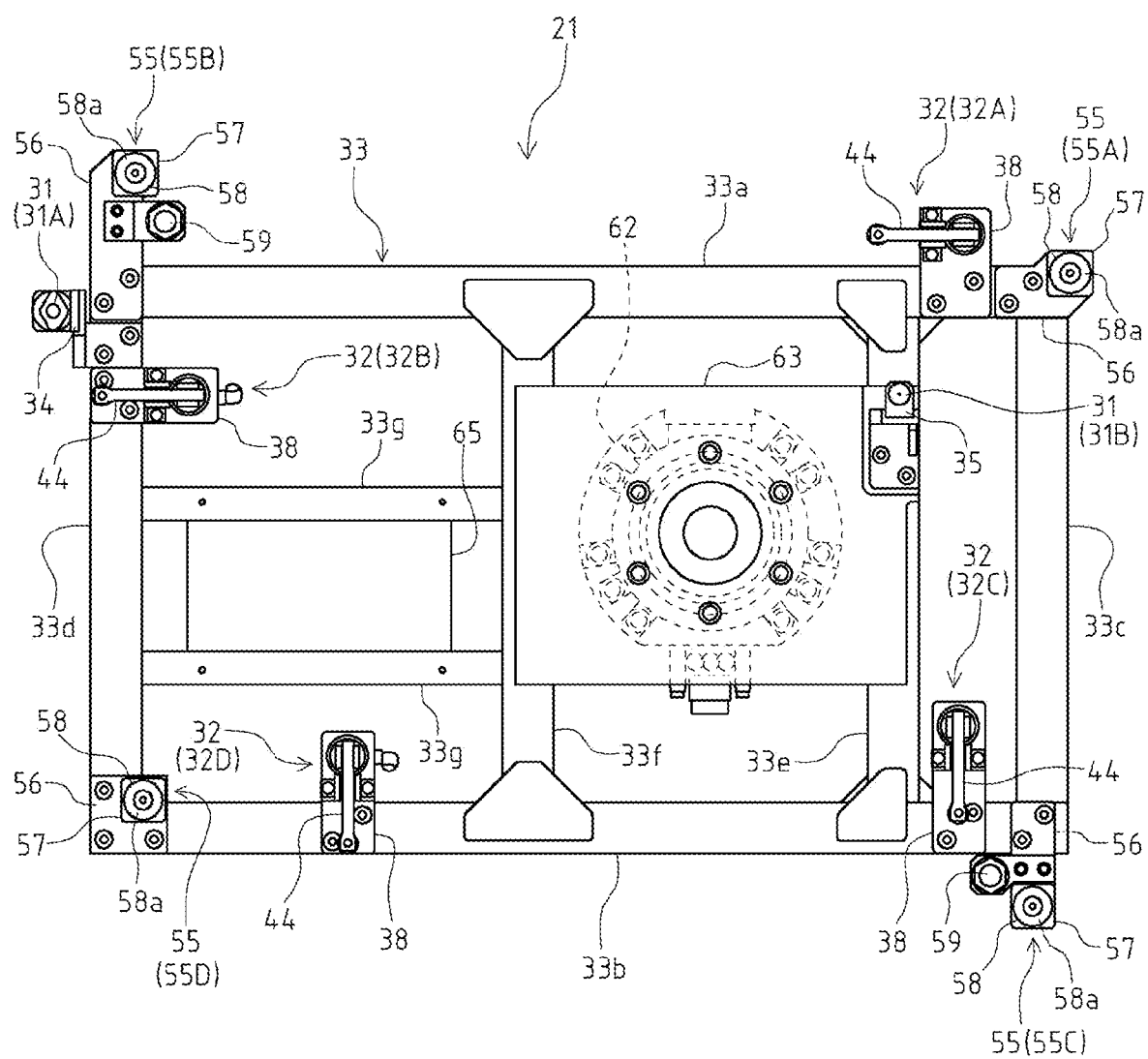
FIG. 10 is a front view of the material handling device according to the embodiment of the present invention.
Figure 11:
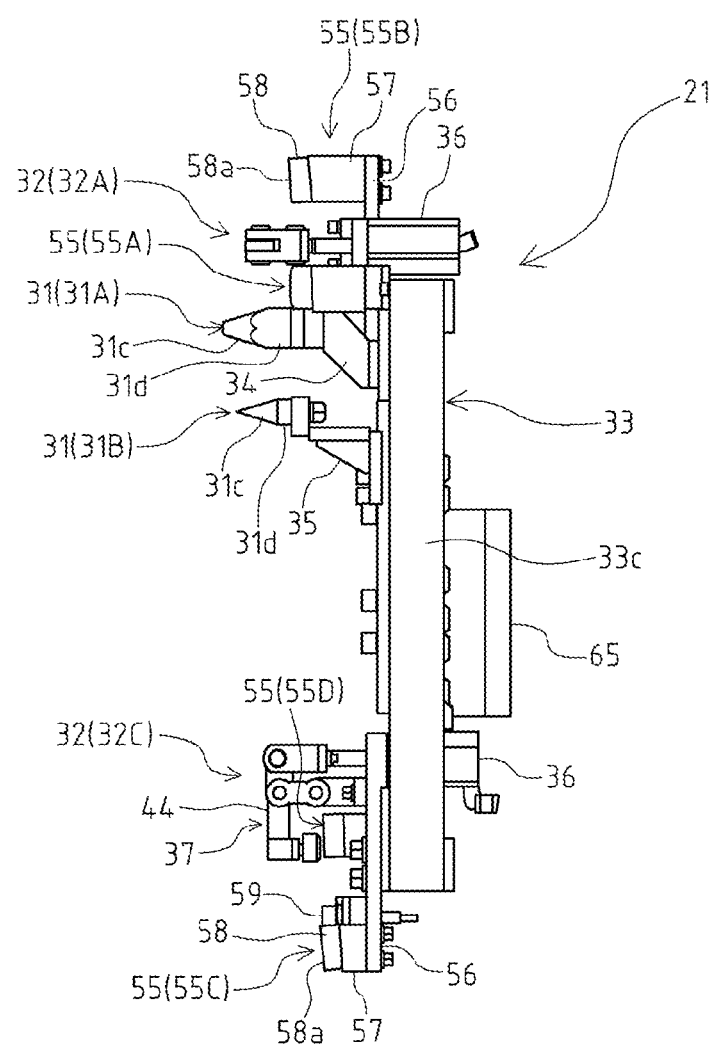
FIG. 11 is a left side view of the material handling device according to the embodiment of the present invention.
Figure 12:
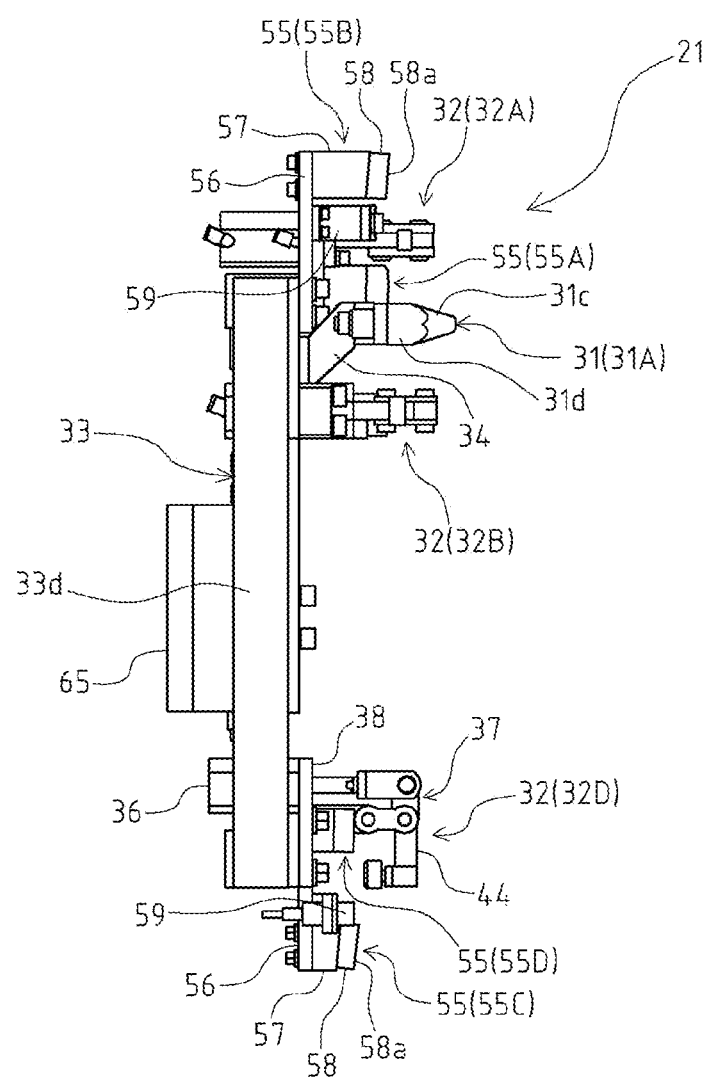
FIG. 12 is a right side view of the material handling device according to the embodiment of the present invention.
Figure 13:
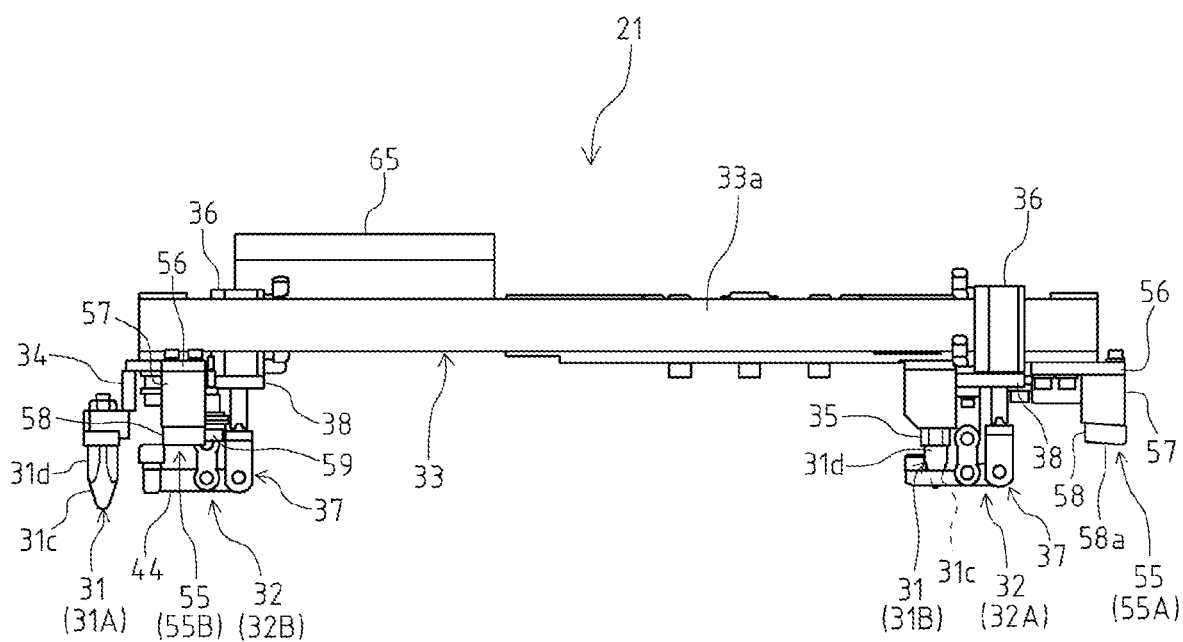
FIG. 13 is a plan view of the material handling device according to the embodiment of the present invention.

The material handling device 21 will be described with reference to FIGS. 9 to 16. Note that for the material handling device 21, the side illustrated in FIG. 10 is defined as a front side (front surface side), the opposite side thereof (the right side in FIG. 11, for example) is defined as a rear side, the right side in FIG. 10 is defined as a left side, and the left side in FIG. 10 is defined as a right side.

The material handling device 21 is a device that moves to a predetermined position relative to the door 3 and grips the door 3 through operations of the robot 4. The material handling device 21 has engagement pins 31 that serve as engagement parts to be engaged with the door 3 and grip the door 3 in a state in which the engagement pins 31 are caused to be engaged with the door 3. The material handling device 21 has the engagement pins 31 and clamping mechanism parts 32 that serve as gripping parts to grip the door 3 and grips the door 3 with the clamping mechanism parts 32 in a state in which the engagement pins 31 are caused to be engaged with the door 3.

The material handling device 21 has a material handling body part 33 with a frame shape and supports the engagement pins 31 and the clamping mechanism parts 32 at the material handling body part 33. The material handling body part 33 has upper, lower, left, and right frame parts 33a, 33b, 33c, and 33d, all of which have rectangular cross-sectional shapes, and has a rectangular frame outer shape formed by these frame parts. Also, two longitudinal frame parts 33e and 33f are bridged between the upper frame part 33a and the lower frame part 33b in parallel with each other at a predetermined interval therebetween at positions between the left frame part 33c and the right frame part 33d in the material handling body part 33.

In the material handling device 21, the engagement pins 31 are provided at two locations on both left and right sides. In the present embodiment, one (right side) engagement pin 31A is provided at a position on an outward side (right side) in the vicinity of an upper right corner of the material handling body part 33. The engagement pin 31A is supported at an upper end part of the right frame part 33d of the material handling body part 33 in a secured state via a support stay 34.

Also, the other (left side) engagement pin 31B is provided at a position on an inward side (right side) in the vicinity of an upper left corner of the material handling body part 33. The engagement pin 31B is supported at an upper part of the longitudinal frame part 33e on the left side in a secured state via a support stay 35. Note that although the engagement pins 31 are provided at the two locations on both the left and right sides of the material handling body part 33 in the present embodiment, the number and the arranged positions of the engagement pins 31 included in the material handling device 21 are not particularly limited.

In the material handling device 21, the engagement pins 31 are supported at the positions in front of the material handling body part 33 and project forward. The engagement pins 31 have substantially cylindrical outer shapes with a center axis direction in the front-back direction, and front portions thereof are tapered parts 31c with tapered shapes with the front side defined as a sharp end side. Portions of the engagement pins 31 located backward beyond the tapered parts 31c are tubular parts 31d that follow tubular shapes with a constant outer diameter.

Figure 17:
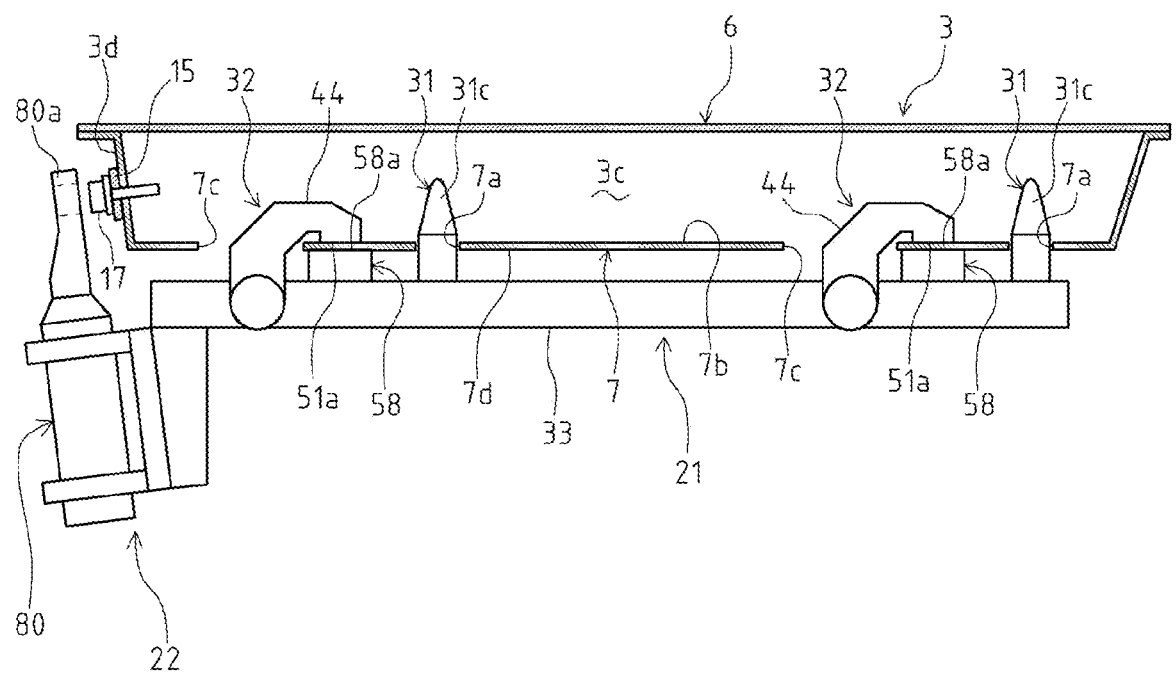
FIG. 17 is a schematic view illustrating a state in which the material handling device is gripping the door according to the embodiment of the present invention.

For such two engagement pins 31 of the material handling device 21, engagement holes 7a to which the engagement pins 31 are inserted are formed in the door inner panel 7 of the door 3 (see FIGS. 3 and 17). The engagement holes 7a are reference holes for positioning between the door inner panel 7 and the roof panel 8, for example. The engagement holes 7a have substantially the same hole diameters as the outer diameters of the engagement pins 31 to allow the tubular parts 31d of the engagement pins 31 to be inserted thereinto substantially with no clearances. The two engagement pins 31 are provided to correspond to the positions of the two engagement holes 7a in the door inner panel 7. However, the engagement holes 7a may be separately formed for engagement with the engagement pins 31.

The two engagement pins 31 are inserted into the engagement holes 7a substantially at the same time by the material handling device 21 approaching the door 3 from the side of the door inner panel 7 through an operation of the robot 4. The material handling device 21 is engaged with the door 3 by inserting the two engagement pins 31 to the engagement holes 7a, and a state in which the material handling device 21 is positioned in the surface rotating direction of the door 3 (in a state in which the material handling device 21 cannot relatively rotate) is achieved. Here, the surface rotating direction of the door 3 is a rotating direction of the door 3 in a side view of the vehicle body 2 in a state in which the door 3 is closed and is substantially the same direction as the rotating direction of the door 3 with a rotation shaft direction in the front-back direction of the material handling device 21 in a state in which the material handling device 21 is engaged with the door 3 (the left-right direction in FIG. 11, for example).

In the material handling device 21, the clamping mechanism parts 32 are provided at for locations which are portions in the vicinity of the four corners of the rectangular frame-shaped material handling body part 33. In the present embodiment, a first clamping mechanism part 32A located in the vicinity of the corner of the upper frame part 33a and the left frame part 33c from among the four clamping mechanism parts 32 is provided at a left end part of the upper frame part 33a. Also, a second clamping mechanism part 32B located in the vicinity of the corner of the upper frame part 33a and the right frame part 33d is provided at an upper end part of the right frame part 33d.

In addition, a third clamping mechanism part 32C located in the vicinity of the corner of the lower frame part 33b and the left frame part 33c is provided at a left end part of the lower frame part 33b. Moreover, a fourth clamping mechanism part 32D located in the vicinity of the corner of the lower frame part 33b and the right frame part 33d is provided at a part near the right side of the lower frame part 33b. Note that although the clamping mechanism parts 32 are provided at the four locations in the vicinity of the four corners of the material handling body part 33 in the present embodiment, the number and the arranged positions of the clamping mechanism parts 32 included in the material handling device 21 are not particularly limited.

Figure 14:
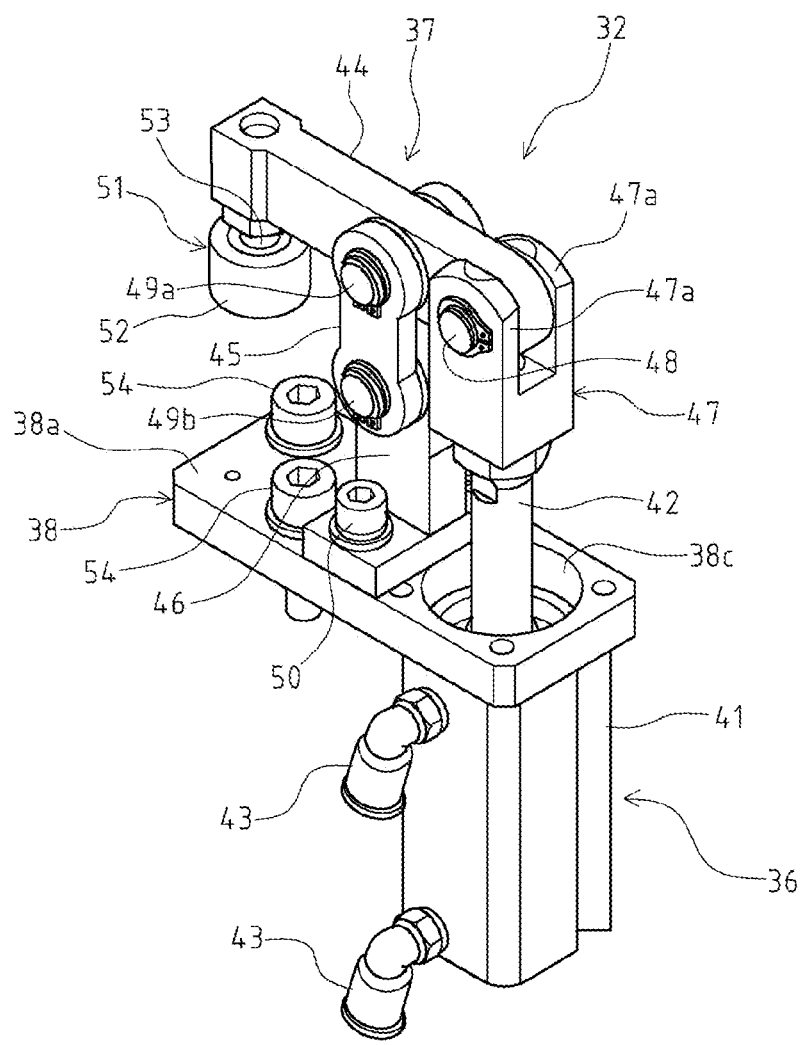
FIG. 14 is a perspective view illustrating a clamping mechanism part of the material handling device according to the embodiment of the present invention.
Figure 15:
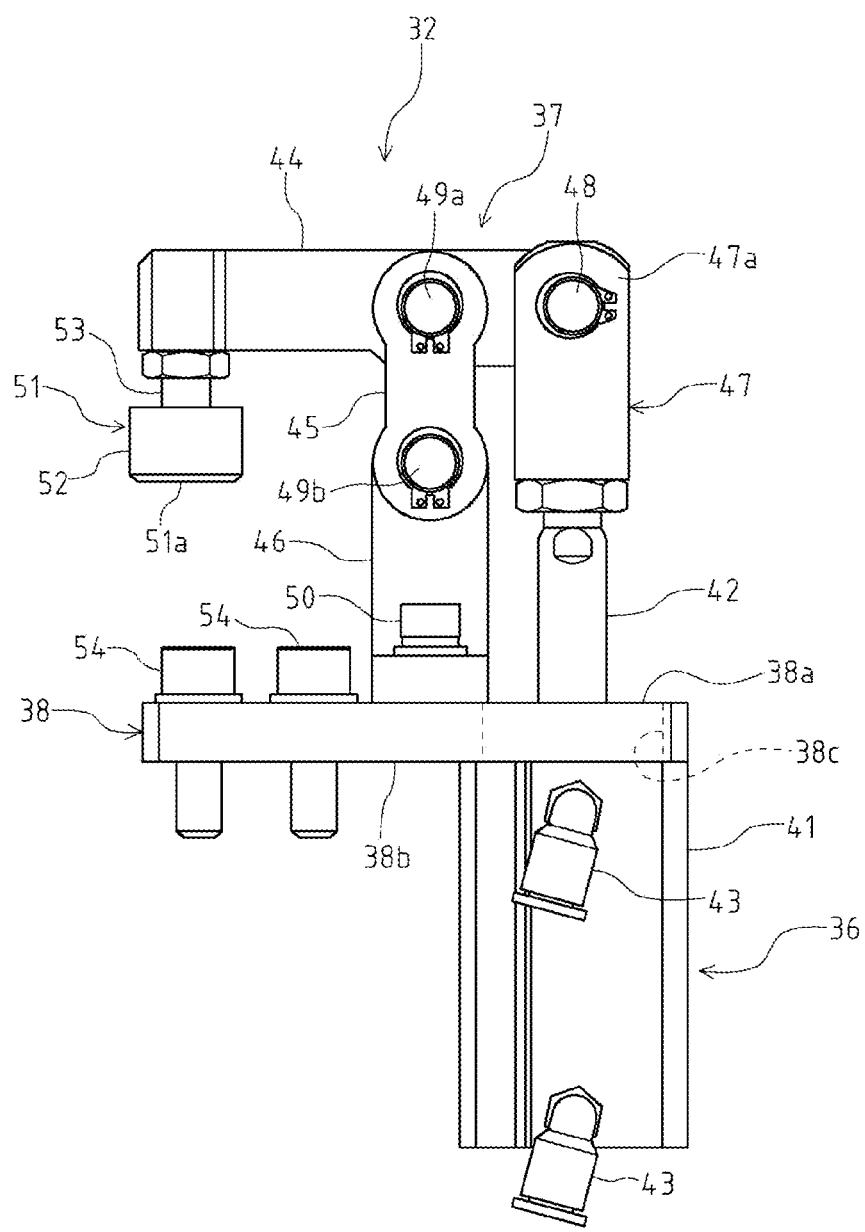
FIG. 15 is a side view illustrating the clamping mechanism part of the material handling device according to the embodiment of the present invention.
Figure 16:
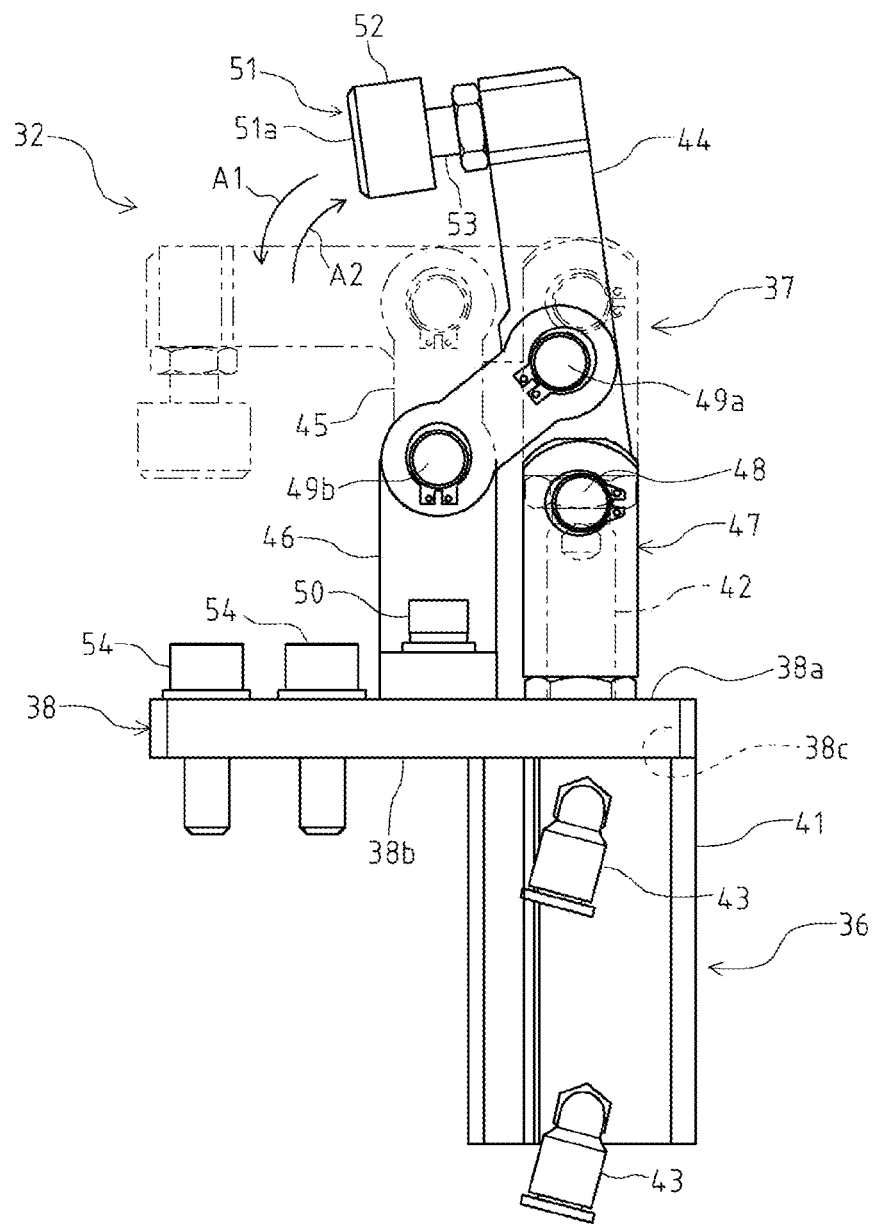
FIG. 16 is a side view illustrating an operating state of the clamping mechanism part of the material handling device according to the embodiment of the present invention.

The clamping mechanism parts 32 will be described with reference to FIGS. 14 to 17. As illustrated in FIGS. 14 to 16, each clamping mechanism part 32 has an air cylinder 36, a clamping part 37 that operates in response to extension/contraction of the air cylinder 36, and a support plate 38 and is configured as a clamping unit using the air cylinder 36 as an actuator.

The air cylinder 36 is a cylinder mechanism of a single-rod double-acting type and has a substantially square tubular-shaped cylinder body 41 and a piston rod 42 that reciprocates relative to the cylinder body 41. The air cylinder 36 has a supply/exhaust nozzle 43 that communicates with a supply/exhaust port that faces a side surface of the cylinder body 41 form the inside thereof and receives air supply from an air supply source, which is not illustrated. The air cylinder 36 is configured to cause the piston rod 42 to reciprocate relative to the cylinder body 41 and performs an extension/contraction operation through air supply/exhaust to/from the inside of the cylinder body 41 through the supply/exhaust nozzle 43.

The clamping part 37 has a clamping arm 44 that rotates through an extension/contraction operation of the air cylinder 36, rotation support arms 45 that rotatably support the clamping arm 44, a support post 46 that rotatably supports the rotation support arms 45 on the support plate 38, and a coupling member 47 that couples a proximal end part of the clamping arm 44 to the piston rod 42.

The coupling member 47 is provided on a distal end side of the piston rod 42 and moves integrally with the piston rod 42. The coupling member 47 has a shape branched into two branches by two mutually facing projecting piece parts 47a at a portion on the opposite side (the upper side in FIG. 15) of the side of the piston rod 42. The clamping arm 44 is rotatably supported at the coupling member 47 by an axial support member 48 with the proximal end part thereof positioned between the two projecting piece parts 47a. The axial support member 48 is provided in a state in which the axial support member 48 penetrates through the coupling member 47 and the clamping arm 44 with an axial direction in the facing direction of the two projecting piece parts 47a.

The clamping arm 44 is supported at an intermediate part thereof in the lengthwise direction by the support post 46 via the rotation support arms 45. The rotation support arms 45 are provided as a pair of configurations such that the rotation support arms 45 sandwich the clamping arm 44 and the support post 46 from both sides in the axial direction of the axial support member 48. The rotation support arms 45 are rotatably coupled to each of the clamping arm 44 and the support post 46 with axial support members 49a and 49b with rotational shaft directions parallel to the rotational shaft direction of the axial support member 48. The support post 46 has a rectangular plate-shaped platform part at a lower end part thereof and is secured to the support plate 38 at two locations with bolts 50 that penetrate through the platform part in a state in which the platform part is superimposed on a front surface 38a of the support plate 38.

A pressurizing part 51 configured with a circular columnar-shaped pressurizing element 52 is provided at the distal end part of the clamping part 44. The pressurizing element 52 is provided at the distal end part of the clamping arm 44 via a support shaft 53 on one side (the lower side in FIG. 15) of the clamping arm 44 in the rotational direction of the clamping arm 44 to have substantially an "L" shape along with the clamping arm 44. The pressurizing part 51 has an end surface of the pressurizing element 52 on the opposite side of the side of the clamping arm 44 that serves as a pressurizing surface 51a.

The support plate 38 is configured with a plate-shaped member with a substantially oblong rectangular shape and supports the air cylinder 36 at a portion on one side in the lengthwise direction thereof (the left-right direction in FIG. 15). The cylinder body 41 of the air cylinder 36 is secured on the support plate 38 on the side of a rear surface 38b thereof with a securing member such as a bolt. A through-hole 38c that allows the piston rod 42 to penetrate therethrough and allows the piston rod 42 to reciprocate relative to the cylinder body 41 is formed at a portion of the support plate 38 where the cylinder body 41 is secured.

Also, a portion of the support plate 38 on the other side in the lengthwise direction thereof serves as a portion to secure the clamping mechanism parts 32 to each of the frame parts configuring the material handling body part 33. Each clamping mechanism part 32 is secured to each frame part with two securing bolts 54 that penetrate through the support plate 38 from the side of the front surface 38a with the portion of the support plate 38 on the other side in the lengthwise direction thereof positioned on the front surface side of the corresponding frame part. Note that the shape of the support plate 38, the portion of the support plate 38 where the air cylinder 36 is supported, and the like are not particularly limited, and these may be appropriately changed depending on the attachment positions of the clamping mechanism parts 32 in the material handling body part 33 and the like.

In each clamping mechanism part 32 provided with the configuration as described above, the clamping part 37 is configured as a toggle mechanism that operates in response to an extension/contraction operation of the air cylinder 36. In other words, the clamping mechanism part 32 brings the clamping arm 44 into a state in which the clamping arm 44 is substantially parallel to the support plate 38 and is brought into an operating state by the air cylinder 36 being brought into an extended state as illustrated in FIGS. 14 and 15. Here, the clamping arm 44 rotates relative to the support post 46 by the axial support members 49a and 49b along with rotation of the rotation support arm 45 that relatively rotates with respect to each part by the clamping arm 44 on the proximal end side being pushed upward by the piston rod 42 via the coupling member 47 (see the arrow A1 in FIG. 16). In the operating state of the clamping mechanism part 32, the pressurizing part 51 is brought into a state in which the pressurizing surface 51a thereof is caused to face the front surface 38a of the support plate 38, and the rotation support arm 45 is brought into a state in which the rotation support arm 45 is substantially parallel to the standing direction of the support post 46, that is, the direction that is perpendicular to the support plate 38.

On the other hand, the clamping mechanism part 32 causes the clamping arm 44 to rotate by about 80° on the opposite side of the side of the pressurizing part 51, brings the clamping arm 44 into a standing state, and is brought into a non-operating state by the air cylinder 36 being brought into a contracting state as illustrated in FIG. 16. Here, the clamping arm 44 rotates relative to the support post 46 by the axial support members 49a and 49b along with rotation of the rotation support arm 45 that relatively rotates with respect to each part by the clamping arm 44 on the proximal end side being pulled downward (the side of the cylinder body 41) by the piston rod 42 via the coupling member 47 (see the arrow A2 in FIG. 16).

The material handling device 21 provided with the clamping mechanism parts 32 as described above clamps the door inner panel 7 of the door 3 by bringing the clamping mechanism parts 32 into an operating state as illustrated in FIG. 17. In the clamped state of the door inner panel 7, each clamping mechanism part 32 causes the pressurizing surface 51a of the pressurizing part 51 to abut on an inner surface 7b of the door inner panel 7.

For the clamping mechanism parts 32 provided at four locations in the material handling device 21, opening parts 7c that receive the clamping mechanism parts 32 are formed in the door inner panel 7 of the door 3 (see FIGS. 3 and 17). The opening parts 7c are, for example, opening parts for attaching speakers installed in the door 3. However, the opening parts 7c may be separately formed to receive the clamping mechanism parts 32. Each clamping mechanism part 32 causes the pressurizing surface 51a of the pressurizing part 51 to abut on the inner surface 7b of the door inner panel 7 by accepting a portion including the clamping arm 44 inside the door inside space 3c from each opening part 7c in the non-operating state and being brought into the operating state in that state. Note that FIG. 17 schematically illustrates the configurations of the door 3 and the material handling device 21.

Also, the material handling device 21 has receiving parts 55 as configurations for clamping the door inner panel 7 along with the clamping mechanism parts 32. The receiving parts 55 are provided at four locations at portions in the vicinity of the four corners of the rectangular frame-shaped material handling body part 33. In other words, each receiving part 55 is provided at a position in the vicinity of each clamping mechanism part 32.

The receiving parts 55 are provided at the frame parts configuring the material handling body part 33 via support stays 56 that are secured in front of the frame parts with fastening tools such as bolts. Each receiving part 55 has a support part 57 secured to the support stay 56 and a pad part 58 provided in front of the support part 57. A surface of the pad part 58 on the front side serves as an abutting part 58a abutting on an outer surface 7d of the door inner panel 7.

The receiving parts 55 at the four locations are disposed to abut on such predetermined portions that a contact area of the abutting surface 58a is secured on the outer surface 7d of the door inner panel 7 in accordance with the shape of the door inner panel 7. In the present embodiment, a receiving part 55A in the vicinity of a first clamping mechanism part 32A from among the receiving parts 55 is provided at a position in the vicinity of the upper left corner of the material handling body part 33. Also, a receiving part 55B in the vicinity of a second clamping mechanism part 32B is provided at a position above the corner with the support stay 56 provided to extend upward from the upper right corner of the material handling body part 33.

Also, a receiving part 55C in the vicinity of a third clamping mechanism part 32C is provided at a position below the corner with the support stay 56 provided to extend downward from the lower left corner of the material handling body part 33. Moreover, a receiving part 55D in the vicinity of a fourth clamping mechanism part 32D is provided at a position in the vicinity of the lower right corner of the material handling body part 33. Note that a sensor such as a proximity switch, for example, is appropriately provided in the vicinity of each receiving part 55 to detect a clamped state and the like of the door inner panel 7 achieved by the material handling device 21. In the present embodiment, a proximity switch 59 is provided in the vicinity of each of the upper right receiving part 55B and the lower left receiving part 55C in a state in which the proximity switch 59 is supported at the support stay 56 via a predetermined support member.

As described above, a state in which the door inner panel 7 is pinched and clamped at the four locations is achieved by the combination of the clamping mechanism parts 32 disposed at the four locations in the material handling body part 33 and the receiving parts 55 positioned in the vicinity of each of the clamping mechanism parts 32. In this manner, a state in which the door 3 is gripped with the material handling device 21 is achieved. Note that when the material handling device 21 clamps the door inner panel 7, the material handling device 21 is positioned relative to the door 3 through insertion and engagement of the engagement pins 31 at the two locations with respect to the door inner panel 7.

The material handling device 21 provided with the configuration as described above is coupled to the floating unit 20 with a chuck mechanism 60 configured as a so-called automatic tool changer. In other words, the chuck mechanism 60 configures a coupling part between the material handling device 21 and the floating unit 20, a coupling plate part 61 on one side (master side) configuring the chuck mechanism 60 is provided on the side of the floating unit 20, and a coupling plate part 62 on the other side (tool side) configuring the chuck mechanism 60 is provided on the side of the material handling device 21.

Both the coupling plate parts 61 and 62 configuring the chuck mechanism 60 are configured to have substantially disk shapes. In the material handling device 21, the coupling plate part 62 is attached to a support plate 63 provided to be bridged between the two longitudinal frame parts 33e and 33f configuring the material handling body part 33 on the rear surface side thereof in a secured state using a securing tool such as a bolt.

The chuck mechanism 60 includes a configuration that causes the coupling plate parts 61 and 62 to be attached to and detached from each other with an air pressure. The chuck mechanism 60 employs, for example, a ball locking scheme as an attachment/detachment mechanism between the coupling plate parts 61 and 62. Note that the configuration of the chuck mechanism 60 is not particularly limited.

Also, in the material handling device 21, a control box 65 is supported at the material handling body part 33. The control box 65 is secured behind two upper and lower support frame parts 33g provided to be bridged between the right frame part 33d and the longitudinal frame part 33f on the central side in the left-right direction with a securing tool such as a bolt. Electric and communication devices and the like for causing various devices such as the clamping mechanism part 32 and the chuck mechanism 60, for example, to operate are accommodated in the control box 65.

[Outline of Configuration of Floating Unit]

The floating unit 20 has a support body part 70 that supports the material handling device 21 and the nut runner unit 22. The support body part 70 is provided at the floating unit 20 such that the support body part 70 is movable in a floating state. In other words, the support body part 70 is provided at the floating unit 20 such that the support body part 70 is movable in each axial direction in three-dimensional orthogonal coordinates of an X axis, a Y axis, and a Z axis and is also provided such that the support body part 70 is rotatable in rotational directions Ox, Oy, and Oz about each of the X axis, the Y axis, and the Z axis (see FIGS. 18 to 20).

Therefore, the floating unit 20 has an X-direction shift mechanism part 71 that serves as a first shift mechanism part that supports the support body part 70 such that the support body part 70 is movable in an X-axis direction (X direction) that is a first direction, a Y-direction shift mechanism part 72 that serves as a second shift mechanism part that supports the support body part 70 such that the support body part 70 is movable in a Y-axis direction (Y direction; second direction) that perpendicularly intersects the X direction; and a Z-direction shift mechanism part 73 that serves as a third shift mechanism part that supports the support body part 70 such that the support body part 70 is movable in a Z-axis direction (Z direction; third direction) that perpendicularly intersects the X direction and the Y direction.

Also, the floating unit 20 has an X-axis rotation mechanism part 74 that serves as a first rotation mechanism part that supports the support body part 70 such that the support body part 70 is rotatable with a center axis direction in the X direction, a Y-axis rotation mechanism part 75 that serves as a second rotation mechanism part that supports the support body part 70 such that the support body part 70 is rotatable with a center axis direction in the Y direction, and a Z-axis rotation mechanism part 76 that serves as a third rotation mechanism part that supports the support body part 70 such that the support body part 70 is rotatable with a center axis direction in the Z direction. Note that in the floating unit 20, one side (the left side in FIG. 20) in the X direction that is a side on which the material handling device 21 is supported is defined as a front side (front surface side), the opposite side thereof is defined as a rear side, the Y direction is defined as a left-right direction, and the Z direction is defined as an up-down direction.

Also, in the floating unit 20, each of the X-direction shift mechanism part 71, the Y-direction shift mechanism part 72, and the Z-direction shift mechanism part 73 has a shift-lock mechanism (211, 231, and 166) that causes the support body part 70 to stop moving in the direction in which each of the X-direction shift mechanism part 71, the Y-direction shift mechanism part 72, and the Z-direction shift mechanism part 73 movably supports the support body part 70. Moreover, each of the X-axis rotation mechanism part 74, the Y-axis rotation mechanism part 75, and the Z-axis rotation mechanism part 76 has a rotation locking mechanism (rotation support mechanisms 128 and 303 and a break unit 265) that causes the support body part 70 to stop rotating in the rotational direction in which each of the X-axis rotation mechanism part 74, the Y-axis rotation mechanism part 75, and the Z-axis rotation mechanism part 76 rotatably supports the support body part 70.

The support body part 70 is a portion with a substantially plate shape as a whole and is provided on the front surface side of the floating unit 20. The support body part 70 has a plate-shaped base 77 configured with a rectangular plate-shaped member. The plate-shaped base 77 has a plate thickness direction in the X direction. The coupling plate part 61 on the master side configuring the chuck mechanism 60 is provided at the plate-shaped base 77 on the side of a front surface 77a thereof in a state in which the coupling plate part 61 is secured with a securing tool such as a bolt 64. A configuration of each part in the floating unit 20 will be described later.

[Configuration of Nut Runner Unit]

The nut runner unit 22 will be described with reference to FIGS. 4 to 8 and FIGS. 22 to 24. The nut runner unit 22 has a base support plate 81 that serves as a base part thereof and two nut runners 80 that are movably supported at the base support plate 81. The base support part 81 is a rectangular plate-shaped member with a plate thickness direction in the Y direction.

The nut runners 80 are electric nut runners (electric torque wrenches) using motors as a drive source. The nut runners 80 are configured in a linear shape as a whole and have, as rotation drive parts, engagement drive parts 80a configured with sockets or the like that are engaged with fastening tools such as bolts at end parts on one side thereof.

Each nut runner 80 is supported at the base support plate 81 with the lengthwise direction thereof caused to follow a predetermined direction (X direction). The two nut runners 80 are disposed to be parallel to each other at a predetermined interval therebetween in the up-down direction (Z direction). The upper and lower nut runners 80 correspond to the hinge parts 13 (see FIG. 3) provided at two upper and lower locations between the vehicle body 2 and the door 3 and are used to release the fastening of the hinge bolts 17. In other words, the nut runner 80 (80A) on the upper side is used to loosen the fastening of the hinge bolt 17 of the hinge part 13 (13A) on the upper side while the nut runner 80 (80B) on the lower side is used to loosen the fastening of the hinge bolt 17 of the hinge part 13 (13B) on the lower side.

Each nut runner 80 is provided at the base support plate 81 to be movable in the X direction and the Y direction via a predetermined moving mechanism. Also, the two nut runners 80 are relatively movably provided such that the interval therebetween in the Z direction changes. Specific description will be given below.

The nut runner 80A on the upper side is provided to be movable in the Y direction with an air cylinder 82 and is provided to be movable in the X direction with an electric cylinder 83. The air cylinder 82 has a rod that reciprocates relative to the cylinder body using air as a power and is secured to a secured support plate 84 that is parallel to the base support plate 81 with a side of the rod projecting from the cylinder body being directed outward (the left side in FIG. 24) in the Y direction. The secured support plate 84 is provided at the base support plate 81 to project upward from the base support plate 81 via a square columnar-shaped receiving member 85 provided on a plate surface on the outward side in the Y direction along an upper edge part of the base support plate 81.

An upper attachment plate 87 is provided on the outward side of the secured support plate 84 in the Y direction via a pair of ball spline mechanisms 86 disposed at a predetermined interval in the X direction. The ball spline mechanisms 86 are guide members that have tubular holding tubes 86a and spline shafts 86b that are inserted into the holding tubes 86a and are provided to be slidable relative to guide tubes with ball spline structures. The ball spline mechanisms 86 are provided in a state in which the holding tubes are caused to penetrate through the secured support plate 84 with the axial direction thereof directed in the Y direction, such that the holding tubes are secured to the secured support plate 84, and the spline shafts are secured to the upper attachment plate 87.

The upper attachment plate 87 is disposed to be parallel to the secured support plate 84, accepts coupling of the rod of the air cylinder 82, and is provided to reciprocate in the Y direction relative to the secured support plate 84 through operations of the air cylinder 82. The movement of the upper attachment plate 87 is guided by the pair of ball spline mechanisms 86.

The electric cylinder 83 using a motor as a drive source is attached to the upper attachment plate 87 on the outward side in the Y direction. The electric cylinder 83 has a rod 83a that reciprocates relative to the cylinder body through rotation drive of the motor and is secured to the upper attachment plate 87 with a side of the rod 83a projecting from the cylinder body being directed on the rear side (the right side in FIG. 23) in the X direction. The motor, and a transform mechanism to transform the rotation of the motor into linear reciprocating motion of the rod 83a, and the like are accommodated in the cylinder body of the electric cylinder 83. The electric cylinder 83 is connected to a control unit, which is not illustrated, and such a control unit controls operations of the motor to adjust the amount of movement of the rod 83a.

A transverse direction sliding mechanism part 88 with a sliding direction in the X direction is provided at a position of the upper attachment plate 87 below the electric cylinder 83. The transverse direction sliding mechanism part 88 has a linear-shaped linear guide 88a secured to the upper attachment plate 87 and a slider 88b that is slidably engaged with the linear guide 88a. An upper moving plate 89 that faces the upper attachment plate 87 is secured to the slider 88b.

The upper moving plate 89 has, on the rear side thereof in the X direction, a projecting piece part 89a projecting upward and causes the projecting piece part 89a to be coupled to the rod 83a of the electric cylinder 83 via a coupling member 90. Thus, the upper moving plate 89 moves in the X direction integrally with the slider 88b of the transverse direction sliding mechanism part 88 through an operation of the electric cylinder 83. The nut runner 80A on the upper side is secured to the upper moving plate 89 that moves in the X direction through the operation of the electric cylinder 83 in this manner. The nut runner 80A is supported at the plate surface of the upper moving plate 89 on the outward side in the Y direction at two locations in the lengthwise direction in a secured state with an attachment part 91 that includes two split elements 91a that have semicircular support surfaces and a bolt 91b that secure these split elements 91a to the upper moving plate 89.

The nut runner 80B on the lower side is supported at an up-down movement support plate 92 that is provided to be relatively movable in the Z direction with respect to the secured support plate 84 that supports the nut runner 80A on the upper side such that the nut runner 80B is movable in the X direction and the Y direction with a configuration similar to that of the nut runner 80A on the upper side.

The up-down movement support plate 92 is provided to move in the up-down direction through an operation of an electric cylinder 93 attached to the plate surface of the base support plate 81 on the outward side in the Y direction. The electric cylinder 93 includes a configuration similar to that of the electric cylinder 83, has a rod 93a that reciprocates relative to the cylinder body through rotation drive of a motor, and is secured to the upper attachment plate 87 with the side of the rod 93a projecting from the cylinder body being directed downward (the lower side in FIG. 23) in the Z direction. Note that the electric cylinder 93 accepts operation control performed by a control unit, which is not illustrated, similarly to the electric cylinder 83.

Longitudinal direction sliding mechanism parts 94 with a sliding direction in the Z direction are provided at positions of the base support plate 81 on both sides of the electric cylinder 93 in the X direction. The longitudinal direction sliding mechanism parts 94 have linear-shaped linear guides 94a secured to the base support plate 81 and sliders 94b slidably engaged with the linear guides 94a. The up-down movement support plate 92 is secured to the sliders 94b. Here, the up-down movement support plate 92 has, at an upper part thereof, a recessed part 92a for avoiding an interference with the electric cylinder 93, and each of upper end parts of projecting piece parts 92b that form the recessed part 92a from both sides thereof is caused to be secured to each of the sliders 94b.

The rod 93a of the electric cylinder 93 is coupled to substantially the center part in the up-down direction of the plate surface of the up-down movement support plate 92 on the inward side in the Y direction via a coupling member 95. In this manner, the up-down movement support plate 92 moves in the Z direction integrally with the siders 94b of the longitudinal direction sliding mechanism parts 94 through an operation of the electric cylinder 93. The nut runner 80B on the lower side is supported at a lower part of the up-down movement support plate 92 that moves in the Z direction through an operation of the electric cylinder 93 in this manner with a configuration similar to the support structure of the nut runner 80A on the upper side with respect to the secured support plate 84. In other words, the nut runner 80B on the lower side is provided at the up-down movement support plate 92 to be movable in the Y direction by the air cylinder 82 and to be movable in the X direction by the electric cylinder 83. Reference signs that are similar to those for the support structure of the nut runner 80A with respect to the secured support plate 84 will be applied to the support structure of the nut runner 80B with respect to the up-down movement support plate 92, and description thereof will be omitted.

The nut runner unit 22 is disposed on the outward side of the floating unit 20 in the Y direction and is attached to the support body part 70 of the floating unit 20. Specifically, a projecting piece part for attachment 96 projecting inward in the Y direction along the front edge part of the base support plate 81 is provided at the nut runner unit 22 on the inward side of the base support plate 81 in the Y direction. The projecting piece part for attachment 96 is provided by a columnar-shaped member being secured to the base support plate 81.

On the other hand, an attached part 97 projecting forward along the edge part of the plate-shaped base 77 on the outward side in the Y direction is provided at the floating unit 20 in front of the plate-shaped base 77 of the support body part 70. The attached part 97 is provided by a columnar-shaped member being secured to the plate-shaped base 77 with a bolt 97b. The nut runner unit 22 is secured to the plate-shaped base 77 with bolts 98 or the like that penetrate through the projecting piece part for attachment 96 with the projecting piece part for attachment 96 superimposed from the front side on the attached part 97 on the side of the floating unit 20. Therefore, a plurality of bolt holes 96a and 97a through which the bolts 98 are caused to penetrate or into which the bolts 98 are screw-inserted are formed in the projecting piece part for attachment 96 and the attached part 97. In this manner, the nut runner unit 22 is secured to and supported at the floating unit 20 and moves integrally with the floating unit 20 through an operation of the robot 4.

The nut runner unit 22 provided with the configuration as described above has a configuration including the base support plate 81 and the projecting piece part for attachment 96 as attachment bases to be attached to the floating unit 20. Also, each nut runner 80 functions as a fastening release device that is movably supported at the attachment base, is engaged with the hinge bolt 17, which is a fastening component to support the door 3 at the vehicle body 2, and releases fastening of the hinge bolt 17. The hinge bolt 17, the fastening of which has been released, is detached from the door front-side wall part 3d of the door 3 through an operation of the nut runner 80.

[Configuration of Door Opening Arm]

The door opening arm 23 will be described with reference to FIGS. 4 to 8 and FIGS. 25 to 29. The door opening arm 23 is configured into a bar shape as a whole and has a linear-shaped frame body part 101 configured with an aluminum frame or the like and a door locking part 102 provided at an end part of the frame body part 101 on one side. The door opening arm 23 is attached to the floating unit 20 and moves integrally with the floating unit 20 through an operation of the robot 4. In other words, the door detaching device 1 causes the door locking part 102 of the door opening arm 23 to be locked at a predetermined portion of the door 3 in the closed state through an operation of the robot 4 and opens the door 3 up to a predetermined opened position in the form in which the door 3 is pulled by the door opening arm 23 through a door opening operation of the robot 4. Note that for the door opening arm 23, the lengthwise direction (the left-right direction in FIG. 26) of the frame body part 101 is defined as a front-back direction, the side on which the door locking part 102 is disposed at the frame body part 101 (the left side in FIG. 26) is defined as a front side, and the opposite side thereof (the right side in FIG. 26) is defined as a rear side.

The door locking part 102 has a locking element 103 with a substantially cylindrical shape with a center axis direction in the up-down direction. The locking element 103 has a locking pad 104 that occupies the most part thereof on the lower side and a support plate part 105 that forms the upper part of the locking element 103 and supports the locking pad 104. The locking pad 104 is made of an elastic member such as rubber or sponge, for example, and has a lower end surface serving as a locking surface 104a. A predetermined uneven shape is formed on the locking surface 104a. The uneven shape of the locking surface 104a is formed by a group of quadrangular pyramid-shaped projecting parts orderly aligned, for example. The locking pad 104 is secured to the support plate part 105 with a bolt 104b penetrating through the locking pad 104 in the up-down direction.

Figure 29:
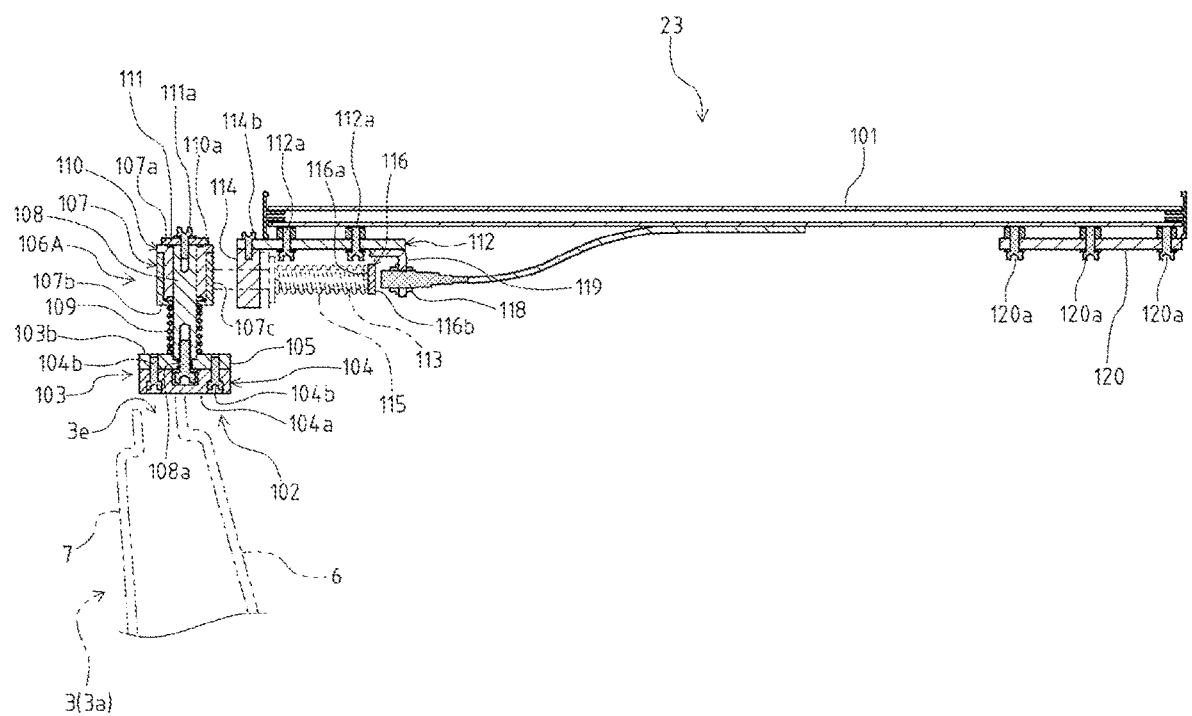
FIG. 29 is an end view of a part cut along the line I-I in FIG. 26.
Figure 30:
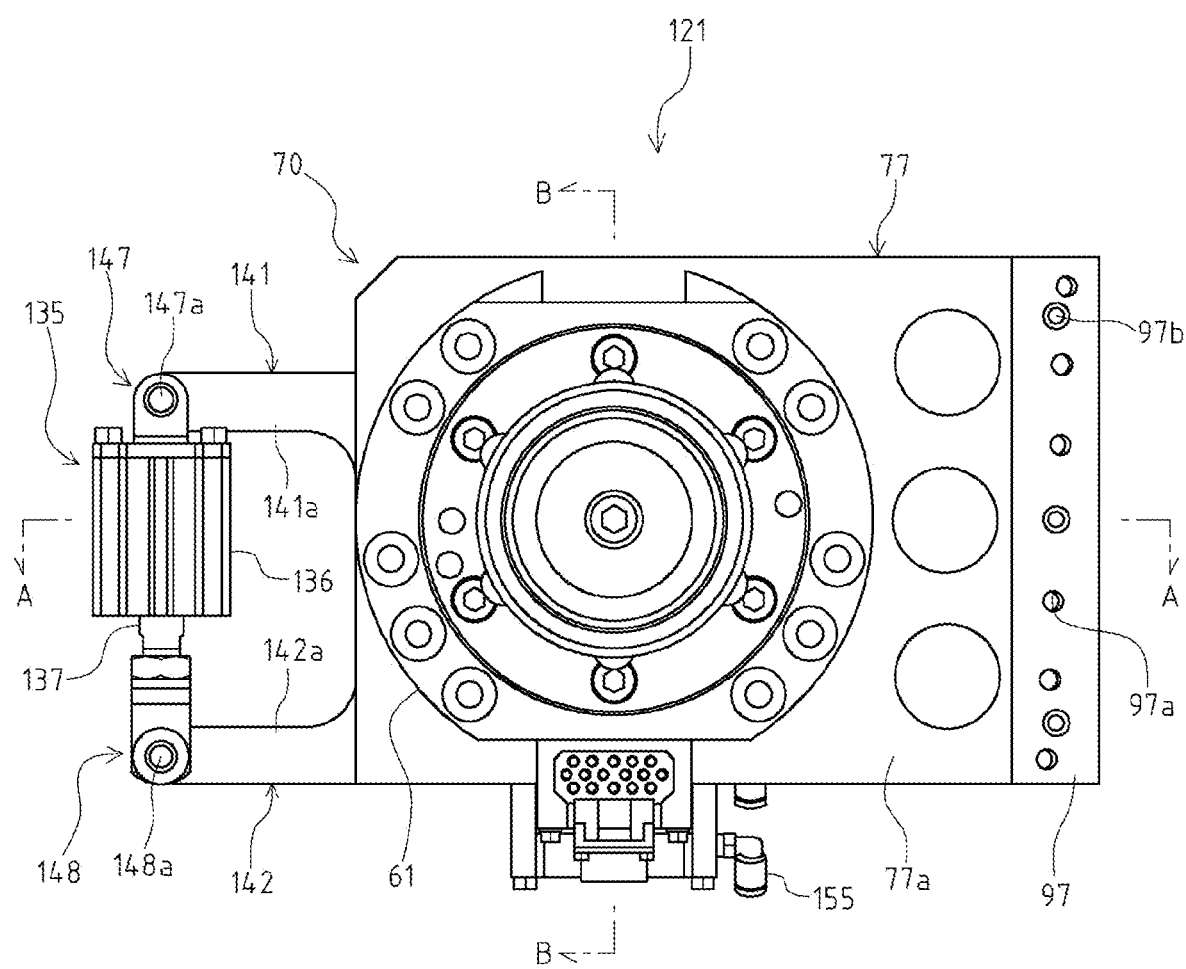
FIG. 30 is a front view of a first subunit according to the embodiment of the present invention.
Figure 31:
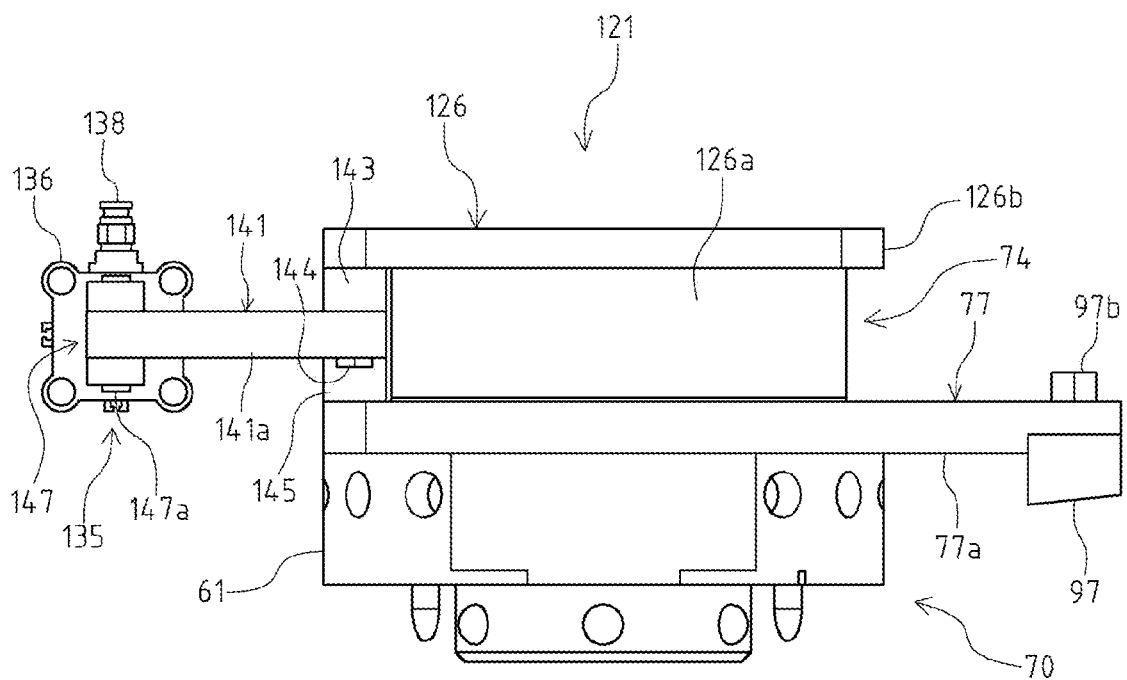
FIG. 31 is a plan view of the first subunit according to the embodiment of the present invention.
Figure 32:
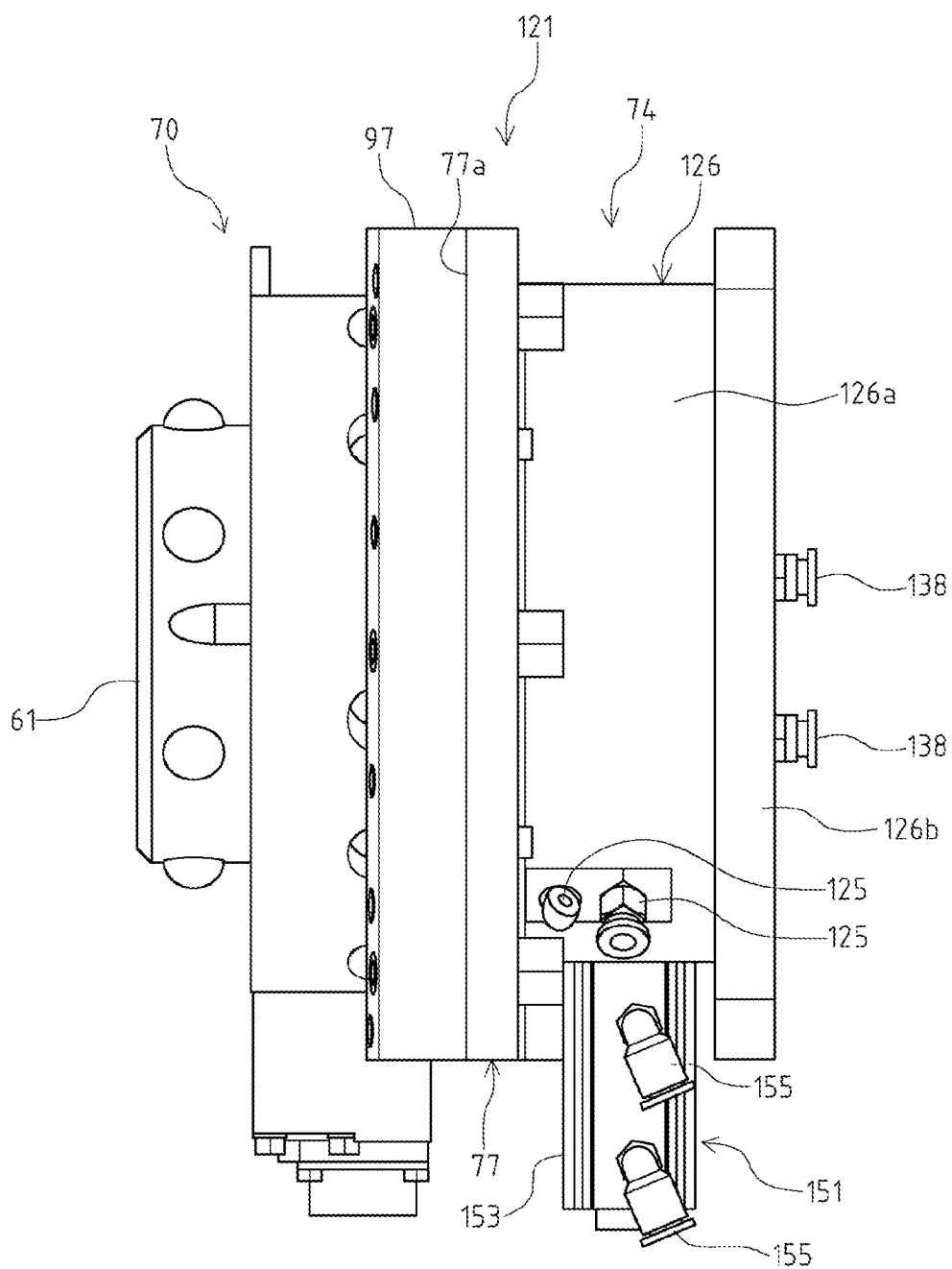
FIG. 32 is a side view of the first subunit according to the embodiment of the present invention.
Figure 33:
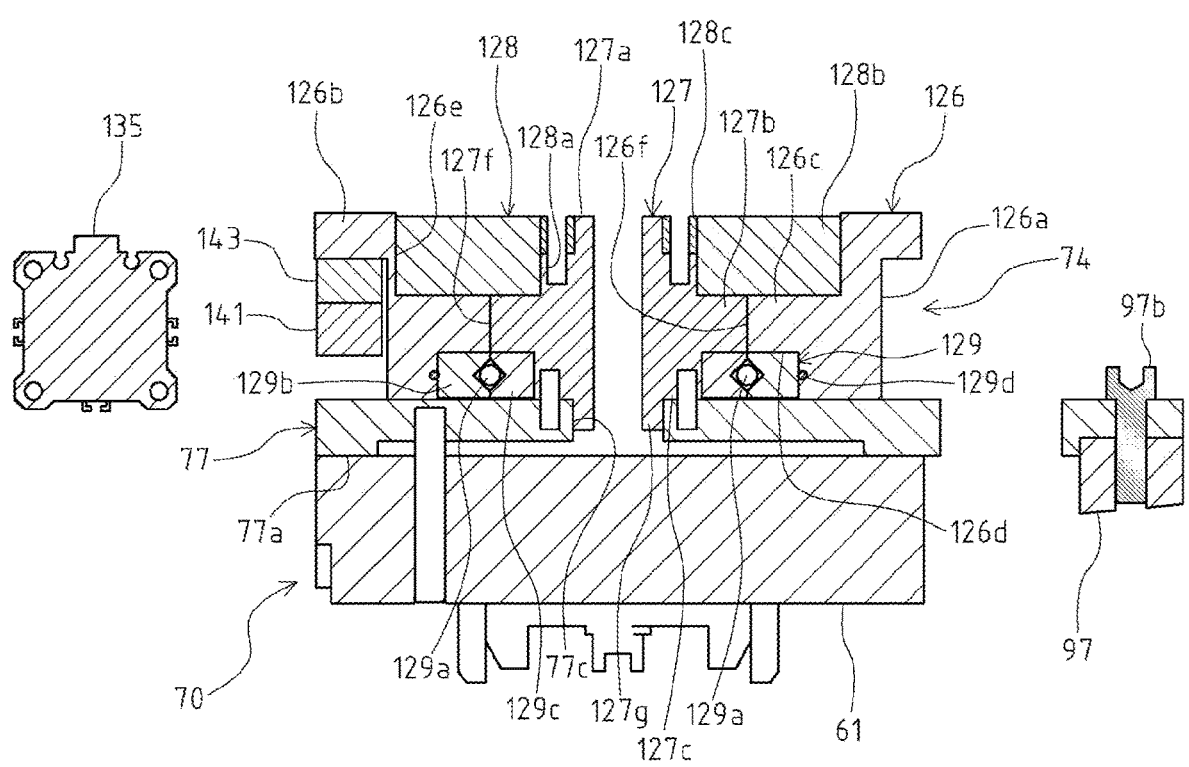
FIG. 33 is an end view of a part cut along the line A-A in FIG. 30.
Figure 34:
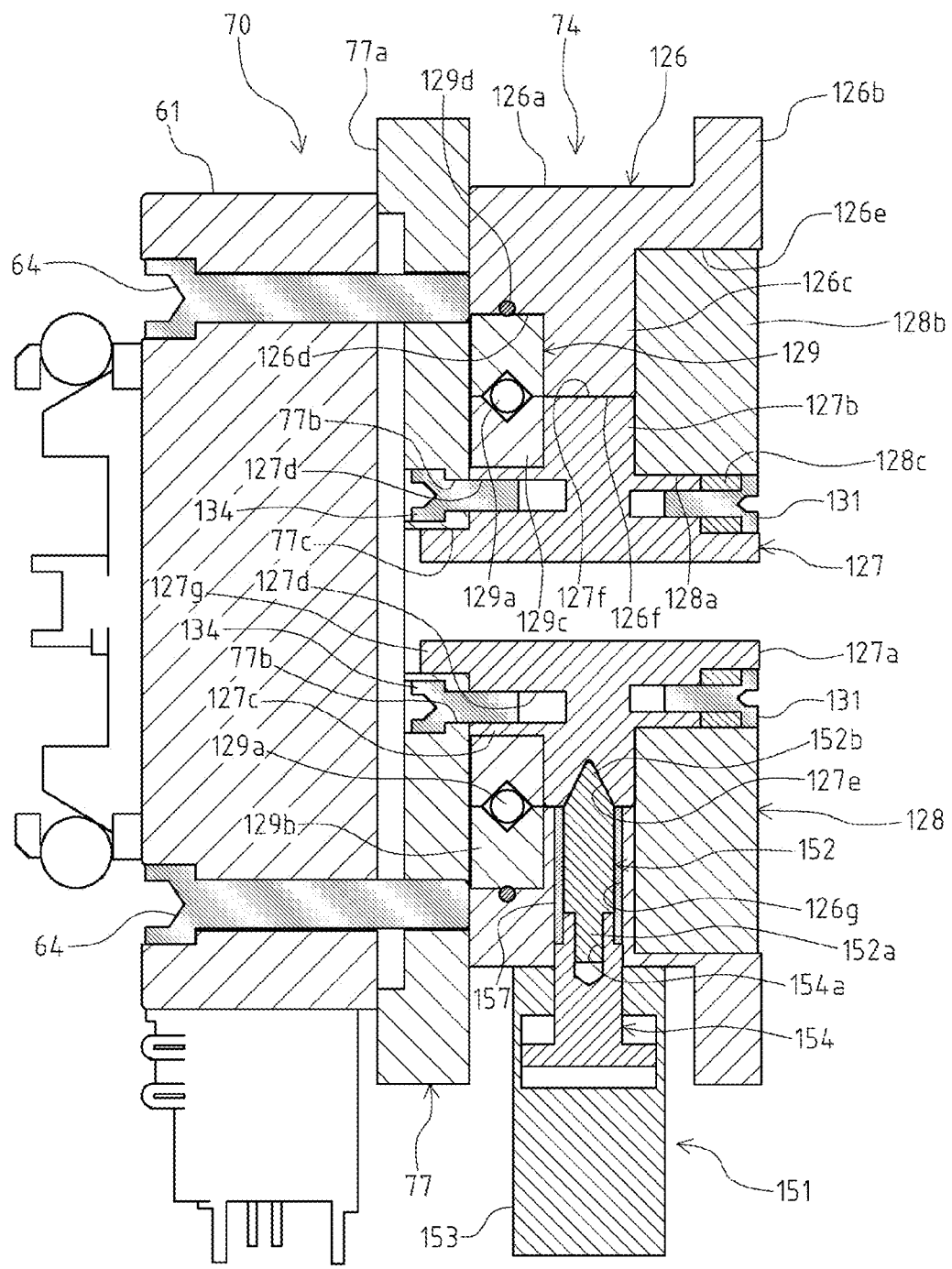
FIG. 34 is an end view of a part cut along the line B-B in FIG. 30.
Figure 35:
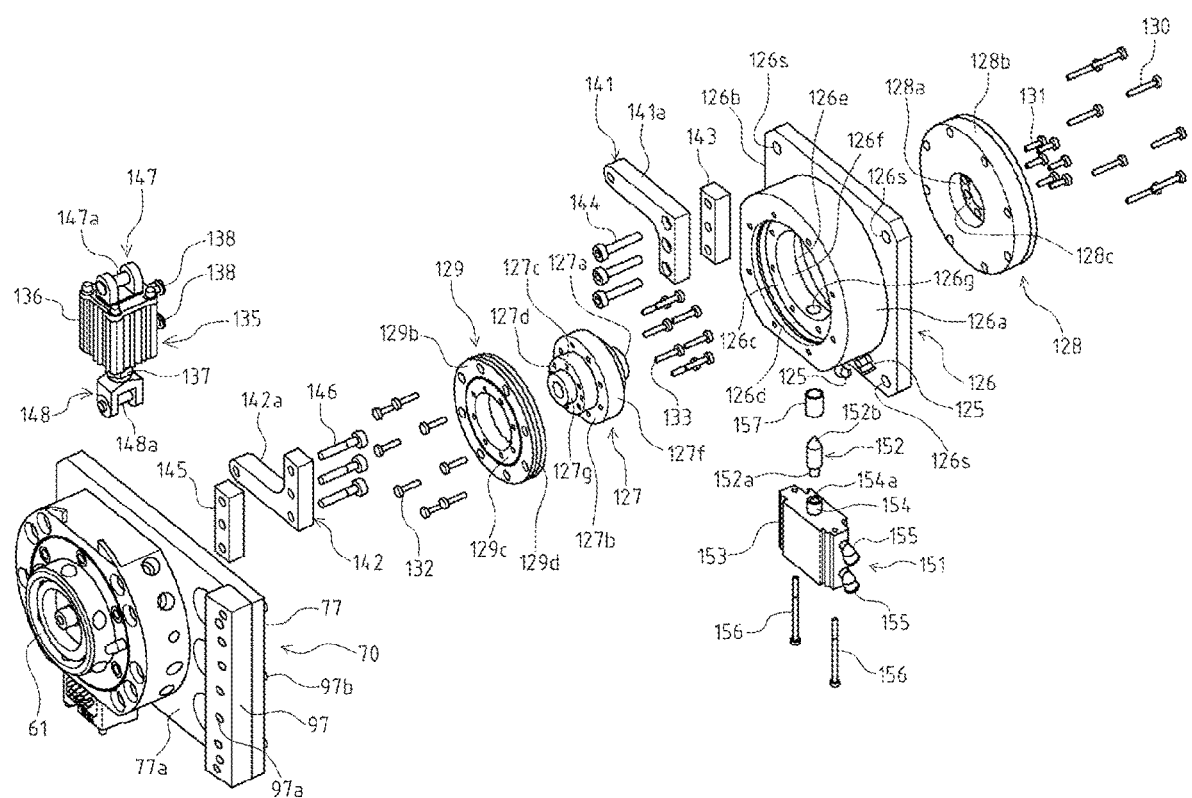
FIG. 35 is a partially exploded perspective view of the first subunit according to the embodiment of the present invention.
Figure 36:
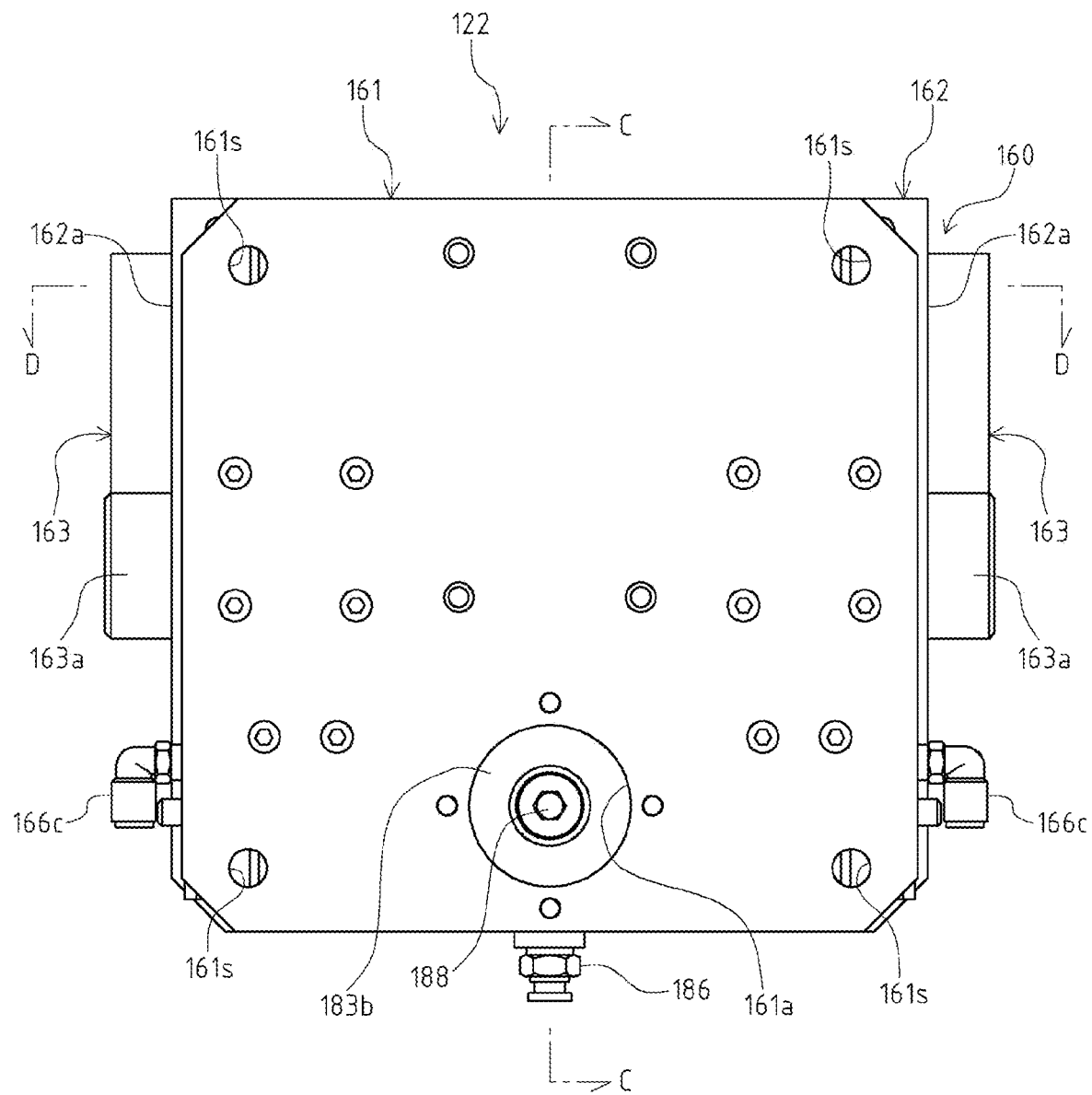
FIG. 36 is a front view of a second subunit according to the embodiment of the present invention.
Figure 37:
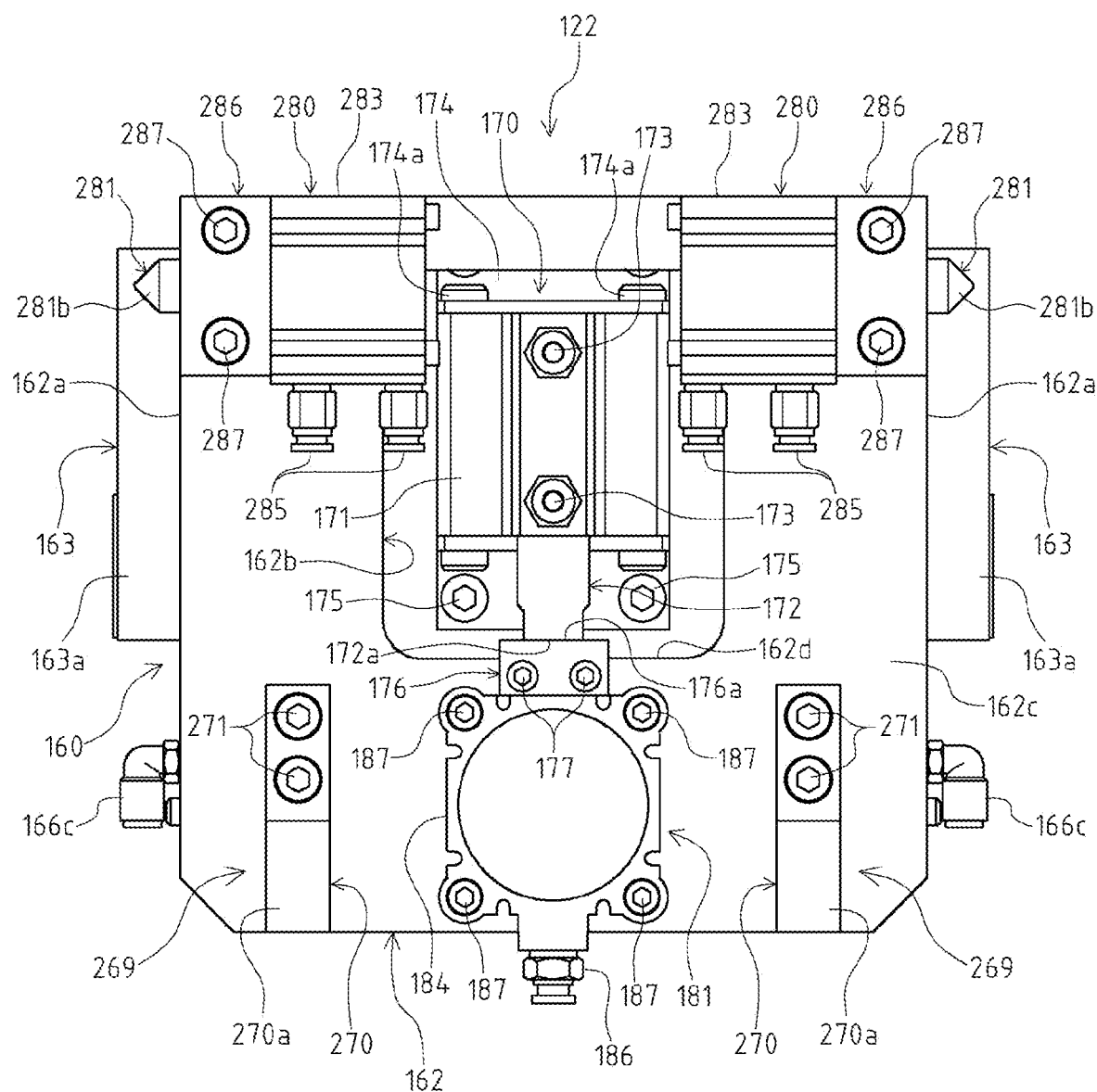
FIG. 37 is a rear view of the second subunit according to the embodiment of the present invention.
Figure 38:
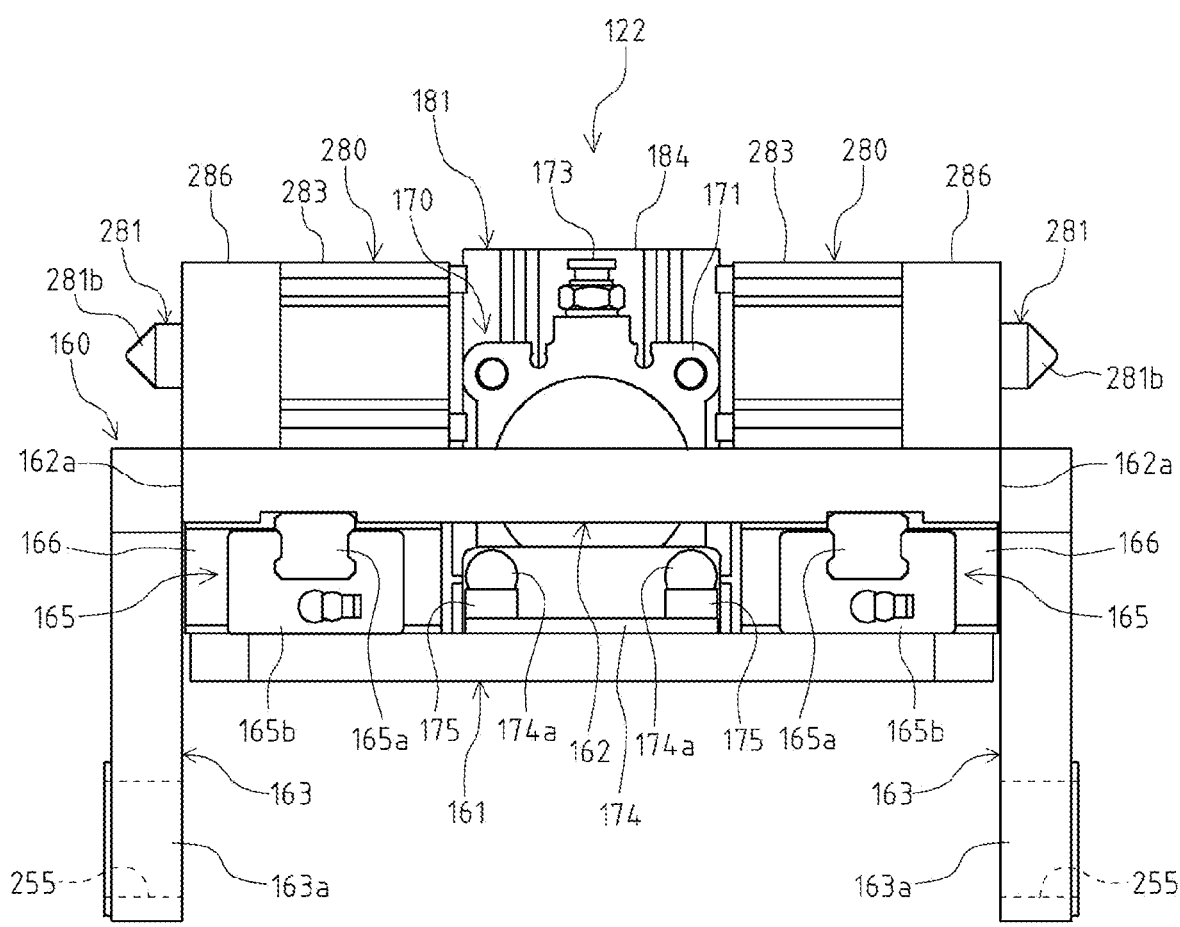
FIG. 38 is a plan view of the second subunit according to the embodiment of the present invention.
Figure 39:
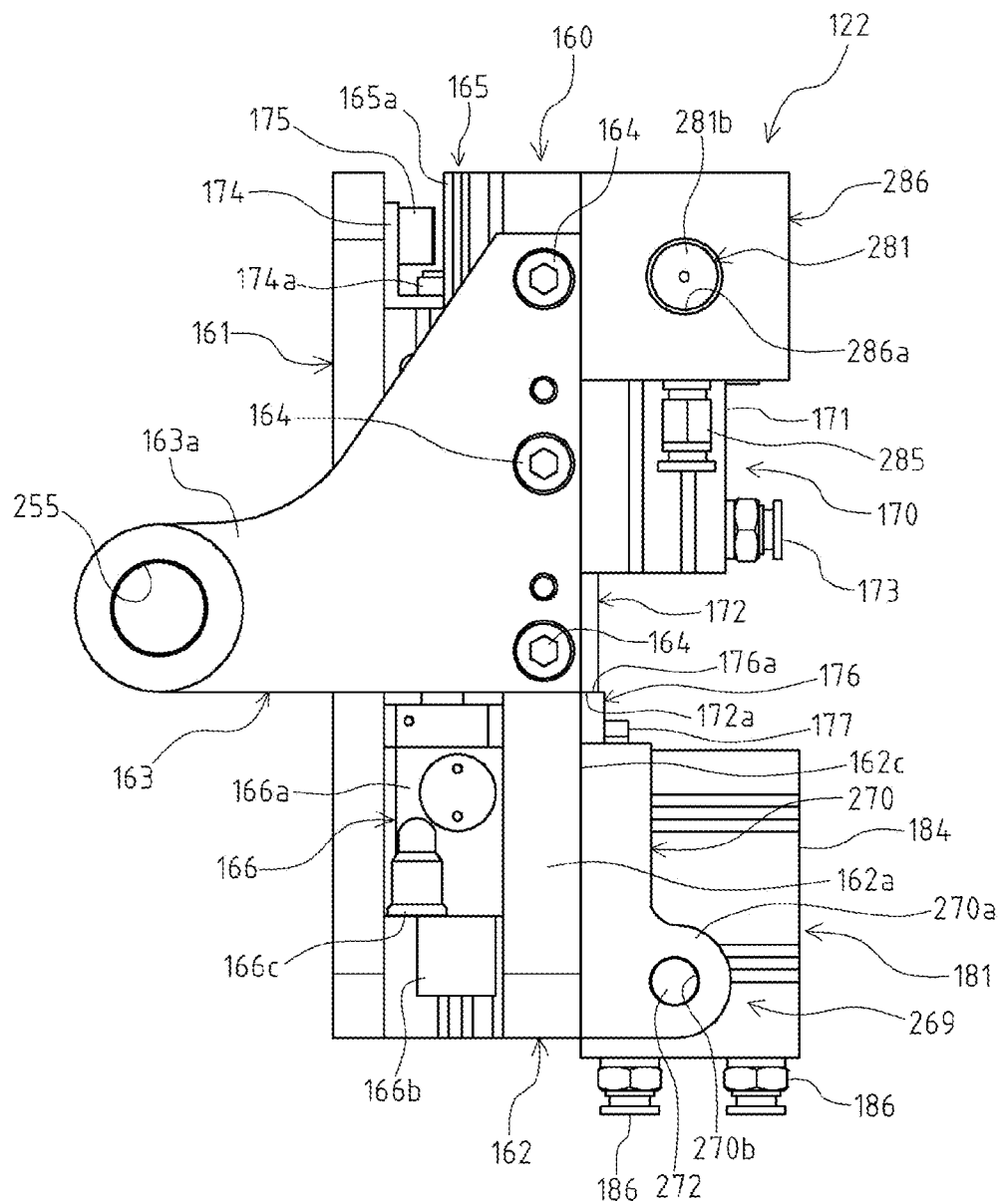
FIG. 39 is a side view of the second subunit according to the embodiment of the present invention.
Figure 40:
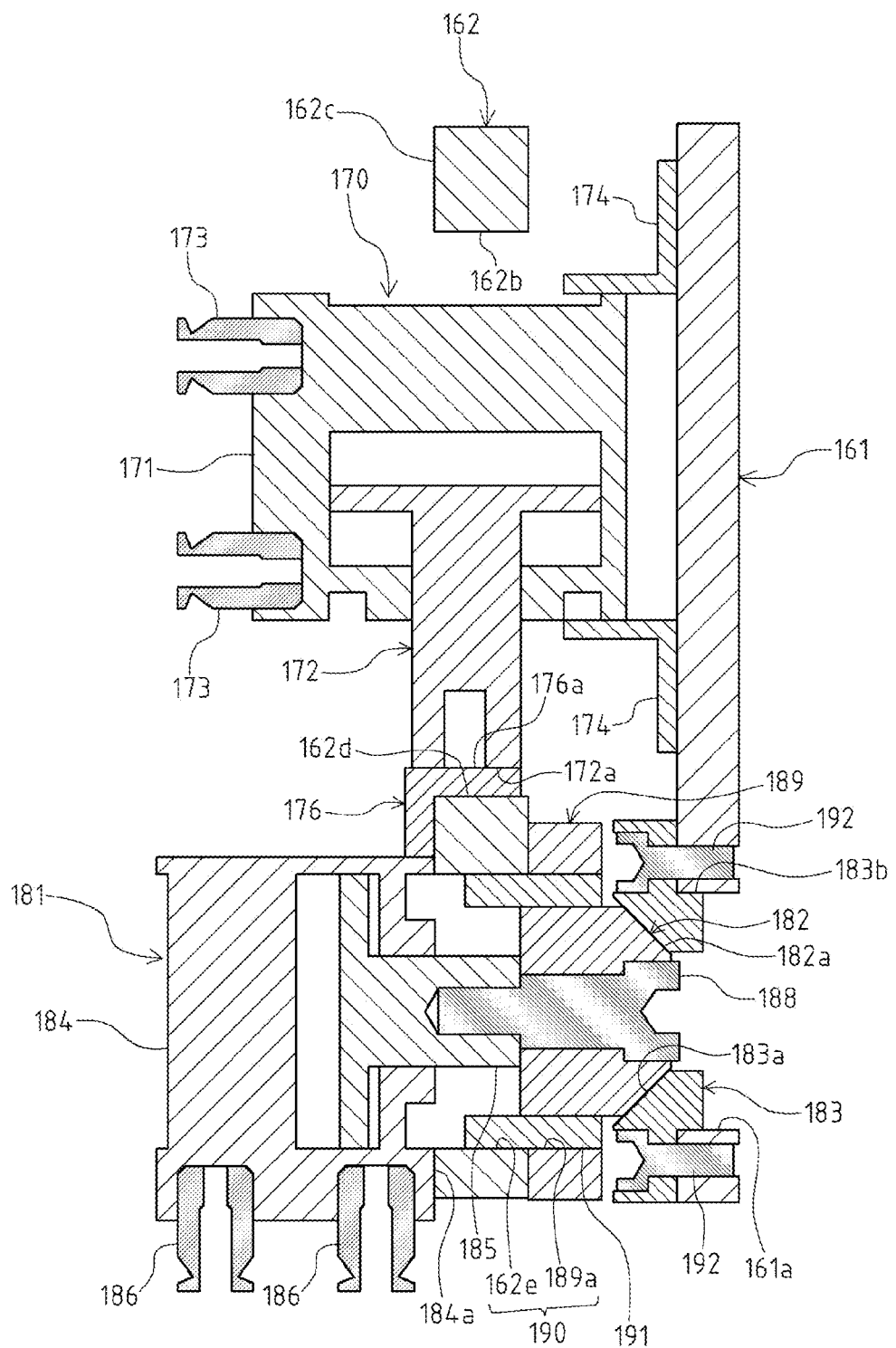
FIG. 40 is an end view of a part cut along the line C-C in FIG. 36.
Figure 41:
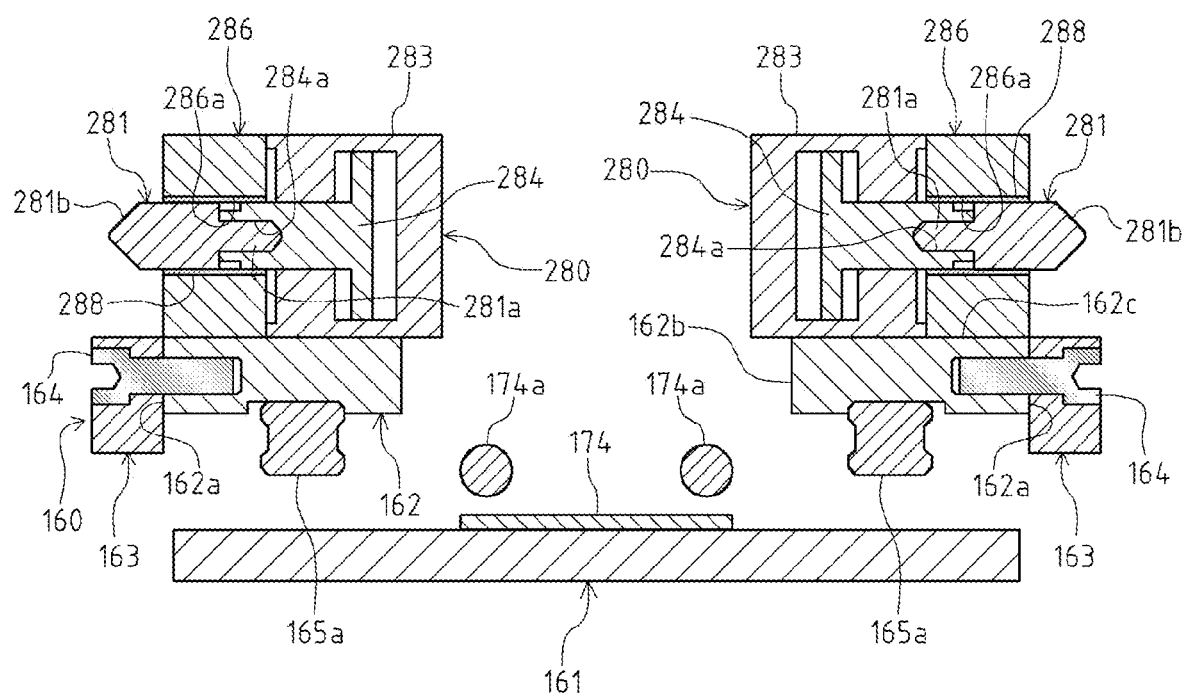
FIG. 41 is an end view of a part cut along the line D-D in FIG. 36.
Figure 42:
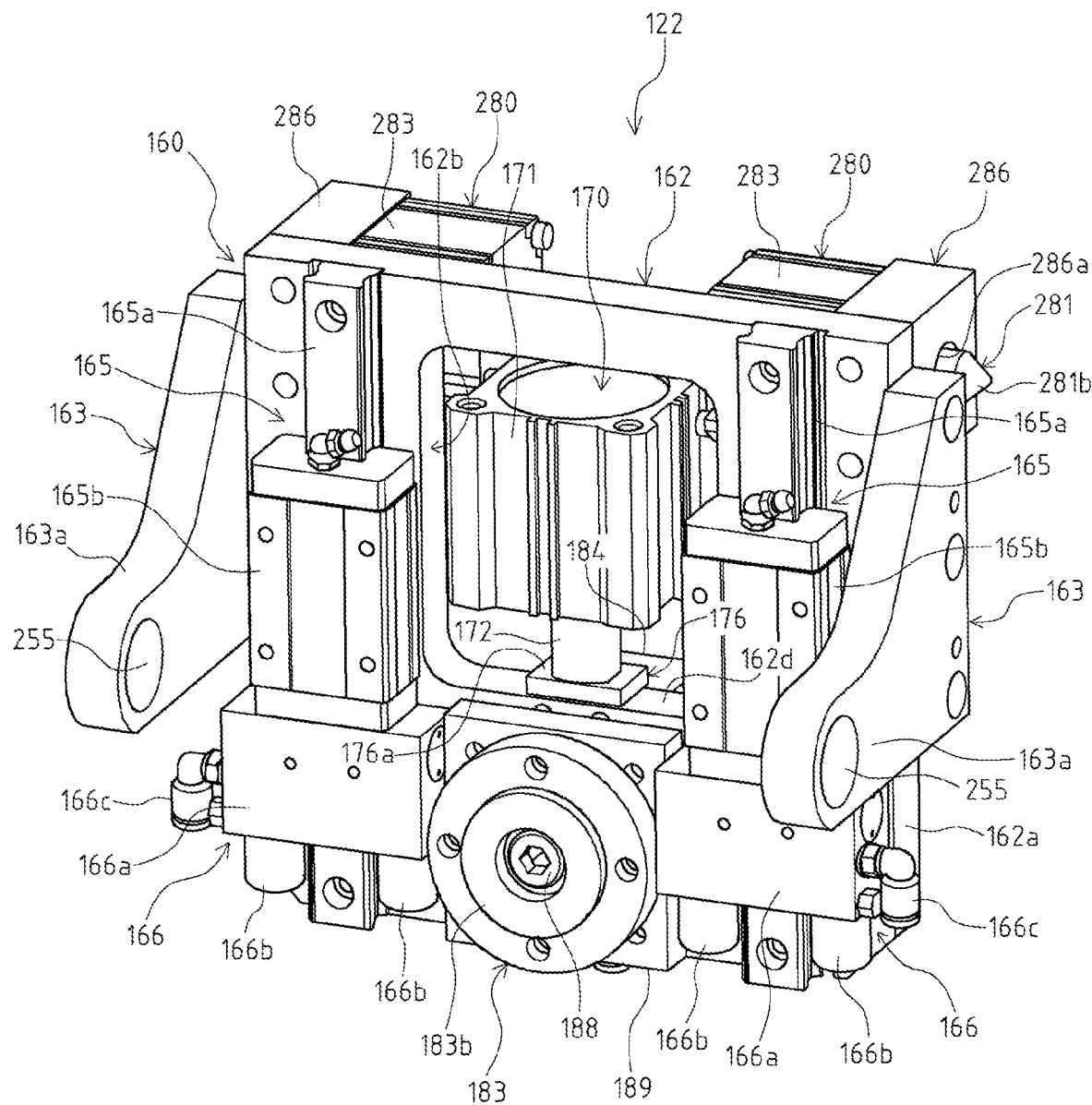
FIG. 42 is a front-side perspective view of the second subunit according to the embodiment of the present invention.
Figure 43:
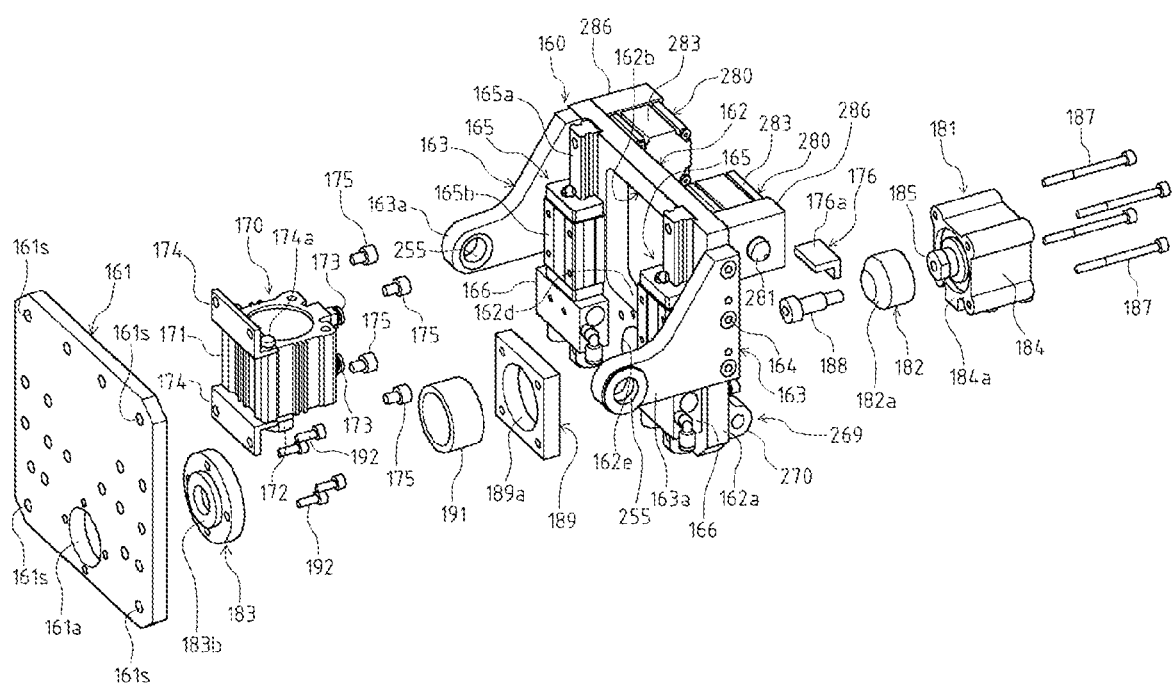
FIG. 43 is a partially exploded perspective view of the second subunit according to the embodiment of the present invention.
Figure 44:
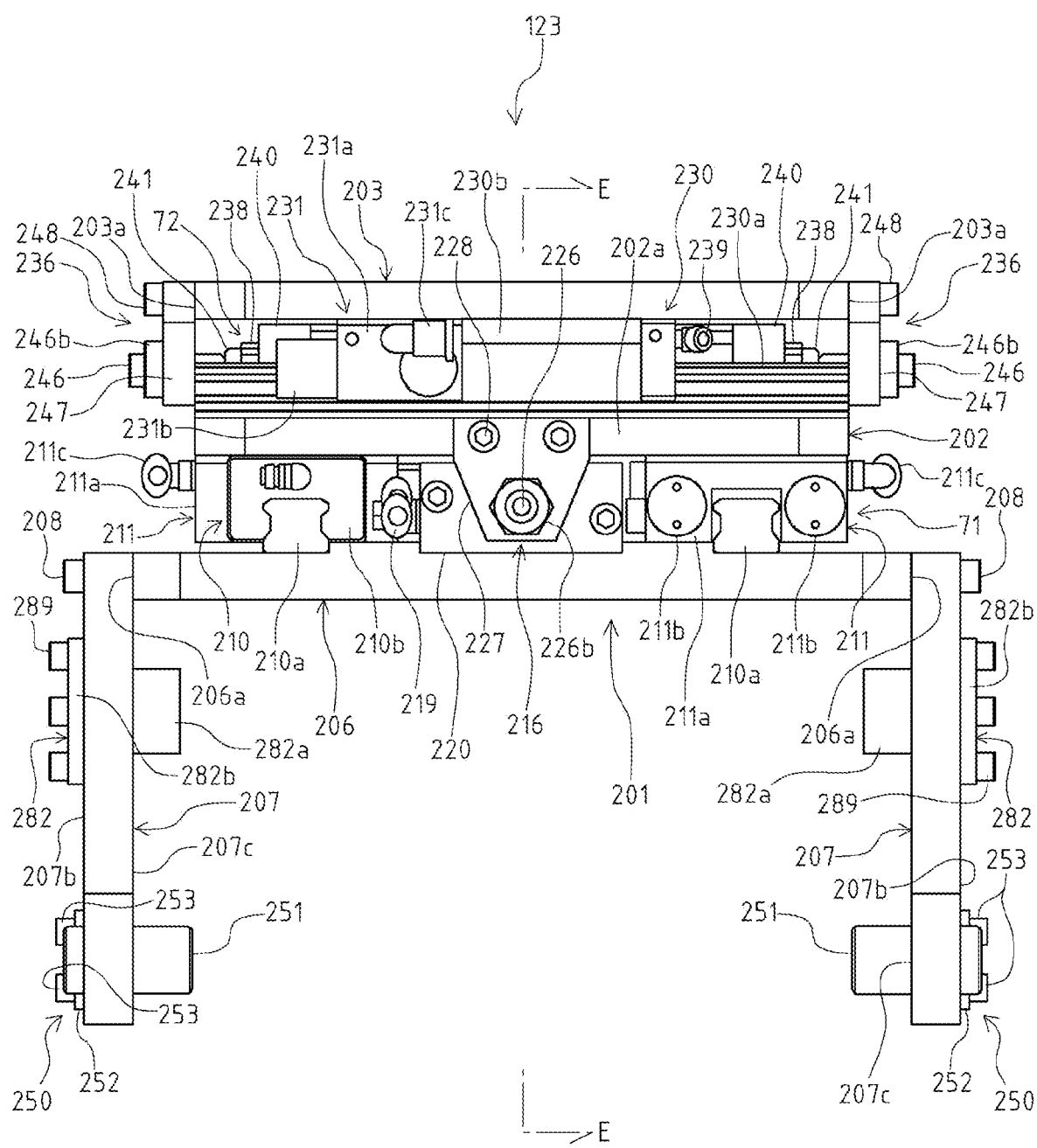
FIG. 44 is a front view of a third subunit according to the embodiment of the present invention.
Figure 45:
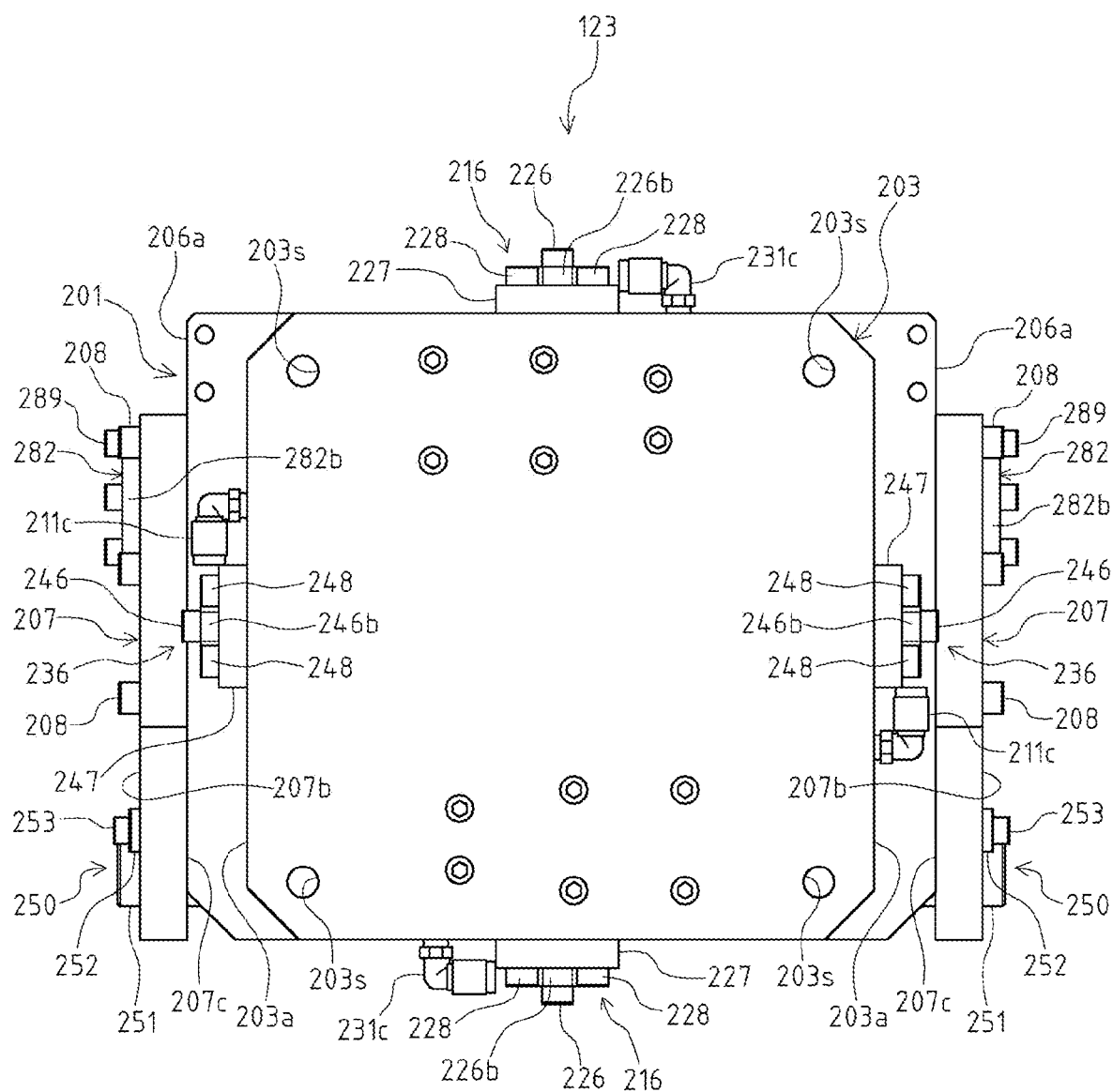
FIG. 45 is a plan view of the third subunit according to the embodiment of the present invention.
Figure 46:
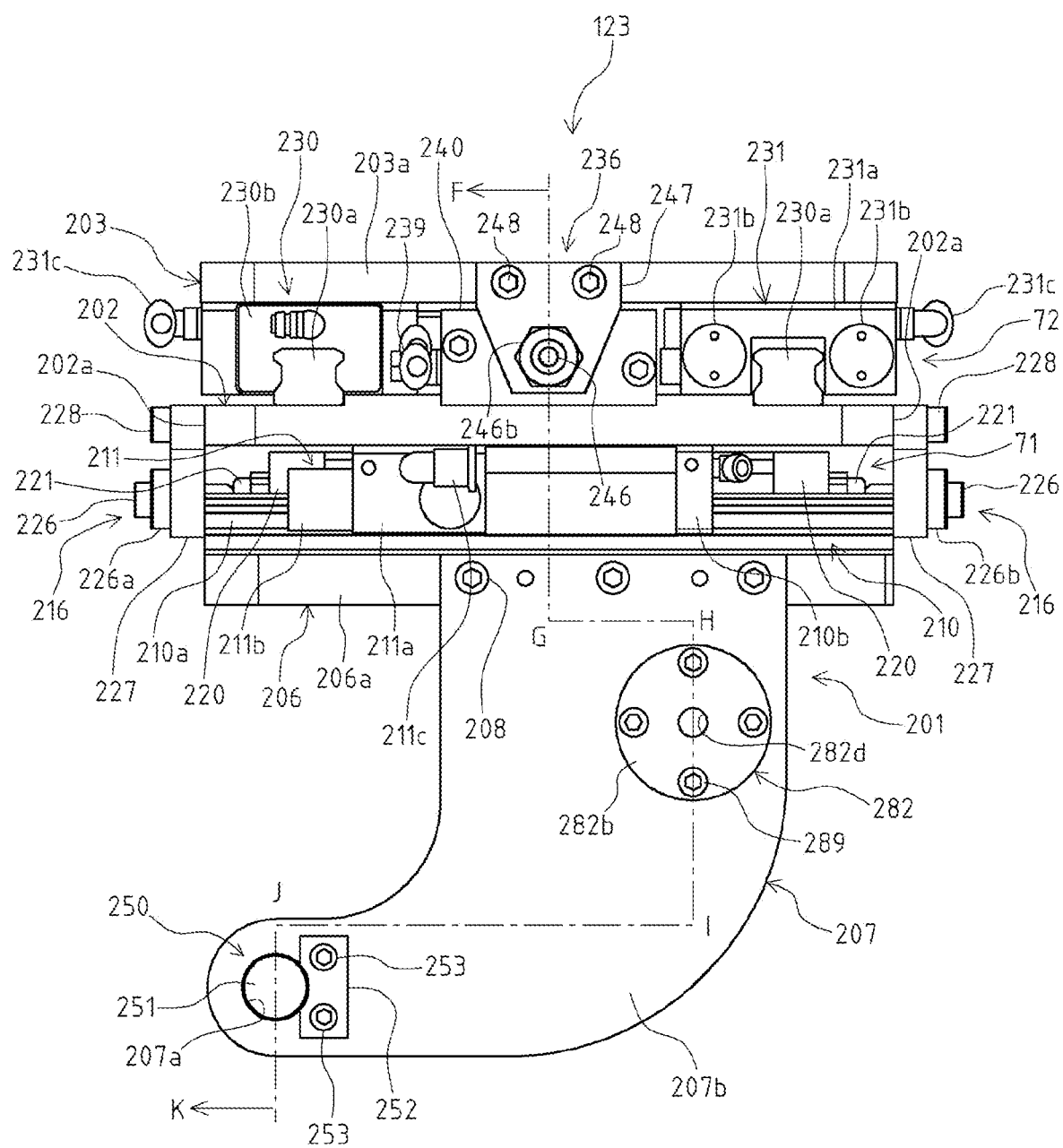
FIG. 46 is a side view of the third subunit according to the embodiment of the present invention.
Figure 47:
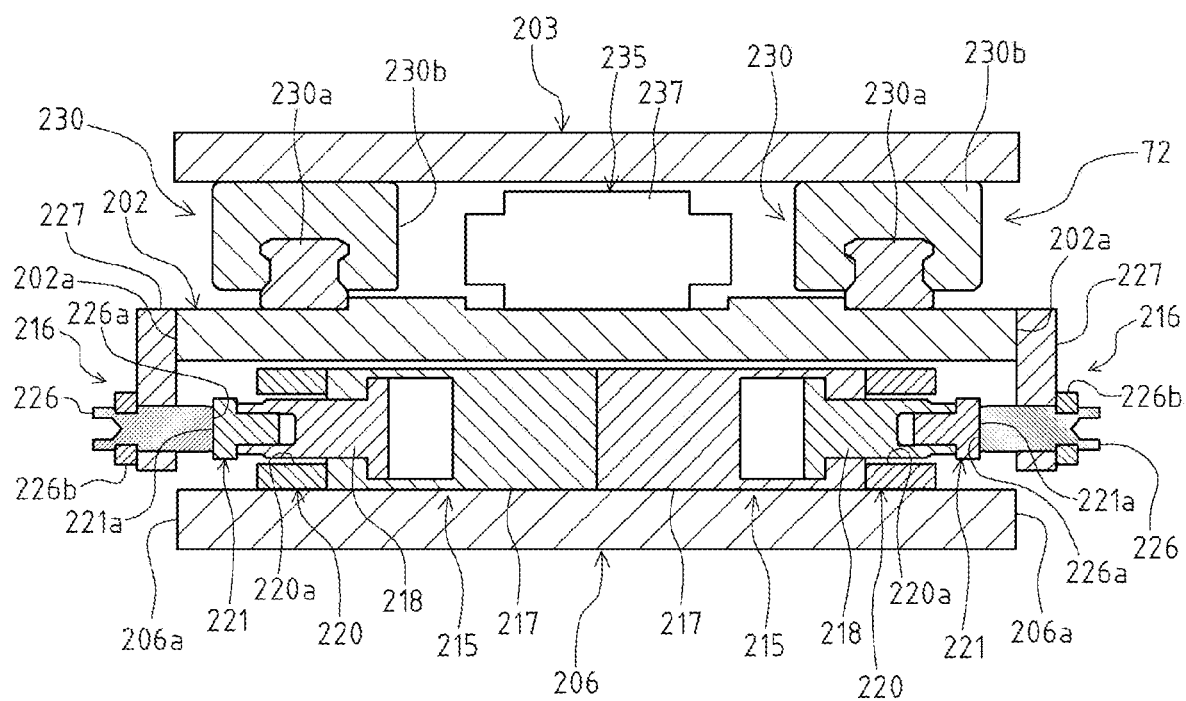
FIG. 47 is an end view of a part cut along the line E-E in FIG. 44.

The door locking part 102 brings the locking element 103 into contact with an opening part 3e opened upward along the upper edge of the door body part 3a and is brought into a state in which the door locking part 102 is locked at the door 3. The locking element 103 is locked at the door 3 through the uneven shape of the locking surface 104a and the elastic deformation of the locking pad 104 by the locking pad 104 being caused to come into contact or pressure contact with the opening part 3a of the door 3 from the upper side. The opening part 3e is formed by the door outer panel 6 and the door inner panel 7 and serves as an opening through which a window glass appears. Note that FIG. 29 illustrates a state in which the locking element 103 brings the locking pad 104 into contact with the upper edge of the door outer panel 6 forming the opening part 3e.

The locking element 103 is attached to the frame body part 101 on one end side via an up-down direction elastic support mechanism part 106A and a transverse direction elastic support mechanism part 106B.

The up-down direction elastic support mechanism part 106A has a block-shaped support base 107 provided above the locking element 103, an up-down support shaft 108 that is a linear shaft penetrating through the support base 107 in the up-down direction and supporting the locking element 103 on the lower side, and a coil spring 109 that biases the locking element 103 downward relative to the support base 107.

The support base 107 is provided at a front lower position of the distal end part of the frame body part 101 and has an upper surface 107a and a lower surface 107b, both of which have horizontal surface shapes. The up-down support shaft 108 is supported at the support base 107 to be movable in the up-down direction via a substantially cylindrical linear bushing 110. The linear bushing 110 has a rectangular flange part 110a on one side in a tubular axis direction, is inserted and fitted into the center part of the support base 107 with a tubular axis direction in the up-down direction, and is secured to the support base 107 with a bolt 110b penetrating through the flange part 110a in a state in which the flange part 110a is positioned above the upper surface 107a of the support base 107.

The up-down support shaft 108 is secured to the support plate part 105 with the bolt 108a penetrating through the support plate part 105 of the locking element 103 from the lower side and extends upward coaxially with the cylindrical locking element 103. A locking plate 111 formed by a disk-shaped washer for locking the up-down support shaft 108 at the support base 107 is provided at the upper end part of the up-down support shaft 108. The locking plate 111 is secured to the up-down support shaft 108 with a bolt 111a penetrating through the locking plate 111 and screw-inserted into the up-down support shaft 108 from the upper side. The locking plate 111 causes the up-down support shaft 108 to be locked at the support base 107 by coming into contact with the upper surface 107a of the support base 107.

The coil spring 109 is interposed between the locking element 103 and the support base 107 in a state in which the up-down support shaft 108 is caused to penetrate therethrough. The coil spring 109 causes the lower end to abut on an upper surface 103b of the locking element 103 that is an upper surface of the support plate part 105 and causes the upper end to abut on the lower surface 107b of the support base 107 in a state in which the up-down support shaft 108 penetrates the coil spring 109. The coil spring 109 biases the locking element 103 downward relative to the support base 107 with an elastic force thereof.

The transverse direction elastic support mechanism part 106B has a support plate 112 secured below an end part of the frame body part 101 on one side, two transverse direction support shafts 113 that support the support base 107, a support block 114 that supports the support shafts 113 at the support plate 112, and coil springs 115 that bias the support base 107 via the transverse direction support shafts 113.

The support plate 112 is an oblong rectangular member with a wider width than the frame body part 101, projects on one side thereof in the lengthwise direction from the frame body part 101 on one end side (the distal end side), and is secured below the frame body part 101 with a bolt 112a. The transverse direction support shafts 113 are secured to the support base 107 with the front end sides thereof fastened to the support base 107 with bolts or the like with an axial direction in the lengthwise direction of the frame body part 101. The two transverse direction support shafts 113 are disposed at the door opening arm 23 side by side in a symmetric manner with respect to the direction that perpendicularly intersects the lengthwise direction of the frame body part 101 in a plan view (the up-down direction in FIG. 26).

Each of the two transverse direction support shafts 113 is secured on the rear end side thereof to a common detection plate 116 with bolts 116c. The detection plate 116 is a rectangular plate-shaped member and is provided in a form in which the detection plate 116 are bridged between the two transverse direction support shafts 113. The detection plate 116 has a front surface 116a that is a plate surface on the side of the transverse direction support shafts 113 and a rear surface 116b that is a plate surface on the opposite side thereof.

The support block 114 has a rectangular thick plate-shaped outer shape and has support holes 114a that allow the two transverse direction support shafts 113 to penetrate therethrough and support the transverse direction support shafts 113. The support block 114 is secured below a portion projecting from the frame body part 101 of the support plate 112 with a bolt 114b. The support block 114 causes the support base 107 to be positioned on the front lateral side and supports the transverse direction support shafts 113 to be movable in the axial direction thereof via substantially cylindrical linear bushings 117 that is inserted and fitted into the support holes 114a and allows the transverse direction support shafts 113 to be inserted therethrough. The linear bushings 117 have rectangular flange parts on one side (rear side) in the tubular axis direction, penetrate through the support block 114 with the tubular axis direction in the lengthwise direction of the frame body part 101, and are secured to the support block 114 with bolts penetrating through the flange part in a state in which the flange part is positioned behind the support block 114. The linear bushings 117 cause the front parts thereof to project forward from the support block 114 and cause the front end surfaces thereof to abut on a rear surface 107c of the support base 107.

Each coil spring 115 is interposed between a rear surface 117b of the linear bushing 117 that allows the transverse direction support shaft 113 to penetrate therethrough and causes the flange part to be exposed behind the support block 114 and a front surface 116a of the detection plate 116. The coil spring 115 biases the up-down direction elastic support mechanism part 106A and an integral configuration including the locking element 103 and the two transverse direction support shafts 113 backward (the right side in FIG. 27) relative to the support block 114 with an elastic force thereof.

With such a configuration, the locking element 103 is elastically and movably supported in a state in which the locking element 103 is biased in each direction of the up-down direction and the transverse direction (front-back direction) by the up-down direction elastic support mechanism part 106A and the transverse direction elastic support mechanism part 106B relative to the frame body part 101. Also, the up-down direction elastic support mechanism part 106A and the integral configuration including the locking element 103 and the two transverse direction support shafts 113 relatively move with respect to the frame body part 101 against a biasing force of the coil springs by the frame body part 101 being pulled through an operation of the robot 4 in a state in which the locking element 103 is locked at the door 3. Note that the backward movement of the aforementioned integral configuration relative to the frame body part 101 is restricted in a state in which the support base 107 abuts on the linear bushing 117 projecting in front of the support block 114.

Also, the door opening arm 23 is provided with a sensor 118 for detecting the position of the locking element 103. The sensor 118 is a proximity sensor that detects presence/absence of magnetic metal, for example. The sensor 118 is supported and secured below the rear end part of the support plate 112 via a stay 119 that is an L-shaped metal tool with a detection surface thereof caused to face the rear surface 106b of the detection plate 116. The sensor 118 detects that the integral configuration including the locking element 103 is at an initial position (rear end position) in the front-back direction and the like via the detection plate 106. The sensor 118 is connected to a control unit, which is not illustrated, and a detection signal of the sensor 118 is appropriately used for operation control of the door detaching device 1.

The door opening arm 23 is secured to an attachment plate 28 of the rotation support unit 25 attached above the floating unit 20 with an attachment plate 120 provided below the rear end part of the frame body part 101. The attachment plate 120 is an oblong rectangular member with a wider width than the frame body part 101 and is secured below the frame body part 101 with a bolt 120a with one side thereof in the widthwise direction caused to project from one side of the rear end part of the frame body part 101 in the width direction.

The door opening arm 23 is disposed in front of and above the floating unit 20 in an orientation with the Y direction in the lengthwise direction of the frame body part 101. The door opening arm 23 is provided to extend outward (the right side in FIG. 5) in the Y direction from the floating unit 20 by the portion of the attachment plate 120 projecting from the frame body part 101 being secured with a bolt or the like along an edge part of the attachment plate 28 on the front side.

As described above, the door opening arm 23 according to the present embodiment has the door locking part 102 that serves as a locking part with respect to the door 3 and functions as a door opening device that opens the door 3 by moving along with the floating unit 20 in a state in which the door locking part 102 is locked at the predetermined portion of the door 3. Note that although the door opening arm 23 is secured to the attachment plate 28 of the rotation support unit 25 in the present embodiment, the door opening arm 23 may be secured to a member configuring the floating unit 20.

[Details of Configuration of Floating Unit]

Hereinafter, details of a configuration of the floating unit 20 will be described with reference to FIGS. 18 to 21 and FIGS. 30 to 58. In the floating unit 20, a plurality of subunits are configured by a plurality of shift mechanism parts and rotation mechanism parts included in the floating unit 20.

Figure 21:
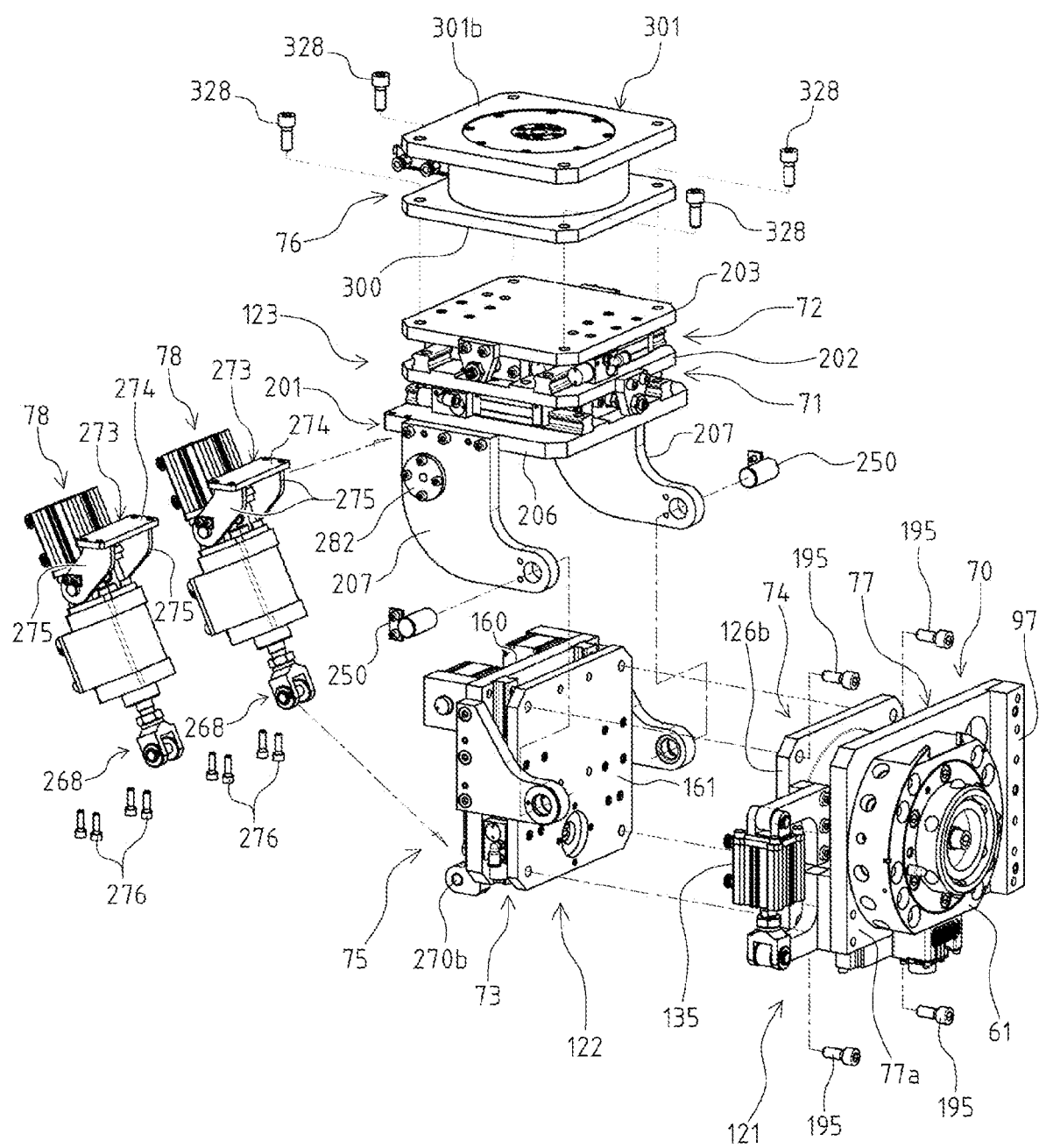
FIG. 21 is an exploded perspective view illustrating the floating unit according to the embodiment of the present invention.
Figure 22:
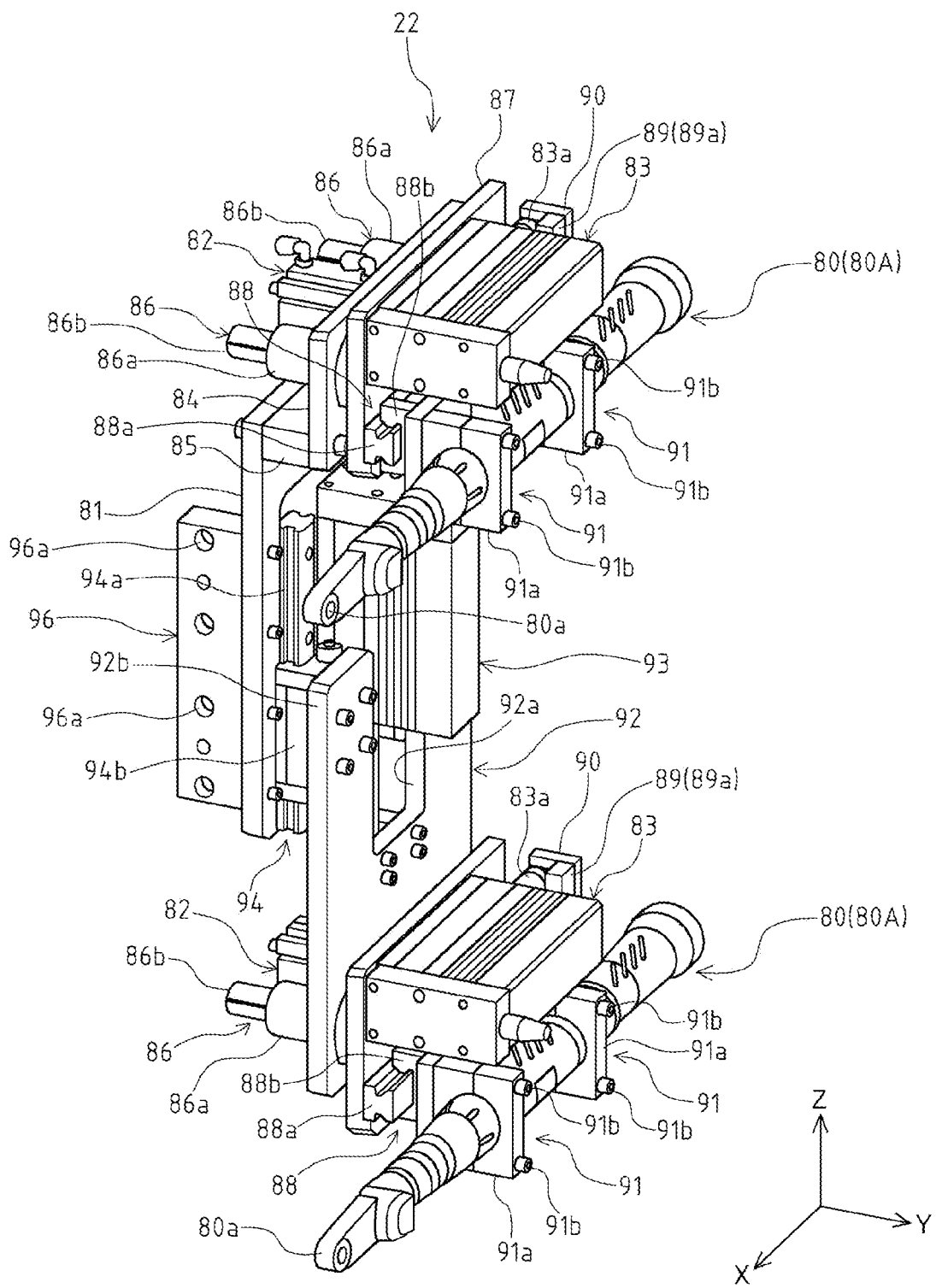
FIG. 22 is a perspective view illustrating a nut runner unit according to the embodiment of the present invention.
Figure 23:
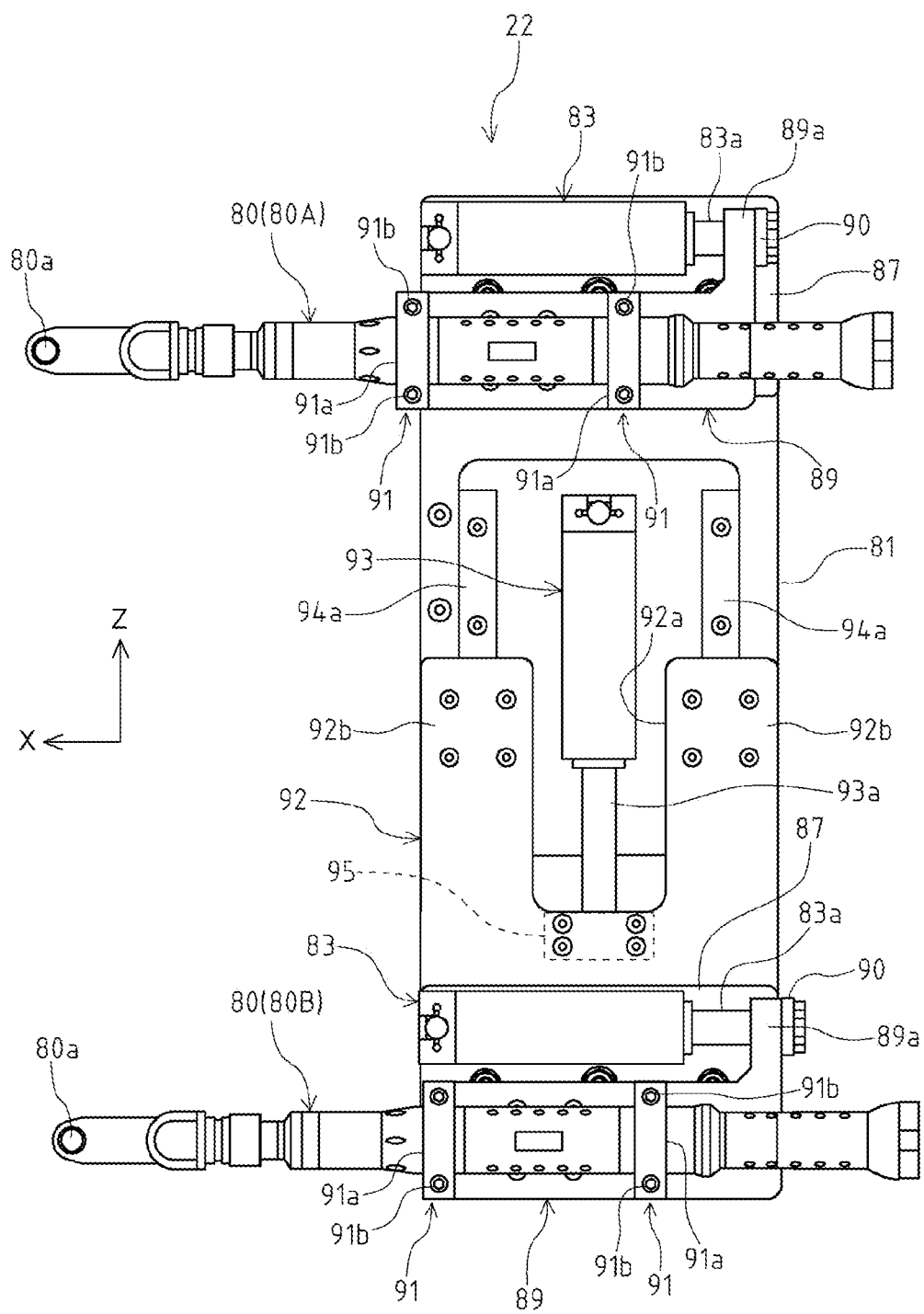
FIG. 23 is a side view illustrating the nut runner unit according to the embodiment of the present invention.
Figure 24:
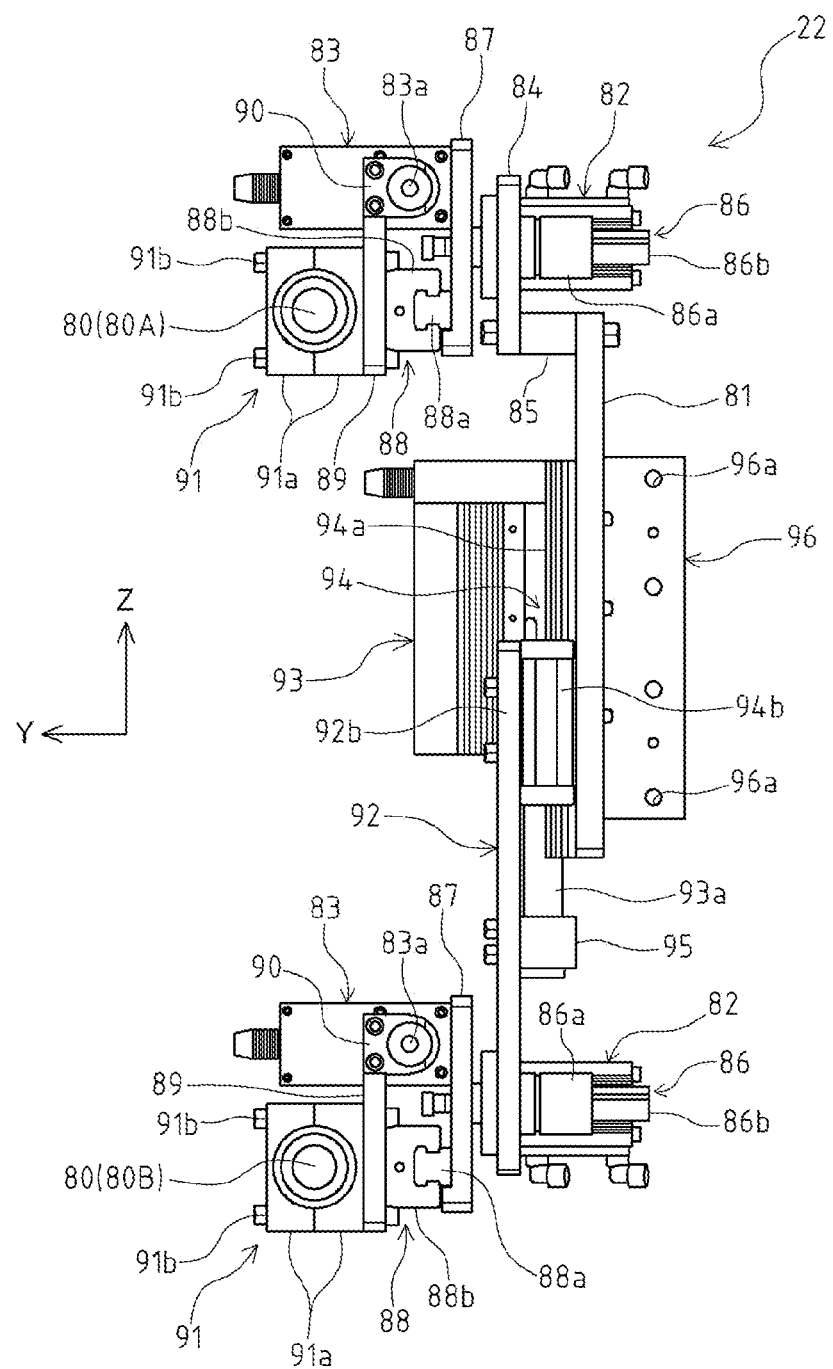
FIG. 24 is a rear view illustrating the nut runner unit according to the embodiment of the present invention.
Figure 25:
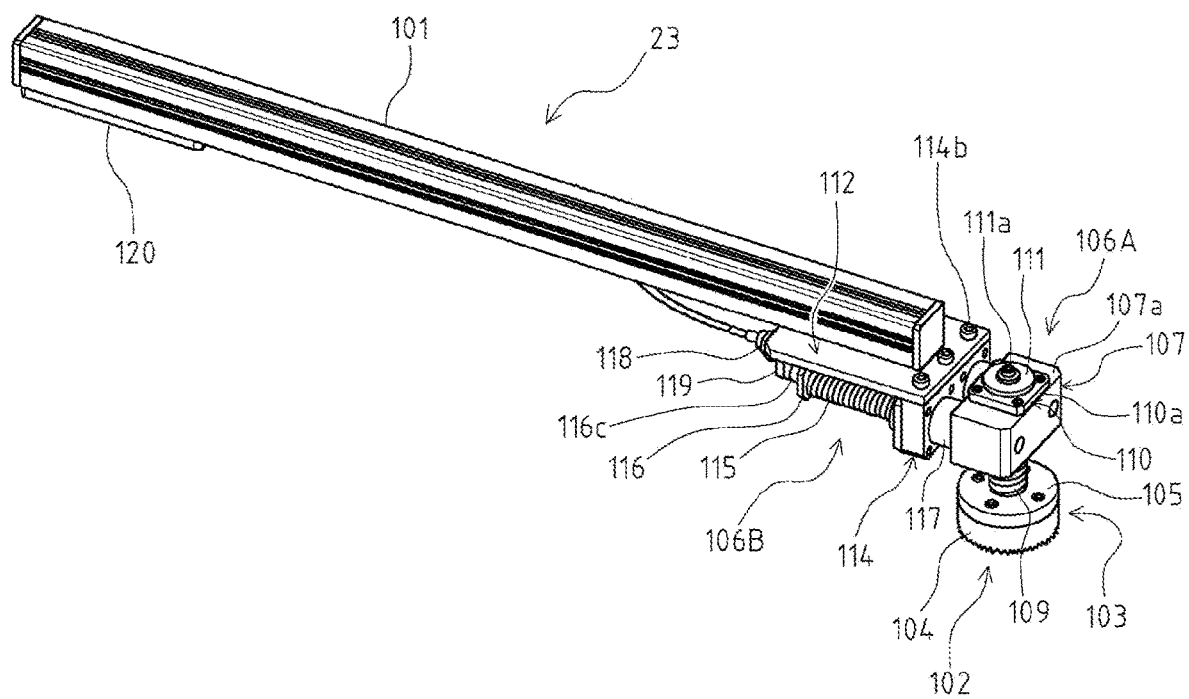
FIG. 25 is a perspective view illustrating a door opening arm according to the embodiment of the present invention.
Figure 26:
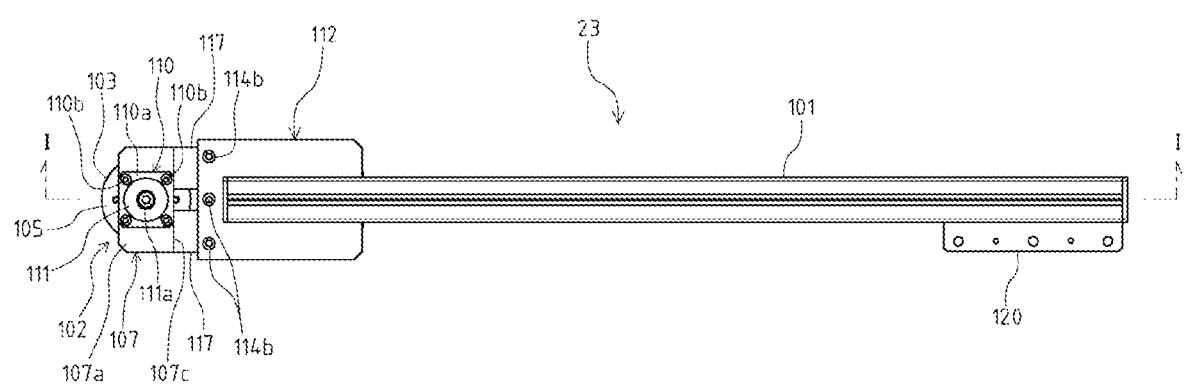
FIG. 26 is a plan view illustrating the door opening arm according to the embodiment of the present invention.
Figure 27:
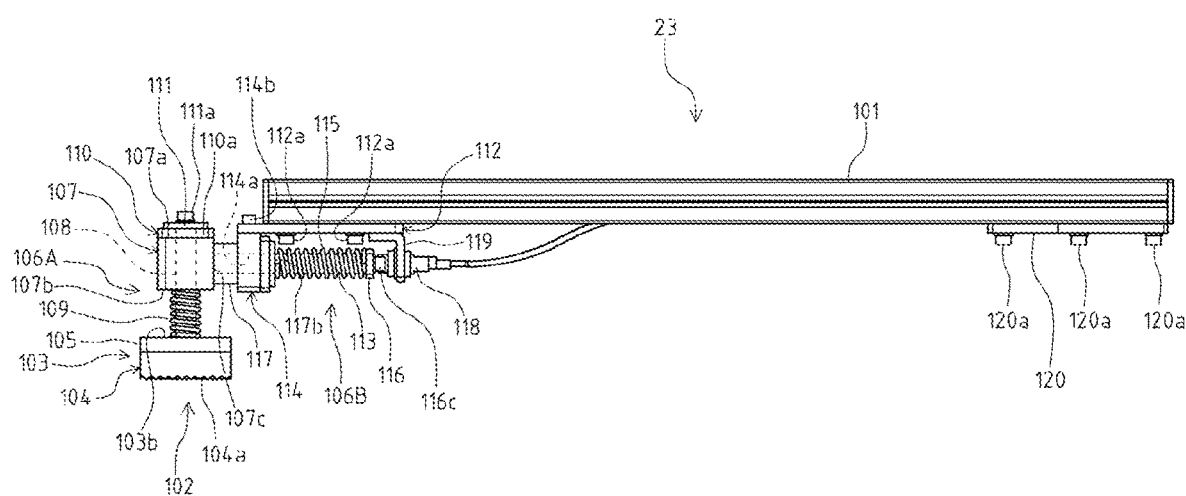
FIG. 27 is a side view illustrating the door opening arm according to the embodiment of the present invention.
Figure 28:
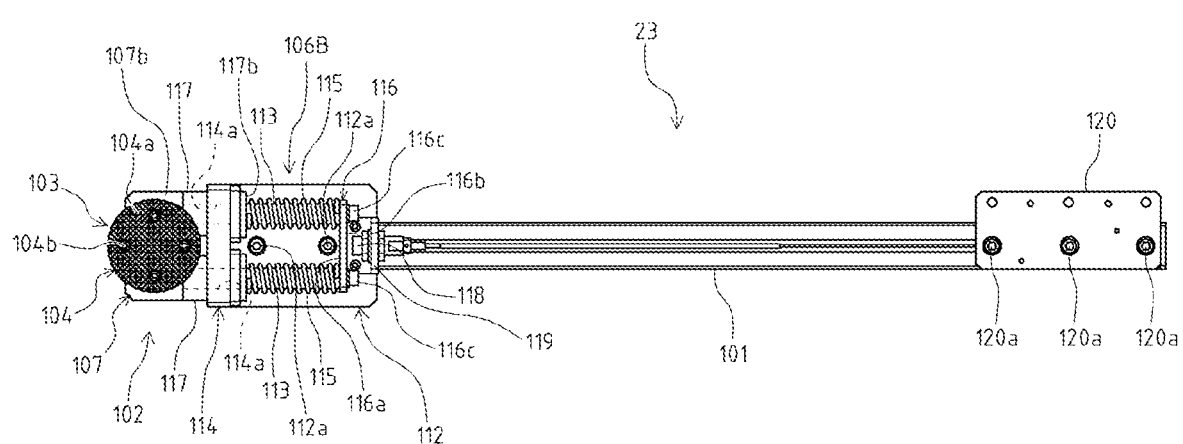
FIG. 28 is a bottom view illustrating the door opening arm according to the embodiment of the present invention.

Specifically, as illustrated in FIG. 21, the floating unit 20 includes a first subunit 121 that includes the support body part 70 and the X-axis rotation mechanism part 74, a second subunit 122 that is provided behind the first subunit 121 and includes a portion of the Z-direction shift mechanism part 73 and the Y-axis rotation mechanism part 75, and a third subunit 123 that is provided above the second subunit 122, supports the second subunit 122 such that the second subunit 122 is rotatable with a rotational shaft direction in the Y direction, and incudes the X-direction shift mechanism part 71 and the Y-direction shift mechanism part 72. In such a configuration, the Z-axis rotation mechanism part 76 is provided above the third subunit 123, and a pair of cylinder mechanisms for Y-axis rotation 78 configuring a portion of the Y-axis rotation mechanism part 75 are provided behind the second subunit 122 and the third subunit 123.

First, the first subunit 121 will be described with reference to FIGS. 30 to 35. In the first subunit 121, the X-axis rotation mechanism part 74 is provided behind the plate-shaped base 77. The X-axis rotation mechanism part 74 has a base for X-axis rotation 126 that has substantially the same up-down dimension as that of the plate-shaped base 77 in the up-down direction and has a substantially square-shaped outer shape in a view in the X-axis direction and supports the support body part 70 (plate-shaped base 77) at the base 126 for X-axis rotation such that the support body part 70 (plate-shaped base 77) is rotatable with a rotational shaft direction in the X-axis direction. The support body part 70 is rotatably supported at the base for X-axis rotation 126 via a rotation shaft 127, the rotation support mechanism 128, and a bearing 129.

The base for X-axis rotation 126 has a substantially cylindrical body part 126a with the center axis direction in the X direction and a flange part 126b that is provided behind the body part 126a, is provided to project outward in the radial direction from the body part 126a, and has an outer shape of the base for X-axis rotation 126 in a view in the X direction. The base for X-axis rotation 126 forms a hole part penetrating in the center axis direction of the body part 126a as a whole. An inner circumferential protruding part 126c in which the diameter of the hole diameter (inner diameter) of the hole part of the base for X-axis rotation 126 is partially reduced is included at the center part in the center axis direction on the inner circumferential side of the body part 126a (see FIGS. 33 and 34).

In the base for X-axis rotation 126, the inner circumferential protruding part 126c forms a circumferential front fitting recessed part 126d in front of the base for X-axis rotation 126. The front fitting recessed part 126d is formed as a recessed part for fitting the bearing 129 in a step-down shape relative to the front surface of the body part 126a. Also, the inner circumferential protruding part 126c forms a circumferential rear fitting recessed part 126e behind the base for X-axis rotation 126. The rear fitting recessed part 126e is formed as a recessed part for fitting the rotation support mechanism 128 in a step-down shape relative to the rear surface of the flange part 126b.

The rotation shaft 127 has a tubular shaft part 127a with an axial direction in the X direction and a flange part 127b that is a large diameter part formed at an intermediate part of the shaft part 127a in the axial direction. The rotation shaft 127 is provided inside the base for X-axis rotation 126 in a state in which the flange part 127b is caused to conform to a portion where the inner circumferential protruding part 126c is formed relative to the base for X-axis rotation 126 in the axial direction thereof and an outer circumferential surface 127f of the flange part 127b is caused to come into contact with an inner circumferential surface 126f of the inner circumferential protruding part 126c.

The rotation support mechanism 128 has a disk-shaped outer shape as a whole and has, at a center part thereof, a hole part 128a into which the rear part of the rotation shaft 127 is caused to be inserted. The rotation support mechanism 128 has a donut-shaped body part 128b that forms an outer shape of the rotation support mechanism 128 and an annular attachment flange part 128c provided on the inner circumferential side of the body part 128b. The body part 128b and the attachment flange part 128c are configured to be relatively coaxially rotatable.

In the rotation support mechanism 128, the body part 128b and the attachment flange part 128c interact via an elastic member such as a spring accommodated in the body part 128b. Also, the rotation support mechanism 128 has a passage for supplying/exhausting an air pressure and receives air supply from an air supply source, which is not illustrated, via a supply/exhaust nozzle 125 attached to the body part 126a of the base for X-axis rotation 126 on the outer circumferential side. A supply/exhaust pipe structure (not illustrated) for supplying/exhausting the air pressure is connected to the supply/exhaust nozzle 125. The rotation support mechanism 128 is configured such that the clamping of the attachment flange part 128c relative to the body part 128b is freed (allowed to be relatively rotatable) when the air pressure is supplied and the attachment flange part 128c clamps (disables the relative rotation) the body part 128b at the time of exhausting.

The rotation support mechanism 128 causes the body part 128b to be secured to the base for X-axis rotation 126 with bolts 130 at a plurality of locations in a state in which the rotation support mechanism 128 is fitted into the rear fitting recessed part 126e of the base for X-axis rotation 126. Also, the attachment flange part 128c causes the rear part thereof to be secured to the rotation shaft 127 inserted into the hole part of the rotation support mechanism 128 with bolts 131 at a plurality of locations. On the other hand, the plate-shaped base 77 of the support body part 70 is secured in front of the rotation shaft 127.

With such a configuration, a non-rotatable state and a rotatable state of the rotation shaft 127 relative to the base for X-axis rotation 126 are switched through switching between clamping and unclamping operations of the rotation support mechanism 128. In this manner, rotation of the support body part 70 about the X axis relative to the rotation support mechanism 128 is locked at an arbitrary position. In this manner, the X-axis rotation mechanism part 74 has the rotation support mechanism 128 that functions as a rotation locking mechanism that causes the support body part 70 to stop rotating in the rotational direction in which the support body part 70 supported indirectly at the rotation shaft 127 is rotatably supported, that is, the rotational direction about the X axis. Note that it is possible to use a "Linear Clamper-Zee (registered trademark)" manufactured by Nabeya Bi-tech Kaisha, for example, as the rotation support mechanism 128.

The bearing 129 is an annular member that has an outer wheel 129b and an inner wheel 129c configured to be relatively rotatable via a plurality of rollers 129a. The bearing 129 supports the front part of the rotation shaft 127 relative to the base for X-axis rotation 126.

The bearing 129 causes the outer wheel 129b to be secured to the base for X-axis rotation 126 with bolts 132 at a plurality of locations in a state in which the front part of the rotation shaft 127 is caused to penetrate therethrough and the bearing 129 is fitted into the front fitting recessed part 126d of the base for X-axis rotation 126 via an O ring 129d or the like fitted onto the outer circumferential surface. On the other hand, the inner wheel 129c is secured to the flange part 127b with bolts 133 at a plurality of locations relative to the rotation shaft 127 through which the front part thereof is caused to penetrate. As the bearing 129, a cross roller bearing using cylindrical rollers as the rollers 129a is used, for example.

The plate-shaped base 77 configuring the support body part 70 is secured to the rotation shaft 127 rotatably supported at the base for X-axis rotation 126 from the front side thereof. The rotation shaft 127 has, on the front side of the flange part 127b, a boss part 127c that is a diameter reduced portion relative to the flange part 127b, and the boss part 127c includes bolt holes 127 opened in the front surface thereof and formed at a plurality of locations. Also, the rotation shaft 127 is secured to the plate-shaped base 77 by a bolt 134 penetrating through a hole part 77b formed at the center part of the plate-shaped base 77 in accordance with a bolt hole 127d being screw-inserted in to the bolt hole 127d. Note that the boss part 127c is a portion of the rotation shaft 127 onto which the bearing 129 is fitted. Also, a diameter reduced part 127g is formed at a front end part of the rotation shaft 127, and the diameter reduced part 127g is fitted into a hole part 77c formed at the center part of the plate-shaped base 77.

Figure 18:
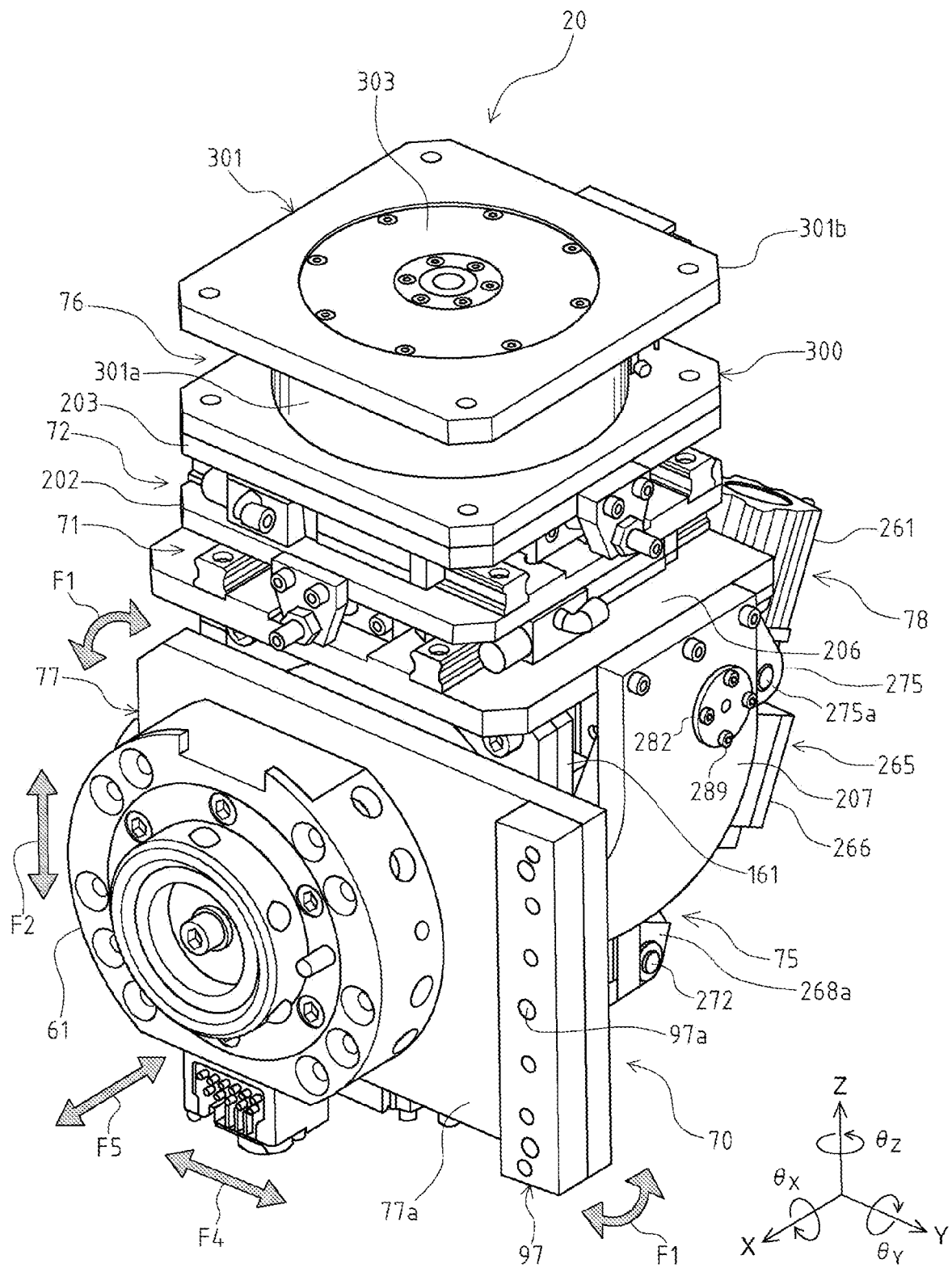
FIG. 18 is a front-side perspective view illustrating a floating unit according to the embodiment of the present invention.
Figure 19:
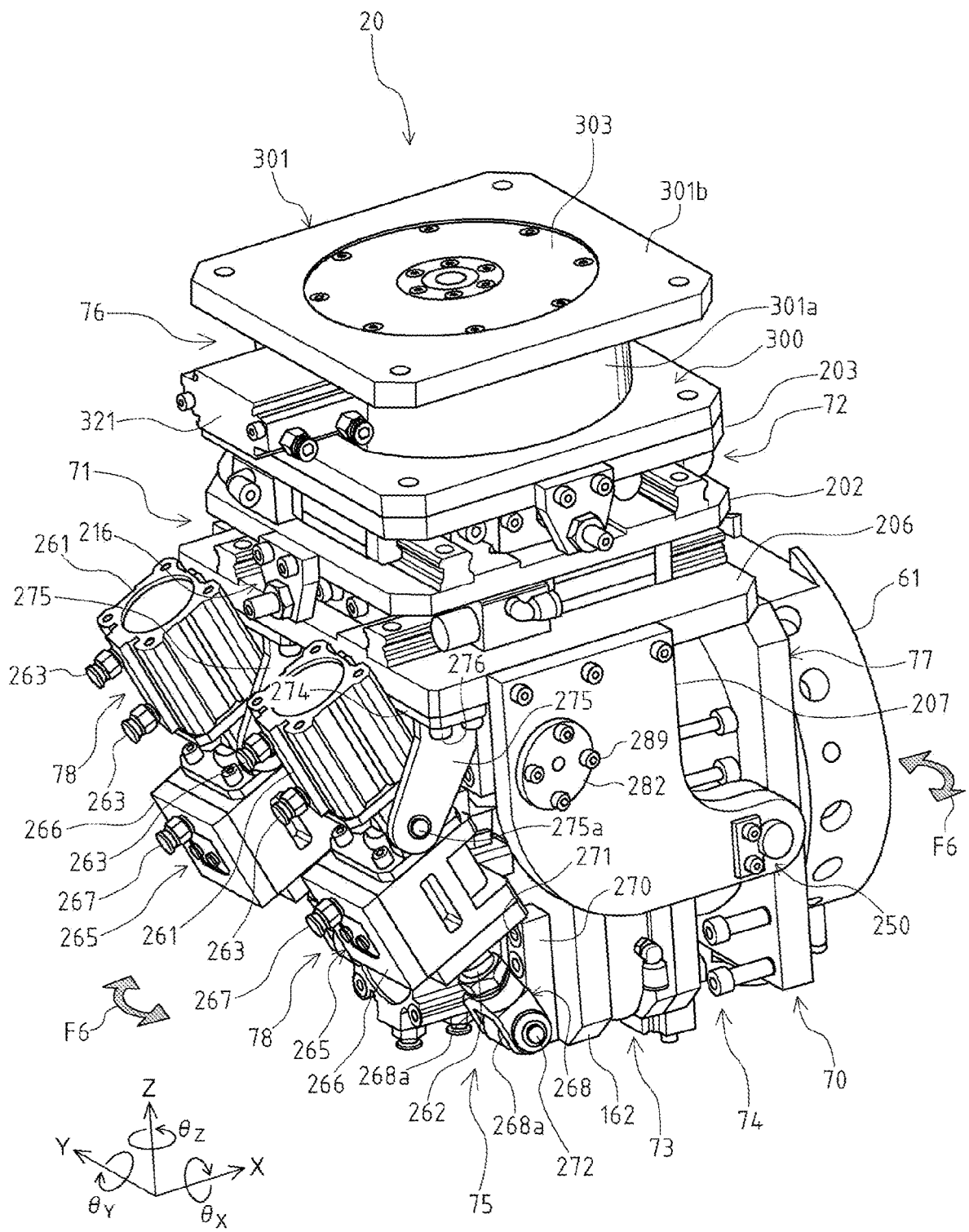
FIG. 19 is a rear-side perspective view illustrating the floating unit according to the embodiment of the present invention.
Figure 20:
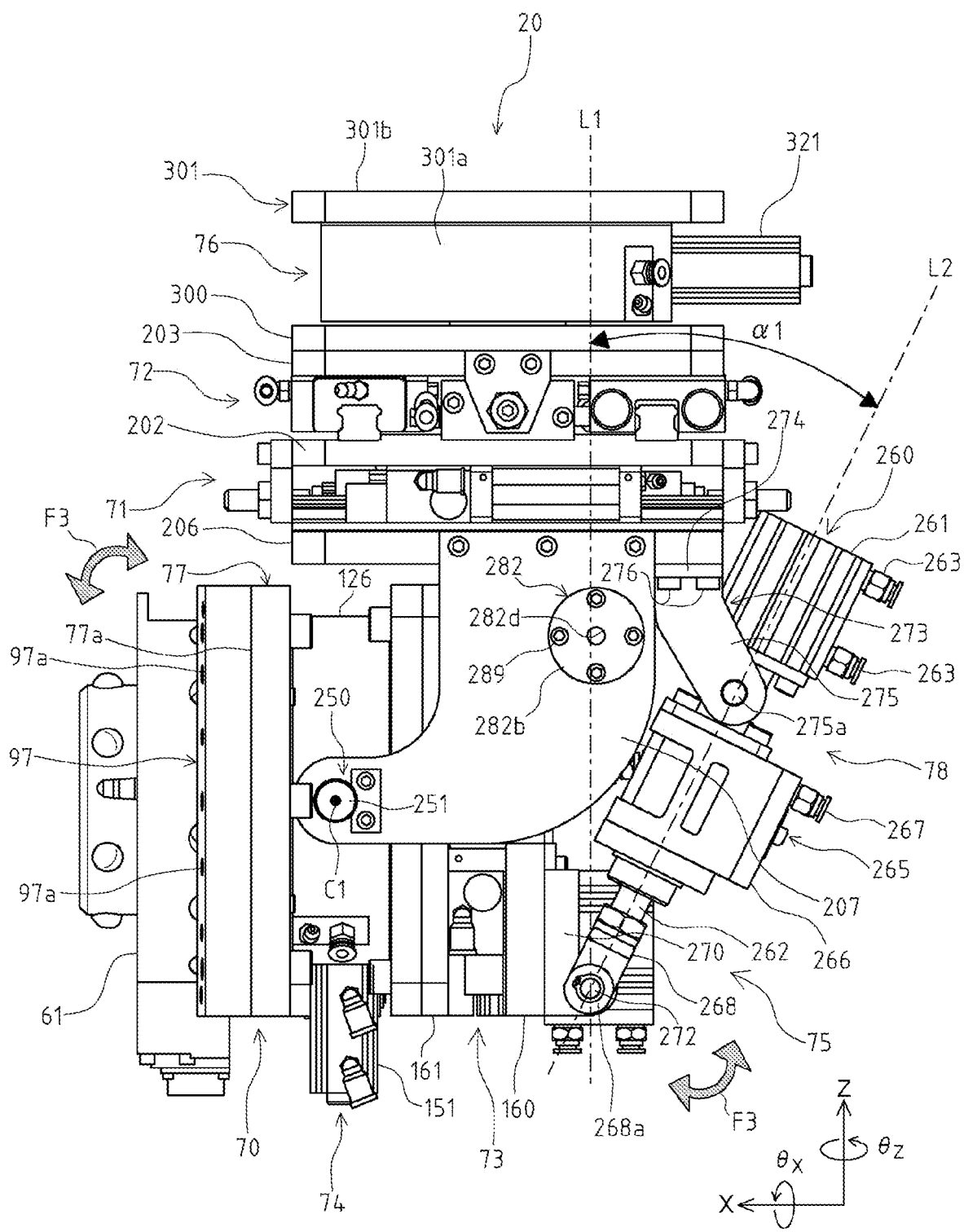
FIG. 20 is a side view illustrating the floating unit according to the embodiment of the present invention.

With the configuration as described above, the support body part 70 is supported such that the support body part 70 is rotatable about the X axis relative to the base for X-axis rotation 126. Also, the first subunit 121 is configured to be balanced with reference to a neutral position by the air cylinder 135 in regard to the rotation of the support body part 70 about the X axis relative to the base for X-axis rotation 126. In other words, the first subunit 121 has the air cylinder 135 as a balancer for supporting the support body part 70 relative to the base for X-axis rotation 126 of the X-axis rotation mechanism part 74 in a floating state about the X axis. Note that in FIGS. 18 to 20, illustration of the air cylinder 135 and a support configuration thereof is omitted for convenience.

The air cylinder 135 is a single rod-type cylinder mechanism and has a substantially square tubular-shaped cylinder body 136 and a piston rod 137 that reciprocates relative to the cylinder body 136. The air cylinder 135 has a supply/exhaust nozzle 138 that communicates with a supply/exhaust port that faces the side surface of the cylinder body 136 from the inside thereof, is connected to a regulator (not illustrated) such as an electro-pneumatic regulator, for example, and receives air supply with a pressure controlled by the electro-pneumatic regulator. The air cylinder 135 is configured to cause the piston rod 137 to reciprocate relative to the cylinder body 136 and perform extension/contraction operations through air supply/exhaust to/from the inside of the cylinder body 136 through the supply/exhaust nozzle 138.

Also, in the air cylinder 135, air supply/exhaust control is performed such that the position of the piston rod 137 is kept at a predetermined neutral position, and a floating state with reference to the neutral position is obtained for the operation of the piston rod 137. In other words, the air pressure supplied to the air cylinder 135 is adjusted such that the piston rod 137 is positioned at the neutral position with the reciprocating operation thereof in accordance with a load or the like acting on the piston rod 137.

The air cylinder 135 is bridged in the up-down direction between an upper support arm 141 secured to the base for X-axis rotation 126 and a lower support arm 142 secured to the plate-shaped base 77 in an orientation with the projecting side of the piston rod 137 on the lower side. The upper support arm 141 and the lower support arm 142 include arm body parts 141a and 142a provided to project inward in the Y direction (the left side in FIG. 30) from the base for X-axis rotation 126 and the plate-shaped base 77, respectively. The upper support arm 141 and the lower support arm 142 are provided at mutually the same positions in the X direction and include the arm body part 141a and the arm body part 142a caused to project in substantially parallel to each other.

The upper support arm 141 is a substantially "L"-shaped member, and in an orientation in which the corner part thereof is located on the upper side and a side part on one side is caused to follow the up-down direction, the side part is secured to a portion of the flange part 126b of the base for X-axis rotation 126 on the inward side in the Y direction with a bolt 144 via a square columnar-shaped spacer 143. In this manner, the upper support arm 141 causes the side part of the substantially "L" shape on the other side to project inward in the Y direction as the arm body part 141a on the upper side.

The lower support arm 142 is a substantially "L"-shaped member, and in an orientation in which the corner part thereof is located on the lower side and the side part on one side is caused to follow the up-down direction, the side part is secured to a portion of the plate-shaped base 77 on the inward side in the Y direction with a bolt 146 via a square columnar-shaped spacer 145. In this manner, the lower support arm 142 causes the side part of the substantially "L" shape on the other side to project inward in the Y direction as the arm body part 142a on the lower side.

The air cylinder 135 has an upper axial support part 147 at an upper surface part of the cylinder body 136 on the opposite side of the rod projecting side and has a lower axial support part 148 at a portion of the piston rod 137 on the distal end side (lower side). Both the upper axial support part 147 and the lower axial support part 148 have support shafts 147a and 148a supported on both end sides with the axial direction in the X direction. The air cylinder 135 is rotatably supported relative to the arm body part 141a in a state in which the support shaft 147a of the upper axial support part 147 is caused to penetrate through the distal end part of the arm body part 141a on the upper side and is rotatably supported relative to the arm body part 142a in a state in which the support shaft 148a of the lower axial support part 148 is caused to penetrate through the distal end part of the arm body part 142a on the lower side.

In the first subunit 121 provided with the configuration as described above, a floating-supported state is obtained for the rotation of the support body part 70 about the X axis relative to the base for X-axis rotation 126 of the X-axis rotation mechanism part 74 with extension/contraction operations of the air cylinder 135. Note that the configuration for floating-supporting the support body part 70 about the X axis is not limited to the air cylinder 135, and another cylinder mechanism such as a hydraulic cylinder, for example, and another actuator are appropriately used.

Also, the X-axis rotation mechanism part 74 has an X-axis rotation centering mechanism for centering the support body part 70 for the rotation thereof about the X axis. The X-axis rotation centering mechanism has an air cylinder 151 and a locking pin 152 and locks the rotation shaft 127 at a predetermined position in the rotating direction thereof by causing the locking pin 152 to be engaged with the rotation shaft 127 through an operation of the air cylinder 151.

The air cylinder 151 is a single rod-type cylinder mechanism and has a substantially rectangular parallelepiped cylinder body 153 and a piston rod 154 that reciprocates relative to the cylinder body 153. The air cylinder 151 has a supply/exhaust nozzle 155 that communicates with a supply/exhaust port that faces a side surface of the cylinder body 153 from the inside thereof and receives air supply from an air supply source, which is not illustrated. The air cylinder 151 is configured to cause the piston rod 154 to reciprocate relative to the cylinder body 153 and perform extension/contraction operations through air supply/exhaust to/from the inside of the cylinder body 153 through the supply/exhaust nozzle 155.

The air cylinder 151 is secured below the body part 126a of the base for X-axis rotation 126 with a projecting side of the piston rod 154 on the upper side. A locking pin 152 is secured coaxially to the piston rod 154 on the distal end side. The locking pin 152 forms a part with substantially the same diameter as that of the piston rod 154. A hole part 126g through which the piston rod 154 and the locking pin 152 are caused to penetrate is formed below the body part 126a of the base for X-axis rotation 126. The hole part 126g is formed at a part corresponding to the inner circumferential protruding part 126c of the base for X-axis rotation 126 in the X direction. In other words, the outward side of the hole part 126g is opened in the outer circumferential surface of the body part 126a while the inward side of the hole part 126g is opened in the inner circumferential surface 126f of the inner circumferential protruding part 126c.

A planar part that has an outer circumferential surface with a horizontal surface shape is formed below the body part 126a, and the air cylinder 151 is secured with a bolt 156 that penetrates through the cylinder body 153 and is screw-inserted into the body part 126a in a state in which the upper surface of the cylinder body 153 is caused to come into contact with the planar part below the body part 126a. Also, the piston rod 154 projecting upward and the locking pin 152 secured thereto in the air cylinder 151 are inserted into the hole part 126g. A cylindrical bushing 157 that has substantially the same inner diameter as the outer diameter of the locking pin 152 and causes the locking pin 152 to penetrate therethrough is inserted and fitted into the hole part 126g. With the configuration as described above, the locking pin 152 is configured to appear from the inner circumferential surface 126f of the inner circumferential protruding part 126c via the hole part 126g through an operation of the air cylinder 151.

The locking pin 152 is a shaft-shaped member and reciprocates in the up-down direction integrally with the piston rod 154 with an operation of the air cylinder 151 with the axial direction thereof in the Z direction. The locking pin 152 has a male screw part 152a with a reduced diameter shape at an end part on the proximal end side and is screwed into and fixed to a female screw part 154a formed at the piston rod 154 on the distal end side. Also, the locking pin 152 has a conical tapered part 152b at an end part on the distal end part.

On the other hand, an engagement fitting hole 127e that receives the tapered part 152b of the locking pin 152 is formed at one location in the outer circumferential surface below the flange part 127b of the rotation shaft 127. The engagement fitting hole 127e is a recessed part formed into a conical hole shape to conform to the conical outer shape of the tapered part 152b. In the configuration in which the rotation shaft 127 is secured to the support body part 70, the engagement fitting hole 127e is provided at a predetermined position such that for a rotation angle of the rotation shaft 127 about the X axis, the position where the locking pin 152 locks the rotation shaft 127 corresponds to a predetermined center position of the support body part 70.

The air cylinder 151 causes the piston rod 154 to be positioned upward (projecting side) and causes the locking pin 152 to be engaged with the rotation shaft 127 in the operating state thereof. Here, the locking pin 152 causes the tapered part 152b to be fitted into the engagement fitting hole 127e of the rotation shaft 127 and fixes the rotation of the rotation shaft 127 about the X axis at a predetermined position. The support body part 70 is centered about the X axis by the rotation shaft 127 being secured in this manner. Thus, the material handling device 21 attached to the support body part 70 via the chuck mechanism 60 is centered for the rotation position about the X axis.

On the other hand, the air cylinder 151 causes the piston rod 154 to be positioned downward (opposite side of the projecting side) and releases the engagement of the locking pin 152 with the rotation shaft 127 in the non-operating state thereof. In the engagement released state, the sharp end of the tapered part 152b of the locking pin 152 is positioned at a part outside (the outer circumferential side of the flange part 127b) of the engagement fitting hole 127e, and the rotation of the rotation shaft 127 is allowed within a range of a clearance (margin) from the conical inner circumferential surface that forms the engagement fitting hole 127e. In other words, in the engagement released state of the locking pin 152, the locking pin 152 causes the sharp end of the tapered part 152b thereof to be positioned inside the engagement fitting hole 127e (causes the sharp end to project inward beyond the position of the outer circumferential surface of the flange part 127b), rotation of the rotation shaft 127 is allowed, and the rotation range thereof is limited to a rotation range in which the sharp end of the tapered part 152b comes into contact with the inner circumferential surface of the engagement fitting hole 127e (interferes with the rotation shaft 127) on both sides in the circumferential direction of the flange part 127b.

Therefore, the support body part 70 that is secured to the rotation shaft 127 and supports the material handling device 21 on the front side is brought into a state in which the support body part 70 is floating-supported about the X axis with the shaft center of the rotation shaft 127 located at the center within the rotation range of the rotation shaft 127 in which the rotation is restricted by the locking pin 152, by the air cylinder 151 being brought into the non-operating state (see the arrow F1 in FIG. 18).

Next, the second subunit 122 will be described with reference to FIGS. 36 to 43. The second subunit 122 has a base for Z-axis shift 160, a moving attachment plate 161 provided in front of the base for Z-axis shift 160, and the Z-direction shift mechanism part 73 and supports the moving attachment plate 161 at the base for Z-axis shift 160 such that the moving attachment plate 161 is movable in the Z direction using the Z-direction shift mechanism part 73. Note that illustration of the moving attachment plate 161 is omitted in FIG. 42 for convenience.

The base for Z-axis shift 160 has a rectangular plate-shaped body plate part 162 and a pair of arm parts for Y-axis rotation 163 provided on both left and right sides thereof. The body plate part 162 has a plate thickness direction in the front-back direction, has substantially the same outer dimension as that of the base for X-axis rotation 126 in the first subunit 121 provided in front of the second subunit 122, and is provided to be superimposed on the base for X-axis rotation 126 in a view in the X direction.

The arm parts for Y-axis rotation 163 are configured with substantially right triangular plate-shaped members, and the plate-shaped members are secured to the body plate part 162 with bolts 164 at a plurality of locations with the right angle sides located on the lower side and with side parts on one side of the right angles caused to follow the left and right side surfaces 162a of the body plate part 162. In this manner, arm portions 163a projecting forward from the body plate part 162 are configured on both left and right sides of the body plate part 162.

The moving attachment plate 161 is a rectangular plate-shaped member with substantially the same outer dimension as that of the body plate part 162 and is provided in parallel with the body plate part 162 in front of the body plate part 162. The moving attachment plate 161 is provided via a pair of left and right sliding mechanism parts 165 configuring the Z-direction shift mechanism part 73 such that the moving attachment plate 161 is relatively movable in the Z direction with respect to the body plate part 162.

The sliding mechanism parts 165 have a sliding direction in the Z direction and have linear-shaped linear guides 165a secured in front of the body plate part 162 and sliders 165b that are slidably engaged with the linear guides 165a. The moving attachment plate 161 is secured in front of the sliders 165b of the left and right sliding mechanism parts 165 with bolts or the like. In other words, the moving attachment plate 161 moves in the Z direction integrally with the left and right sliders 165b relative to the body plate part 162.

Also, in the Z-direction shift mechanism part 73, a shift-lock mechanism 166 for locking the moving attachment plate 161 at an arbitrary position is provided for each of the sliding mechanism parts 165. The shift-lock mechanism 166 is slidably engaged with the linear guide 165a and is secured to the moving attachment plate 161 similarly to the slider 165b and is positioned immediately below the slider 165b on the linear guide 165a.

The shift-lock mechanism 166 has a body 166a that is engaged with the linear guide 165a and a pair of pinching mechanisms for pinching the linear guide 165a with pressure contact in the width direction and clamping the linear guide 165a. Each of the pinching mechanisms has a spring that serves as an elastic member accommodated in a cylindrical case 166b, a piston that receives an elastic force of the spring and moves in the Z direction, a pressure contact element that comes into pressure contact with the linear guide 165a, and a transform mechanism part that transforms the elastic force received by the piston using a wedge action and causing the transformed force to act as a pressurizing force on the pressure contact element.

Moreover, the shift-lock mechanism 166 has a passage for performing supply/exhaust of the air pressure and is configured to free the clamping of the linear guide 165a with the pair of pinching mechanisms (enables relative movement) when the air pressure is supplied. On the other hand, the shift-lock mechanism 166 is configured to clamp and lock the linear guide 165a using the elastic force of the springs in the pair of pinching mechanisms (disables the relative movement) when the air pressure is exhausted. In the shift-lock mechanism 166, a supply/exhaust nozzle 166c that communicates with the supply/exhaust passage in the body 166a is provided in a side surface of the body 166a, and a supply/exhaust pipe structure (not illustrated) for performing supply/exhaust of the air pressure is connected to the supply/exhaust nozzle 166c.

With such a configuration, a non-movable state and a movable state of the moving attachment plate 161 relative to the base for Z-axis shift 160 are switched through switching between clamping and unclamping operations of the shift-lock mechanism 166 for movement of the moving attachment plate 161 provided to be movable in the Z direction relative to the base for Z-axis shift 160. Thus, the movement of the moving attachment plate 161 in the Z direction relative to the base for Z-axis shift 160 is locked at an arbitrary position. In this manner, the Z-direction shift mechanism part 73 has the shift-lock mechanism 166 that causes the support body part 70 to stop moving in the direction in which the support body part 70 supported indirectly at the moving attachment plate 161 is movably supported, that is, in the Z-direction. Note that it is possible to use a "Linear Clamper-Zee (registered trademark)" manufactured by Nabeya Bi-tech Kaisha, for example, as the shift-lock mechanism 166. Also, the shift-lock mechanism 166 may be driven by an electric force or a magnetic force.

For the movement of the moving attachment plate 161 in the Z direction relative to the base for Z-axis shift 160, the second subunit 122 is configured to be balanced with reference to a neutral position by an air cylinder 170. In other words, the second subunit 122 has the air cylinder 170 that serves as a balancer for supporting the moving attachment plate 161 in a floating state in the Z direction relative to the base for Z-axis shift 160.

The air cylinder 170 is a single rod-type cylinder mechanism and has a substantially square tubular-shaped body 171 and a piston rod 172 that reciprocates relative to the cylinder body 171. The air cylinder 170 has a supply/exhaust nozzle 173 that communicates with a supply/exhaust port that faces a side surface of the cylinder body 171 from the inside thereof, is connected to a regulator (not illustrated) such as an electro-pneumatic regulator, for example, and receives air supply with a pressure controlled by the electro-pneumatic regulator. The air cylinder 170 is configured to cause the piston rod 172 to reciprocate relative to the cylinder body 171 and perform extension/contraction operations through air supply/exhaust to/from the inside of the cylinder body 171 through the supply/exhaust nozzle 173.

Also, in the air cylinder 170, air supply/exhaust control is performed such that the position of the piston rod 172 is kept at a predetermined neutral position, and a floating state with reference to the neutral position is obtained for operations of the piston rod 172. In other words, the air pressure to be supplied to the air cylinder 170 is adjusted such that the piston rod 172 is positioned at the neutral position with a reciprocating operation in accordance with a load and the like acting on the piston rod 172.

The air cylinder 170 is secured behind the moving attachment plate 161 similarly to the slider 165b and the like in an orientation with the projecting side of the piston rod 172 on the lower side. The air cylinder 170 is secured to the moving attachment plate 161 with bolts 175 at a plurality of locations (four locations) via L-shaped metal tools 174 secured above and below the cylinder body 171 with bolts 174a at a center part in the left-right direction of the upper part of the moving attachment plate 161, which is a position between the left and right sliding mechanism parts 165.

The air cylinder 170 causes the lower end of the piston rod 172 to constantly abut on the side of the base for Z-axis shift 160. The air cylinder 170 causes a substantially last half part of the cylinder body 171 to project backward from a rear surface 162c of the body plate part 162 via a rectangular opening part 162b formed in the body plate part 162. In other words, the opening part 162b is a hole part formed to penetrate through the body plate part 162 to avoid interference with the cylinder body 171.

In addition, the air cylinder 170 causes the piston rod 172 to be positioned inside the opening part 162b in the X direction and causes a distal end surface 172a of the piston rod 172 to face a lower side surface 162d that is a surface facing upward and forming the lower side of the opening part 162b. The portion of the lower side surface 162d facing the distal end surface 172a is provided with a receiving member 176 that receives abutting of the piston rod 172. The receiving member 176 is a bent plate-shaped metal tool with a substantially "L" shape and is secured to the body plate part 162 with a bolt 177 in a state in which a surface part forming a side of one side of the L shape is superimposed on the lower side surface 162d and a surface part forming the side of the other side of the L shape is caused to follow the rear surface 162c.

An upper surface 176a of the receiving member 176 is a surface that receives contact of the distal end surface 172a of the piston rod 172. The air cylinder 170 is in a state in which the distal end surface 172a of the piston rod 172 is caused to constantly come into contact with the upper surface 176a of the receiving member 176 through control of the air pressure as described above. In other words, a state in which the moving attachment plate 161 that supports the support body part 70 via the first subunit 121 is supported at the base for Z-axis shift 160 against a gravity due to a pressurizing force acting on the body plate part 162 from the air cylinder 170.

In the second subunit 122 provided with the configuration as described above, a floating-supported state is obtained for the movement of the moving attachment plate 161 in the Z direction relative to the base for Z-axis shift 160 of the Z-direction shift mechanism part 73 with extension/contraction operations of the air cylinder 170. Note that the configuration for floating-supporting the moving attachment plate 161 in the Z direction is not limited to the air cylinder 170 and another cylinder mechanism such as a hydraulic cylinder, for example, and another actuator are appropriately used.

Also, the Z-direction shift mechanism part 73 has a Z-direction centering mechanism for centering the moving attachment plate 161 for the movement thereof in the Z direction. The Z-direction centering mechanism has an air cylinder 181, a locking boss 182, and a recessed member 183 that is secured to the moving attachment plate 161 and receives engagement of the locking boss 182. The Z-direction centering mechanism locks the moving attachment plate 161 at a predetermined position of the base for Z-axis shift 160 in the Z direction by causing the locking boss 182 to be engaged with the recessed member 183 through an operation of the air cylinder 181.

The air cylinder 181 is a single rod-type cylinder mechanism and has a substantially rectangular parallelepiped cylinder body 184 and a piston rod 185 that reciprocates relative to the cylinder body 184. The air cylinder 181 has a supply/exhaust nozzle 186 that communicates with a supply/exhaust port that faces a side surface of the cylinder body 184 from the inside thereof and receives air supply from an air supply source, which is not illustrated. The air cylinder 181 is configured to cause the piston rod 185 to reciprocate relative to the cylinder body 184 and perform extension/contraction operations through air supply/exhaust to/from the inside of the cylinder body 184 through the supply/exhaust nozzle 186.

The air cylinder 181 is secured behind the body plate part 162 in an orientation with the projecting side of the piston rod 185 on the front side. The air cylinder 181 is secured with bolts 187 in a state in which a front surface 184a of the cylinder body 184 is caused to come into contact with the rear surface 162c of the body plate part 162. The bolts 187 penetrate through portions corresponding to four corners of the substantially rectangular parallelepiped cylinder body 184 and are screw-inserted into the body plate part 162.

The locking boss 182 is a substantially cylindrical member with a larger diameter than that of the piston rod 185 and is secured coaxially with the piston rod 185 on the distal end side thereof with a bolt 188. The bolt 188 penetrates through the locking boss 182 from the front side and is screw-inserted into the piston rod 185 in an axial direction from the distal end side thereof.

A circular hole part 162e through which the piston rod 185 and the locking boss 182 are caused to penetrate is formed at a center part in the left-right direction of the lower part of the body plate part 162. A penetrating plate 189 that has a rectangular plate-shaped outer shape and has a hole part 189a with substantially the same diameter as that of the hole part 162e is secured in front of the hole part 162e of the body plate part 162 with a bolt or the like. The hole part 162e of the body plate part 162 and the hole part 189a of the penetrating plate 189 form an integral cylindrical through-hole part 190.

The piston rod 185 projecting forward in the air cylinder 181 and the locking boss 182 secured thereto are inserted into the through-hole part 190. Here, the locking boss 182 is inserted and fitted into a bushing 191 that is inserted and fitted into the through-hole part 190. The bushing 191 is a cylindrical interposed member with substantially the same inner diameter as the outer diameter of the locking boss 182. With the configuration as described above, the locking boss 182 is configured to appear from the through-hole part 190 through an operation of the air cylinder 181.

The locking boss 182 has a center axis direction in the X direction and reciprocates in the front-back direction integrally with the piston rod 185 with an operation of the air cylinder 181. The locking boss 182 has a truncated conical tapered part 182a at an end part on the distal end side thereof.

On the other hand, the moving attachment plate 161 is provided with the recessed member 183 that receives fitting of the locking boss 182. The recessed member 183 is a disk-shaped member that has a through-hole at a center part thereof, has a center axis direction in the X direction, and is provided at a position in front of the locking boss 182. A circular attachment hole 161a for attaching the recessed member 183 is formed at a center part in the left-right direction of the lower part of the moving attachment plate 161. The recessed member 183 has a diameter reduced part 183b on the front side and is secured to the moving attachment plate 161 at a plurality of locations with bolts 192 penetrating through a peripheral edge part of the recessed member 183 in a state in which the diameter reduced part 183b is caused to be fitted into the attachment hole 161a from the rear side.

The recessed member 183 has, on the rear side thereof, a fitting recessed part 183a that forms an inner circumferential surface of the truncated conical hole shape to conform to the outer circumferential surface shape of the tapered part 182a of the locking boss 182. The locking boss 182 is engaged with the recessed member 183 by causing the tapered part 182a to be fitted into the fitting recessed part 183a. In the configuration in which the moving attachment plate 161 is supported at the base for Z-axis shift 160 such that the moving attachment plate 161 is movable in the Z direction, with respect to the position of the moving attachment plate 161 in the Z direction, the recessed member 183 is provided at a predetermined position such that the position at which the locking boss 182 is engaged with the recessed member 183 corresponds to a predetermined center position of the moving attachment plate 161.

The air cylinder 181 causes the piston rod 185 to be positioned forward (projecting side) and causes the locking boss 182 to be engaged with the recessed member 183 in the operating state thereof. Here, the locking boss 182 causes the tapered part 182a thereof to be fitted into the fitting recessed part 183a of the recessed member 183 and fixes the movement of the moving attachment plate 161 at a predetermined position. The moving attachment plate 161 is centered by the moving attachment plate 161 being secured in this manner. Thus, the material handling device 21 attached to the moving attachment plate 161 via the first subunit 121 is centered in regard to the position in the Z direction.

On the other hand, the air cylinder 181 causes the piston rod 185 to be positioned backward (the opposite side of the projecting side) and releases the engagement of the locking boss 182 with the recessed member 183 in the non-operating state thereof. In the engagement released state, a front end of the tapered part 182a of the locking boss 182 is positioned at a portion behind the fitting recessed part 183a, and relative movement of the locking boss 182 with respect to the recessed member 183 is allowed within a range of a clearance (margin) from the inner circumferential surface of the truncated conical shape forming the fitting recessed part 183a. In other words, in the engagement released state of the locking boss 182, the locking boss 182 causes the front end of the tapered part 182a to be positioned inside the fitting recessed part 183a, the movement of the locking boss 182 is allowed, and the movement range is restricted up to a movement range in which the front end of the tapered part 182a comes into contact with the inner circumferential surface of the fitting recessed part 183a (interferes with the recessed member 183) on both upper and lower sides.

Therefore, a state in which the material handling device 21 is floating-supported in the Z direction within the movement range of the moving attachment plate 161 with movement restricted by the locking boss 182 via the support body part 70 secured indirectly to the moving attachment plate 161 is obtained by the air cylinder 181 being brought into a non-operating state.

Also, in the second subunit 122, a pair of left and right air cylinders 280 configuring a Y-axis rotation centering mechanism are provided behind the upper part of the body plate part 162. Note that the Y-axis rotation centering mechanism will be described later.

The first subunit 121 is attached in front of the second subunit 122 provided with the configuration as described above. Specifically, the first subunit 121 is attached to the second subunit 122 by causing the base for X-axis rotation 126 to be secured to the moving attachment plate 161 as illustrated in FIG. 21. The base for X-axis rotation 126 is secured to the moving attachment plate 161 with bolts 195 at four corners of the flange part 126b and the moving attachment plate 161 with the flange part 126b aligned with the front side of the moving attachment plate 161. Therefore, holes 126s and 161s for securing with the bolts 195 are formed at the four corners of the flange part 126b and the moving attachment plate 161.

In this manner, a state in which the first subunit 121 that supports the material handling device 21 in front of the support body part 70 is floating-supported in the Z direction at the base for Z-axis shift 160 configuring the second subunit 122 is obtained by the first subunit 121 being attached in front of the second subunit 122 (see the arrow F2 in FIG. 18).

Next, the third subunit 123 will be described with reference to FIGS. 44 to 52. The third subunit 123 has an XY-axis support base 201, an X-direction moving plate 202 provided above the XY-axis support base 201, a Y-direction moving plate 203 provided above the X-direction moving plate 202, an X-direction shift mechanism part 71, and a Y-direction shift mechanism part 72. The third subunit 123 supports the X-direction moving plate 202 at the XY-axis support base 201 such that the X-direction moving plate 202 is movable in the X direction by the X-direction shift mechanism part 71 and supports the Y-direction moving plate 203 at the X-direction moving plate 202 such that the Y-direction moving plate 203 is movable in the Y direction by the Y-direction shift mechanism part 72. Also, the third subunit 123 supports the second subunit 122 at the XY-axis support base 201 such that the second subunit 122 is rotatable with a rotational shaft direction in the Y-axis direction.

The XY-axis support base 201 has a rectangular plate-shaped support plate part 206 with a plate thickness direction in the up-down direction and a pair of Y-axis rotation support arm parts 207 provided on both left and right sides thereof. The XY-axis support base 201 causes the support plate part 206 to be positioned above the second subunit 122 and causes the Y-axis rotation support arm parts 207 on the left and right sides to be located on both outward sides of the left and right arm parts for Y-axis rotation 163 in the second subunit 122.

The Y-axis rotation support arm parts 207 are configured with plate-shaped members with substantially "J" shapes, have upper parts with shapes following the outer shape of the rectangular shape, and cause lower parts to project forward in curved shapes. The Y-axis rotation support arm parts 207 are secured to the support plate part 206 with bolts 208 at a plurality of locations with upper edge parts caused to follow the left and right side surfaces 206a of the support plate part 206. In this manner, arm portions that follow the outer shapes of the Y-axis rotation support arm parts 207 are configured on both left and right sides of the support plate part 206.

The X-direction moving plate 202 is a rectangular plate-shaped member with substantially the same outer dimension as that of the support plate part 206 and is provided to be parallel with the support plate part 206 above the support plate part 206. The X-direction moving plate 202 is provide to be relatively movable in the X direction with respect to the support plate part 206 via a pair of left and right sliding mechanism parts 210 configuring the X-direction shift mechanism part 71.

The sliding mechanism parts 210 have a sliding direction in the X direction and have linear-shaped linear guides 210a secured above the support plate part 206 and sliders 210b slidably engaged with the linear guides 210a. The X-direction moving plate 202 is secured above the sliders 210b of the left and right sliding mechanism parts 210 with bolts or the like. In other words, the X-direction moving plate 202 moves in the X direction integrally with the left and right sliders 210b relative to the support plate part 206.

Also, in the X-direction shift mechanism part 71, a shift-lock mechanism 211 for locking the X-direction moving plate 202 at an arbitrary position is provided for each sliding mechanism part 210. The shift-lock mechanism 211 is slidably engaged with the linear guide 210a and is secured to the X-direction moving plate 202 similarly to the slider 210b and is provided at a position adjacent to the slider 210b on the linear guide 210a.

The shift-lock mechanism 211 is provided with a configuration similar to that of the shift-lock mechanism 166 included in the Z-direction shift mechanism part 73. In other words, the shift-lock mechanism 211 has a body 211a to be engaged with the linear guide 210a and a pair of pinching mechanisms for pinching the linear guide 210a with pressure contact in the width direction and clamping the linear guide 210a. Each pinching mechanism has a spring that serves as an elastic member accommodated in a cylindrical case 211b, a piston that receives an elastic force of the spring and moves in the X direction, a pressure contact element that comes into pressure contact with the linear guide 210a, and a transform mechanism part that transforms the elastic force received by the piston using a wedge action and causing the transformed force to act as a pressurizing force on the pressure contact element.

Also, the shift-lock mechanism 211 has a passage for supplying/exhausting the air pressure and is configured to free the clamping of the linear guide 210a with the pair of pinching mechanisms (enables relative movement) when the air pressure is supplied. On the other hand, the shift-lock mechanism 211 is configured to clamp and lock the linear guide 210a using an elastic force of springs of the pair of pinching mechanisms (disables the relative movement) when the air pressure is exhausted. In the shift-lock mechanism 211, a supply/exhaust nozzle 211c that communicates with a supply/exhaust passage inside the body 211a is provided in a side surface of the body 211a, and a supply/exhaust pipe structure (not illustrated) for supplying/exhausting an air pressure is connected to the supply/exhaust nozzle 211c.

With such a configuration, a non-movable state and a movable state of the X-direction moving plate 202 relative to the XY-axis support base 201 are switched through switching of clamping and unclamping operations of the shift-lock mechanism 211 for movement of the X-direction moving plate 202 provided to be movable in the X direction relative to the XY-axis support base 201. In this manner, the movement of the X-direction moving plate 202 in the X direction relative to the XY-axis support base 201 is locked at an arbitrary position.

In this manner, the X-direction shift mechanism part 71 has the shift-lock mechanism 211 that causes the support body part 70 to stop moving in the direction in which the support body part 70 supported indirectly at the support plate part 206 is movably supported, that is, in the X direction. Note that the pair of left and right sliding mechanism parts 210 and the shift-lock mechanism 211 are configured to be mutually symmetric with respect to the front-back direction. Also, it is possible to use a "Linear Clamper-Zee (registered trademark)" manufactured by Nabeya Bi-tech Kaisha, for example, as the shift-lock mechanism 211. In addition, the shift-lock mechanism 211 may be driven by an electric force or a magnetic force.

Also, the X-direction shift mechanism part 71 has an X-direction centering mechanism for centering the relative movement of the XY-axis support base 201 and the X-direction moving plate 202 in the X direction using the pair of sliding mechanism parts 210. The X-direction centering mechanism has a pair of air cylinders 215 and pressurized parts 216 that receive operations of the air cylinders 215.

Each air cylinder 215 is a single rod-type cylinder mechanism and has a substantially rectangular parallelepiped cylinder body 217 and a piston rod 218 that reciprocates relative to the cylinder body 217. The air cylinder 215 has a supply/exhaust nozzle 219 that communicates with a supply/exhaust port that faces a side surface of the cylinder body 217 from the inside thereof and receives air supply from an air supply source, which is not illustrated. The air cylinder 215 is configured to cause the piston rod 218 to reciprocate relative to the cylinder body 217 and perform extension/contraction operations through air supply/exhaust to/from the inside of the cylinder body 217 through the supply/exhaust nozzle 219.

The pair of air cylinders 215 are disposed to be adjacent on the front and rear sides in orientations with the projecting sides of the piston rods 218 on the mutually opposite sides at positions between the left and right sliding mechanism parts 210 on the support plate part 206. In other words, the pair of air cylinders 215 are disposed in a back-to-back orientation in a case in which the projecting sides of the piston rods 218 are defined as front surface sides. Thus, one of the air cylinders 215 disposed on the front side causes the projecting side of the piston rod 218 to face the front side, and the other air cylinder 215 disposed on the rear side causes the projecting side of the piston rod 218 to face the rear side. Also, the pair of air cylinders 215 are provided to be symmetric in the front-back direction on the support plate part 206.

The piston rod 218 of each air cylinder 215 penetrates through a rectangular parallelepiped attachment block 220 secured to the support plate part 206 with a bolt or the like. The attachment block 220 is provided at a position that is adjacent to the front side of the cylinder body 217 (the projecting side of the piston rod 218), is secured to the cylinder body 217 with a bolt, and has a through-hole 220a through which the piston rod 218 is caused to penetrate. Each air cylinder 215 is secured to the support plate part 206 via the attachment block 220.

The distal end part of the piston rod 218 is provided with a pressurizing pin 221. The pressurizing pin 221 is a bolt-shaped member and is secured to the piston rod 218 by being screw-inserted into the piston rod 218 from the distal end side. An end surface of the pressurizing pin 221 serves as a pressurizing surface 221a that has a pressurizing action on the pressurized parts 216. The air cylinder 215 and the attachment block 220 are inserted between the support plate part 206 and the X-direction moving plate 202.

Each pressurized part 216 has a pressurized pin 226 provided to face the piston rod 218 and a support plate 227 that supports the pressurized pin 226 at the X-direction moving plate 202. The support plate 227 is a plate-shaped member with a smaller piece shape than the X-direction moving plate 202 and is provided at a center part in the left-right direction of the front and back edge parts of the X-direction moving plate 202. The support plate 227 is secured to the X-direction moving plate 202 with a bolt 228 with the upper edge part caused to follow the side surfaces 202a on the front and rear sides of the X-direction moving plate 202.

The pressurized pin 226 is a bolt-shaped member and is secured to and supported at the support plate 227 with a fastening member 226b in a state in which a lower end part of the support plate 227 penetrates therethrough from the outward side in the front-back direction. The pressurized pin 226 has an end surface on the side projecting inward in the front-back direction as a pressurized surface 226a, and the pressurized surface 226a is caused to face the pressurizing surface 221a of the pressurizing pin 221.

With the configuration as described above, the X-direction centering mechanism locks the relative positions of the XY-axis support base 201 and the X-direction moving plate 202 at predetermined positions in the X direction by causing the pressurizing pin 221 to abut on the pressurized pin 226 through an operation of the pair of air cylinders 215. Specific description will be given below.

The pair of air cylinders 215 cause the piston rods 218 to be positioned on the projecting side and cause the pressurizing pins 221 to abut on the pressurized pins 226 in the operating state. In other words, a state in which the pressurizing surfaces 221a of the pressurizing pins 221 are in contact with the pressurized surfaces 226a of the pressurized pins 226 is obtained. Here, the amounts of projection of the piston rods 218 at the pair of air cylinders 215 are mutually the same amounts. In this manner, the relative positions of the XY-axis support base 201 and the X-direction moving plate 202 in the front-back direction are positioned in a form in which the pair of air cylinders 215 are stretched between the front and rear pressurized parts 216 in the front-back direction. Such a state is a centered state in the X direction.

On the other hand, the pair of air cylinders 215 cause the piston rods 218 to be positioned on the opposite side of the projecting side and cause the pressurizing pins 221 to be separated from the pressurized pins 226 in the non-operating state. In a state in which the pressurizing pins 221 are separated from the pressurized pins 226, the relative movement of the XY-axis support base 201 and the X-direction moving plate 202 in the X direction is allowed within a range of clearances between the pressurizing pins 221 and the pressurized pins 226. In other words, in the state in which the pressurizing pins 221 are separated from the pressurized pins 226, the relative movement of the XY-axis support base 201 and the X-direction moving plate 202 is allowed by the clearance between the pressurizing pins 221 and the pressurized pins 226, and the movement range thereof is restricted up to a movement range in which the pressurizing surfaces 221a come into contact with the pressurized surfaces 226a on both the front and rear sides.

Therefore, a state in which the material handling device 21 supported at the third subunit 123 via the second subunit 122 and the first subunit 121 is floating-supported in the X direction within the movement range of the XY-axis support base 201 in the X direction relative to the X-direction moving plate 202 is obtained by the pair of air cylinders 215 being brought into the non-operating state.

The Y-direction moving plate 203 is a rectangular plate-shaped member with substantially the same outer dimension as that of the X-direction moving plate 202 and is provided in parallel with the X-direction moving plate 202 above the X-direction moving plate 202. The Y-direction moving plate 203 is provided to be relatively movable in the Y direction relative to the X direction moving plate 202 via a pair of front and back sliding mechanism parts 230 configuring the Y-direction shift mechanism part 72.

The Y-direction shift mechanism part 72 includes a configuration similar to that of the X-direction shift mechanism part 71 with the shift direction in the Y direction as compared with the X-direction shift mechanism part 71 provided between the support plate part 206 of the XY-axis support base 201 and the X-direction moving plate 202. In other words, the Y-direction shift mechanism part 72 includes the configuration similar to that of the X-direction shift mechanism part 71 in a form in which the configuration is rotated by 90° in a plan view, between the X-direction moving plate 202 and the Y-direction moving plate 203.

The sliding mechanism parts 230 have a sliding direction in the Y direction and have linear-shaped linear guides 230a secured above the X-direction moving plate 202 and sliders 230b that are slidably engaged with the linear guides 230a. The Y-direction moving plate 203 is secured above the sliders 230b of the front and back sliding mechanism parts 230 with bolts or the like. In other words, the Y-direction moving plate 203 moves in the X direction integrally with the left and right sliders 230b relative to the X-direction moving plate 202.

Also, in the Y-direction shift mechanism part 72, a shift-lock mechanism 231 for locking the Y-direction moving plate 203 at an arbitrary position is provided for each sliding mechanism part 230. The shift-lock mechanism 231 is slidably engaged with the linear guide 230a and is secured to the Y-direction moving plate 203 similarly to the slider 230b and is provided at a position adjacent to the slider 230b on the linear guide 230a.

The shift-lock mechanism 231 includes a configuration similar to that of the shift-lock mechanism 211 included in the X-direction shift mechanism part 71 and has a body 231a to be engaged with the linear guide 210a and a pair of pinching mechanisms for pinching the linear guide 210a with a pressure contact in the width direction and clamping the linear guide 210a. Also, the shift-lock mechanism 231 has a case 231b that accommodates a spring configuring each pinching mechanism and a supply/exhaust nozzle 231c that communicates with a supply/exhaust passage in the body 231a. In addition, the shift-lock mechanism 231 has a passage for supplying/exhausting an air pressure and is configured to free the clamping of the linear guide 230a when the air pressure is supplied and clamp and lock the linear guide 230a when the air pressure is exhausted.

With such a configuration, a non-movable state and a movable state of the Y-direction moving plate 203 relative to the X-direction moving plate 202 are switched through switching between clamping and unclamping operations of the shift-lock mechanism 231 for movement of the Y-direction moving plate 203 provided to be movable in the Y direction relative to the X-direction moving plate 202. In this manner, the movement of the Y-direction moving plate 203 in the Y direction relative to the X-direction moving plate 202 is locked at an arbitrary position. Thus, the Y-direction shift mechanism part 72 has the shift-lock mechanism 231 that causes the support body part 70 to stop moving in the direction in which the support body part 70 supported indirectly at the X-direction moving plate 202 is movably supported, that is, in the Y direction.

Also, the Y-direction shift mechanism part 72 has a Y-direction centering mechanism for centering relative movement of the X-direction moving plate 202 and the Y-direction moving plate 203 in the Y direction using the pair of sliding mechanism parts 230. The Y-direction centering mechanism includes a configuration similar to that of the X-direction centering mechanism and has a pair of air cylinders 235 and pressurized parts 236 that receive operations of the air cylinders 235.

The air cylinders 235 are cylinder mechanisms similar to that of the air cylinders 215, have cylinder bodies 237, piston rods 238, and supply/exhaust nozzles 239, and are configured to perform extension/contraction operations through air supply/exhaust to/from the inside of the cylinder bodies 237 through the supply/exhaust nozzles 239. Also, the pair of air cylinders 235 are disposed to be adjacent on the left and right sides in an orientation with the projecting sides of the piston rods 238 on mutually opposite sides at positions between the front and rear sliding mechanism parts 230 on the X-direction moving plate 202.

The piston rod 238 of each air cylinder 235 penetrates through a rectangular parallelepiped attachment block 240 secured to the X-direction moving plate 202 with a bolt or the like. The attachment block 240 is provided at a position adjacent to the front side of the cylinder body 237 (the projecting side of the piston rod 238), is secured to the cylinder body 237 with a bolt, and has a through-hole 240a through which the piston rod 238 is caused to penetrate. Each air cylinder 235 is secured to the X-direction moving plate 202 via the attachment block 240.

Pressurizing pins 241 that have pressurizing surfaces 241a are provided at distal end parts of the piston rods 238 similarly to the pressurizing pins 221 in the X-direction shift mechanism part 71. The air cylinders 235 and the attachment block 240 are interposed between the X-direction moving plate 202 and the Y-direction moving plate 203.

The pressurized parts 236 include configurations similar to those of the pressurized parts 216 in the X-direction shift mechanism part 71 and have pressurized pins 246 provided to face the piston rods 238 and support plates 247 that support the pressurized pins 246 at the Y-direction moving plate 203.

The support plates 247 are plate-shaped members with smaller piece shapes than the Y-direction moving plate 203 and are provided at center parts in the front-back direction of left and right edge parts of the Y-direction moving plate 203. The support plates 247 have upper edge parts caused to follow left and right side surfaces 203a of the Y-direction moving plate 203 and are secured to the Y-direction moving plate 203 with bolts 248. The pressurized pins 246 are secured to and supported at the support plate 227 with fastening members 246b in a state in which the pressurized pins 246 penetrate through lower end parts of the support plates 247 from the outward side in the left-right direction. The pressurized pins 246 have end surfaces on the side of projecting inward in the left-right direction as pressurized surfaces 246a and cause the pressurized surfaces 246a to face the pressurizing surfaces 241a of the pressurizing pins 241.

With the configuration as described above, the Y-direction centering mechanism locks the relative positions of the X-direction moving plate 202 and the Y-direction moving plate 203 at predetermined positions in the Y direction by causing the pressurizing pins 241 to abut on the pressurized pins 246 through an operation of the pair of air cylinders 235.

In other words, the pair of air cylinders 235 position the relative positions of the X-direction moving plate 202 and the Y-direction moving plate 203 in the left-right direction in a form in which the pair of air cylinders 235 are stretched between the front and rear pressurized parts 236 in the left-right direction by causing the pressurizing pins 241 to abut on the pressurized pins 246 in the operating state. Such a state is a centered state in the Y direction. On the other hand, the pair of air cylinders 235 allow relative movement of the X-direction moving plate 202 and the Y-direction moving plate 203 in the Y direction within a range of clearances between the pressurizing pins 241 and the pressurized pins 246 by separating the pressurizing pins 241 from the pressurized pins 246 in the non-operating state thereof.

Therefore, a state in which the material handling device 21 supported at the third subunit 123 via the second subunit 122 and the first subunit 121 is floating-supported in the Y direction within the movement range of the X-direction moving plate 202 in the Y direction relative to the Y-direction moving plate 203 is obtained by the pair of air cylinders 235 being brought into the non-operating state.

Also, the third subunit 123 supports the second subunit 122 at the XY-axis support base 201 such that the second subunit 122 is rotatable with a rotational shaft direction in the Y-axis direction. The third subunit 123 supports the second subunit 122 between a pair of left and right Y-axis rotation support arm parts 207.

Figure 48:
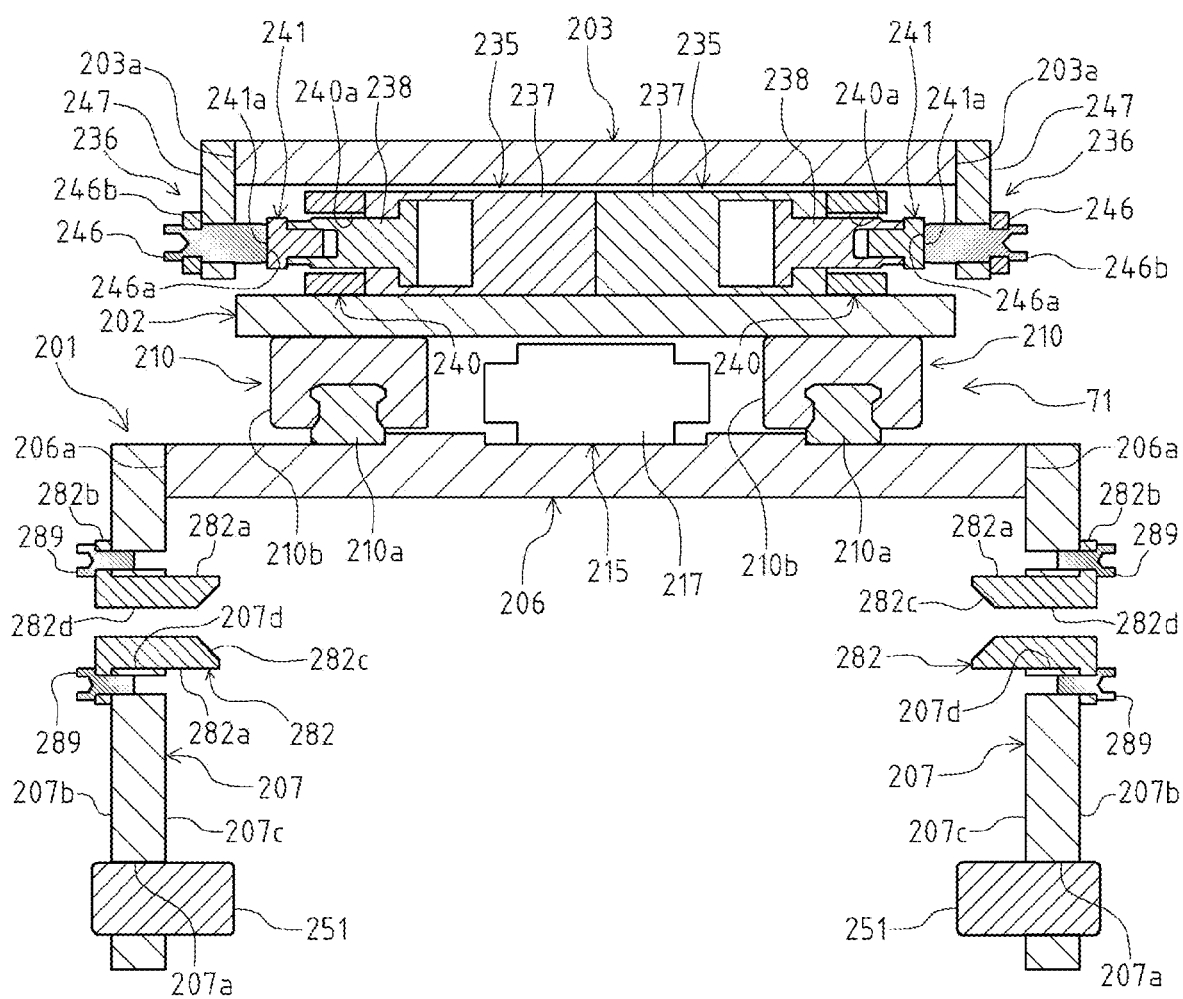
FIG. 48 is an end view of combined parts cut along the F-G-H-I-J-K line in FIG. 46.
Figure 49:
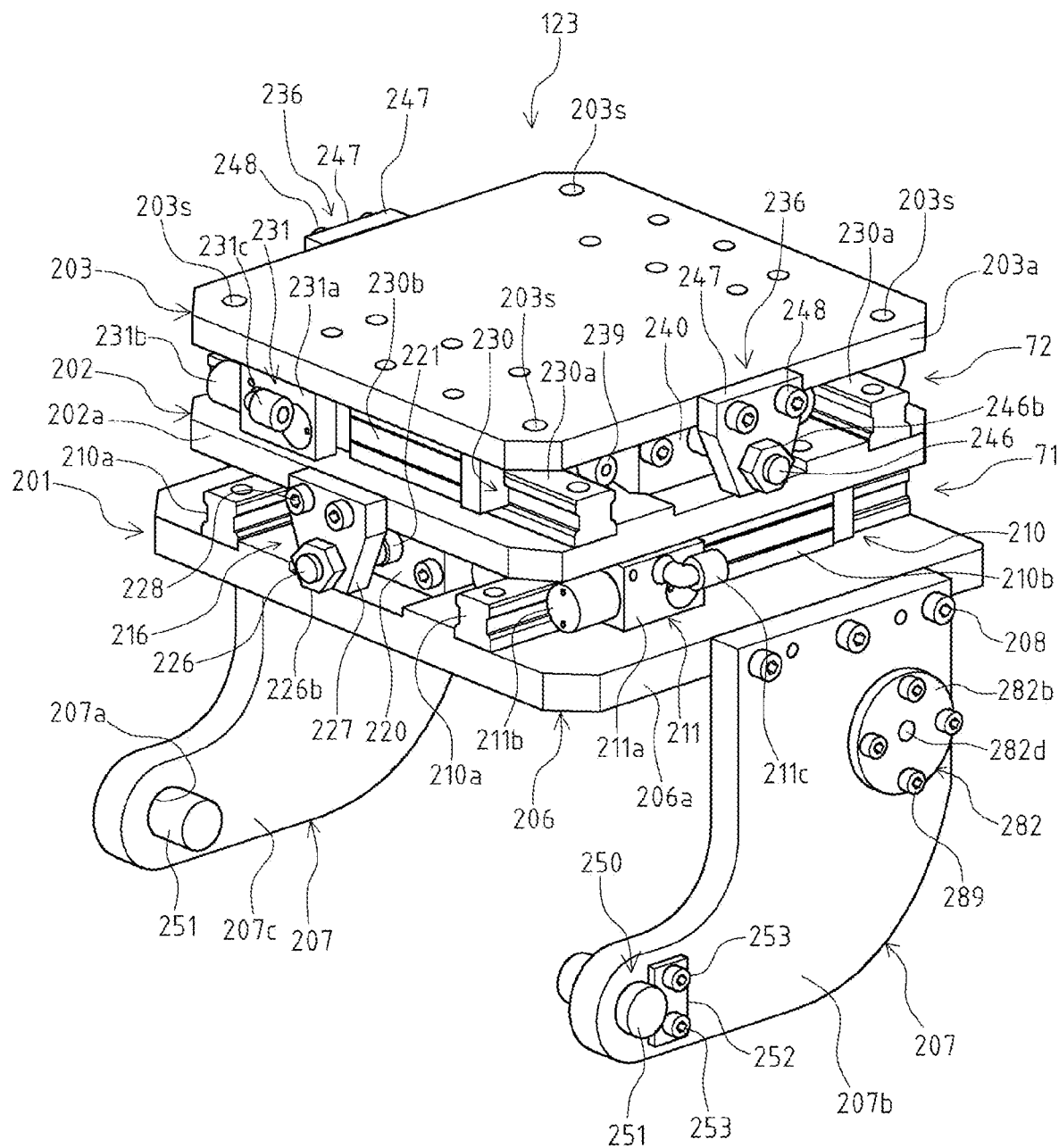
FIG. 49 is a front-side perspective view of the third subunit according to the embodiment of the present invention.
Figure 50:
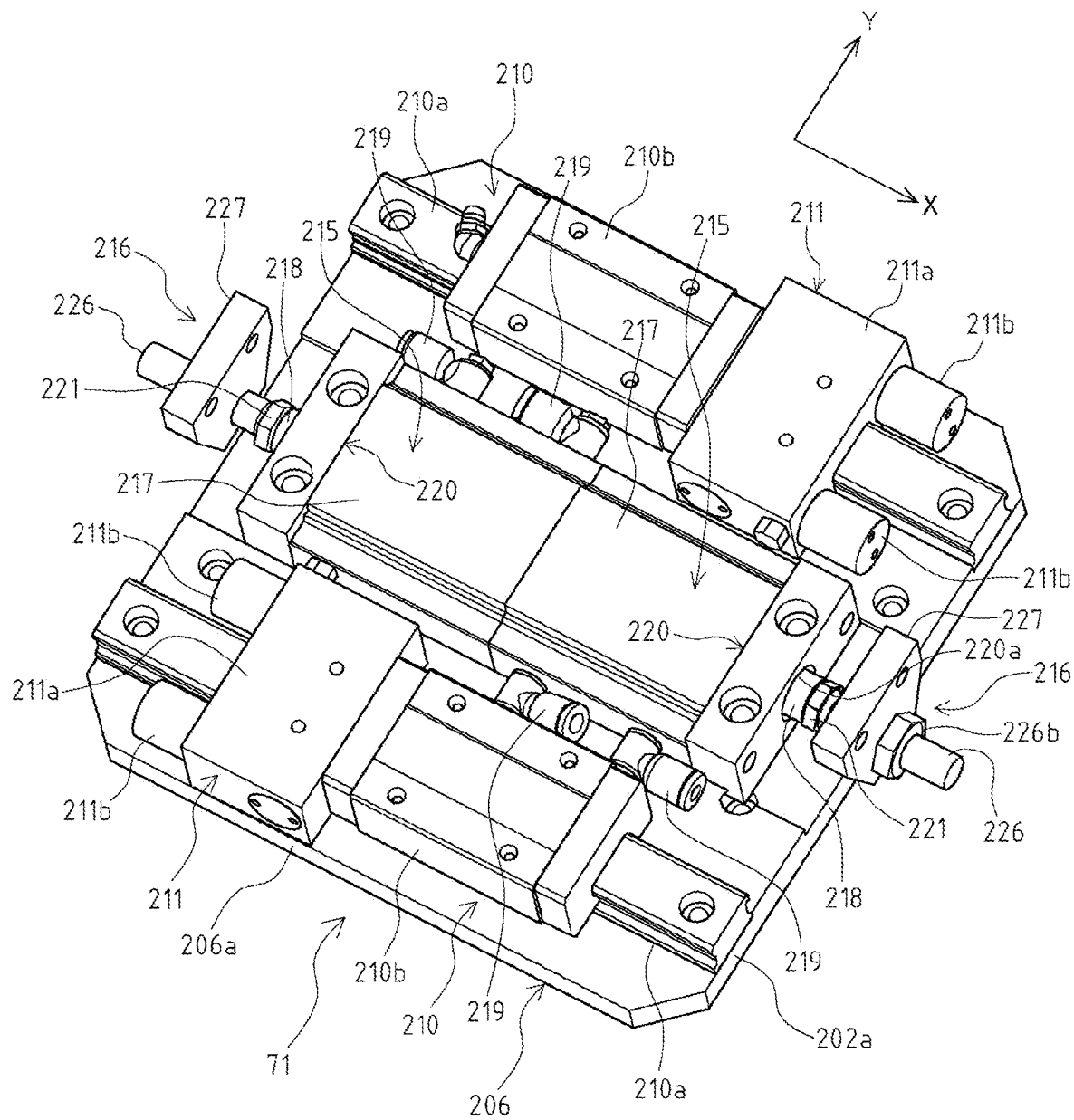
FIG. 50 is an upper-side perspective view illustrating an X-direction shift mechanism part according to the embodiment of the present invention.

Specifically, the second subunit 122 is rotatably supported by an axial support member 250 provided at each Y-axis rotation support arm part 207 as illustrated in FIGS. 21, 48, and the like. The axial support member 250 has a body shaft part 251 that is a cylindrical portion and an attachment plate part 252 that is for securing the axial support member 250 to the arm part for Y-axis rotation 163. The axial support member 250 supports the second subunit 122 at the Y-axis rotation support arm part 207 with an axial direction (center axis direction) of the body shaft part 251 in the Y-axis direction.

The attachment plate part 252 is a rectangular plate-shaped portion, has a plate thickness direction in the axial direction of the body shaft part 251, and is provided integrally with the body shaft part 251 in a form in which a side thereof on one side is positioned like a tangent line with respect to the outer circumferential surface of the body shaft part 251 at a midpoint part of the body shaft part 251 in the axial direction. The attachment plate part 252 is provided by a rectangular plate-shaped member being secured to the body shaft part 251 through welding or the like, for example.

The axial support members 250 are provided in a state in which the body shaft parts 251 are caused to penetrate through through-holes 207a formed at forward projecting portions of the Y-axis rotation support arm parts 207. The axial support members 250 are secured to the Y-axis rotation support arm parts 207 with bolts 253 penetrating through the attachment plate parts 252 and screw-inserted into the Y-axis rotation support arm parts 207 in a state in which the attachment plate parts 252 are caused to be positioned on the side of plate surfaces 207b on the outward sides in the left-right direction of the Y-axis rotation support arm parts 207.

The projecting portions of the body shaft parts 251 from plate surfaces 207c on left and right inward side of the Y-axis rotation support arm parts 207 are inserted and fitted into support hole parts 255 (see FIG. 42 and the like) provided at arm portions 163a of the arm parts for Y-axis rotation 163 in the second subunit 122 that is positioned on left and right inward side of the Y-axis rotation support arm parts 207. In other words, the portions of the body shaft parts 251 projecting inward in the left-right direction serve as axial support parts, and the second subunit 122 is axially supported by the left and right axial support parts from both left and right sides such that the second subunit 122 is rotatable about the Y axis.

With the configuration as described above, the second subunit 122 is rotatably supported relative to the third subunit 123. Also, the second subunit 122 is configured to be balanced with reference to a neutral position by the pair of left and right cylinder mechanisms for Y-axis rotation 78 for the rotation of the second subunit 122 about the Y axis relative to the third subunit 123. In other words, the floating unit 20 has the pair of left and right cylinder mechanisms for Y-axis rotation 78 as a balancer for supporting the second subunit 122 about the Y axis relative to the third subunit 123 in a floating state.

As illustrated in FIGS. 19 and 20, the cylinder mechanisms for Y-axis rotation 78 are single rod-type air cylinder mechanisms and have substantially square tubular cylinder bodies 261 and piston rods 262 that reciprocate relative to the cylinder bodies 261. The cylinder mechanisms for Y-axis rotation 78 have supply/exhaust nozzles 263 that communicate with supply/exhaust ports that face side surfaces of the cylinder bodies 261 from the inside thereof, are connected to regulators (not illustrated) such as electro-pneumatic regulators, for example, and receive air supply with pressures controlled by the electro-pneumatic regulators. The cylinder mechanisms for Y-axis rotation 78 are configured to cause the piston rods 262 to reciprocate relative to the cylinder bodies 261 and perform extension/contraction operations through air supply/exhaust to/from the inside of the cylinder bodies 261 through the supply/exhaust nozzles 263.

Also, in the cylinder mechanisms for Y-axis rotation 78, air supply/exhaust control is performed such that the positions of the piston rods 262 are kept at predetermined neutral positions, and a floating state with reference to the neutral positions thereof is obtained for operations of the piston rods 262. In other words, the air pressure to be supplied to the cylinder mechanisms for Y-axis rotation 78 are adjusted such that the piston rods 262 are positioned at the neutral positions with the reciprocating operations thereof in accordance with loads and the like acting on the piston rods 262.

Moreover, the cylinder mechanisms for Y-axis rotation 78 have break units 265. The break units 265 are provided at positions of the piston rods 262 on the distal end sides relative to the cylinder bodies 261 and provide breaking actions to the piston rods 262. The break units 265 cause the piston rods 262 to penetrate through the inside of casing parts 266 and have brake plates acting on the piston rods 262, elastic members such as springs that bias the brake plates, and the like in the casing parts 266. The break units 265 have nozzles 267 that communicate with brake release ports that face the outward side from the inside of the casing parts 266 and are configured such that ON/OFF of the brake are switched through air supply/exhaust. In this manner, the Y-axis rotation mechanism part 75 has the brake units 265 of the cylinder mechanisms for Y-axis rotation 78 as rotation locking mechanisms that cause the support body part 70 to stop rotating in the rotational direction in which the support body part 70 supported indirectly at the second subunit 122 is rotatably supported, that is, the rotational direction about the Y axis.

The cylinder mechanisms for Y-axis rotation 78 are provided in an orientation with the projecting side of the piston rods 262 on the lower side behind the second subunit 122 and the third subunit 123. The cylinder mechanisms for Y-axis rotation 78 are provided to be bridged between the second subunit 122 and the third subunit 123 in a state in which the cylinder mechanisms for Y-axis rotation 78 are rotatably supported at the second subunit 122 and the third subunit 123 with the rotational shaft direction in the Y-axis direction. Specific description will be given below.

The cylinder mechanisms for Y-axis rotation 78 cause axial support parts 268 provided at the distal end parts of the piston rods 262 to be axially supported at rod support parts 269 provided on the rear surface 162c of the body plate part 162 such that the axial support parts 268 are rotatable about the Y axis, with respect to the second subunit 122. The axial support parts 268 have support plate parts 268a that are pair of plate-shaped portions that face each other in the left-right direction and are substantially "U"-shaped portions with opened side on the distal end sides of the piston rods 262. The support plate parts 268a include support holes formed to penetrate therethrough in the left-right direction.

The rod support parts 269 are provided by rectangular parallelepiped support members 270 being secured to the rear surface 162c of the body plate part 162 with bolts 271. Lower end parts of the support members 270 are provided with projecting parts 270a projecting backward with semicircular shapes in a side view, and the projecting parts 270a include support holes 270b formed to penetrate therethrough in the left-right direction. The axial support parts 268 are rotatably supported at the rod support parts 269 with the axial support members 272 that penetrate through the support holes of the pair of support plate parts 268a and the projecting parts 270a in a state in which the projecting parts 270a are caused to be interposed between the pair of support plate parts 268a.

On the other hand, the cylinder mechanisms for Y-axis rotation 78 are supported at the third subunit 123 via a stay member 273 such that the cylinder mechanisms for Y-axis rotation 78 are rotatable about the Y axis. The stay member 273 has a rectangular plate-shaped attachment plate part 274 and support arm parts 275 on both left and right sides provided to extend from the attachment plate part 274 on the obliquely rear and lower side and is configured into a gate shape as a whole.

The stay member 273 is supported at the support plate part 206 by the attachment plate part 274 being secured to a plate surface 206b on the lower side of the support plate part 206 with a bolt 276. The stay member 273 causes an intermediate part of the cylinder mechanisms for Y-axis rotation 78 in the lengthwise direction to be positioned between distal end parts of the left and right support arm parts 275, and the cylinder mechanisms for Y-axis rotation 78 are supported by axial support members 275a positioned at the distal end parts of the support arm parts 275 such that the cylinder mechanisms for Y-axis rotation 78 are rotatable about the Y axis.

With the configuration as described above, a floating-supported state is obtained for the rotation of the second subunit 122 about the Y axis relative to the third subunit 123 with the extension/contraction operations of the cylinder mechanisms for Y-axis rotation 78. Note that the configuration for floating-supporting the second subunit 122 about the Y-axis is not limited to the cylinder mechanisms for Y-axis rotation 78, and another cylinder such as a hydraulic cylinder, for example, and another actuator are appropriately used.

As described above, in the floating unit 20 according to the present embodiment, the configuration in which the second subunit 122 is supported to be rotatable about the Y axis relative to the third subunit 123 and the pair of cylinder mechanisms for Y-axis rotation 78 acting on the rotation of the second subunit 122 about the Y axis configure the Y-axis rotation mechanism part 75.

A disposition form of the cylinder mechanisms for Y-axis rotation 78 will be described in detail. As illustrated in FIG. 20, the pair of cylinder mechanisms for Y-axis rotation 78 are provided in inclined shapes in orientations with the distal end sides of the piston rods 262 on the front lower side and with the proximal end sides (the side of the cylinder bodies 261) on the rear upper side relative to the Z direction (vertical direction) illustrated by the reference ling L1. In other words, the cylinder mechanisms for Y-axis rotation 78 are supported in backward inclined shapes such that the extension/contraction operation direction illustrated by the straight line L2 corresponding to the lengthwise direction thereof forms a predetermined inclination angle α1 with respect to the Z direction (vertical direction) illustrated by the reference line L1.

In the present embodiment, the inclination angle α1 is an angle within a range of 20 to 40° (about 25°, for example). However, the inclination angle α1 for the cylinder mechanisms for Y-axis rotation 78 is an acute angle, and the size thereof is not particularly limited. Also, the inclination angle α1 described here is defined as an inclination angle of the cylinder mechanisms for Y-axis rotation 78 in the centered state achieved by a Y-axis rotation centering mechanism, which will be described later.

As descried above, in the floating unit 20 according to the present embodiment, the Y-axis rotation mechanism part 75 has the cylinder mechanisms for Y-axis rotation 78 provided to have an extension/contraction direction in an inclined direction relative to the Z direction, and the support body part 70 rotatably supported by a predetermined rotational shaft Cl along the Y direction is floating-supported for rotation with the rotational shaft Cl at the center through extension/contraction operations of the cylinder mechanisms for Y-axis rotation 78.

Here, the rotational shaft Cl is a rotational shaft of the second subunit 122 about the Y axis relative to the third subunit 123 and conforms to the center axis of the body shaft part 251 of the axial support member 250. In addition, the support body part 70 configuring the first subunit 121 provided integrally with the second subunit 122 is rotatably supported relative to the third subunit 123 with the rotational shaft Cl at the center.

Figure 51:
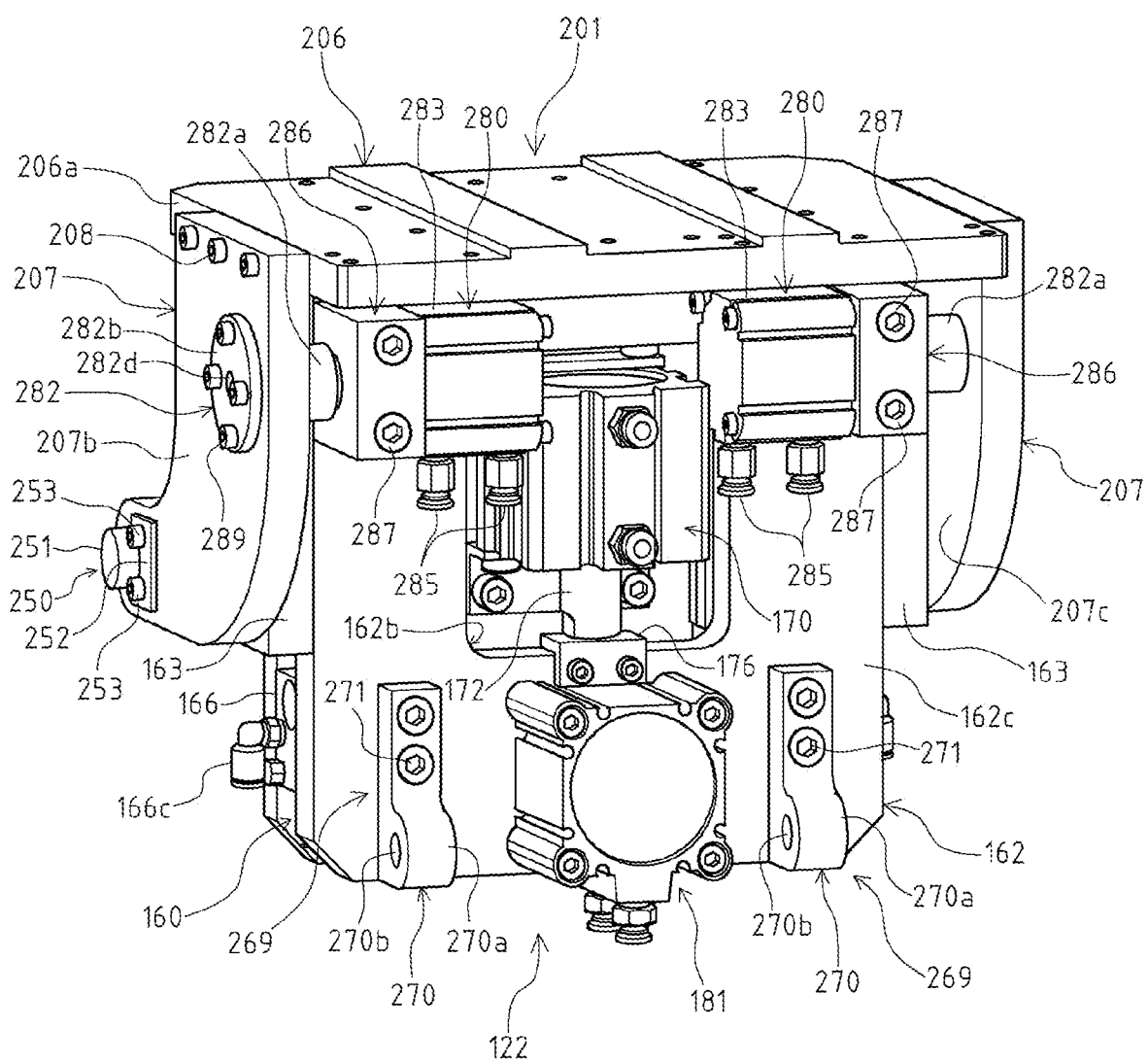
FIG. 51 is a rear-side perspective view illustrating a part of a configuration of a Y-axis rotation mechanism part according to the embodiment of the present invention.
Figure 52:
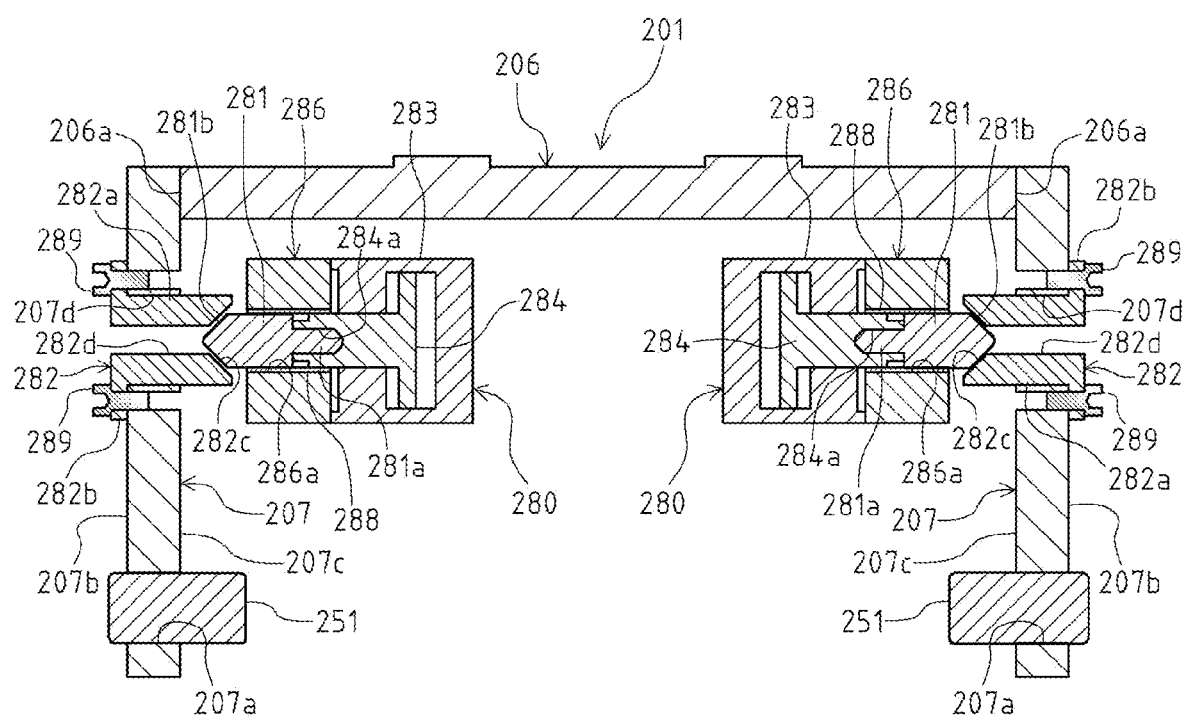
FIG. 52 is a rear sectional view illustrating a configuration of a Y-axis rotation centering mechanism according to the embodiment of the present invention.
Figure 53:
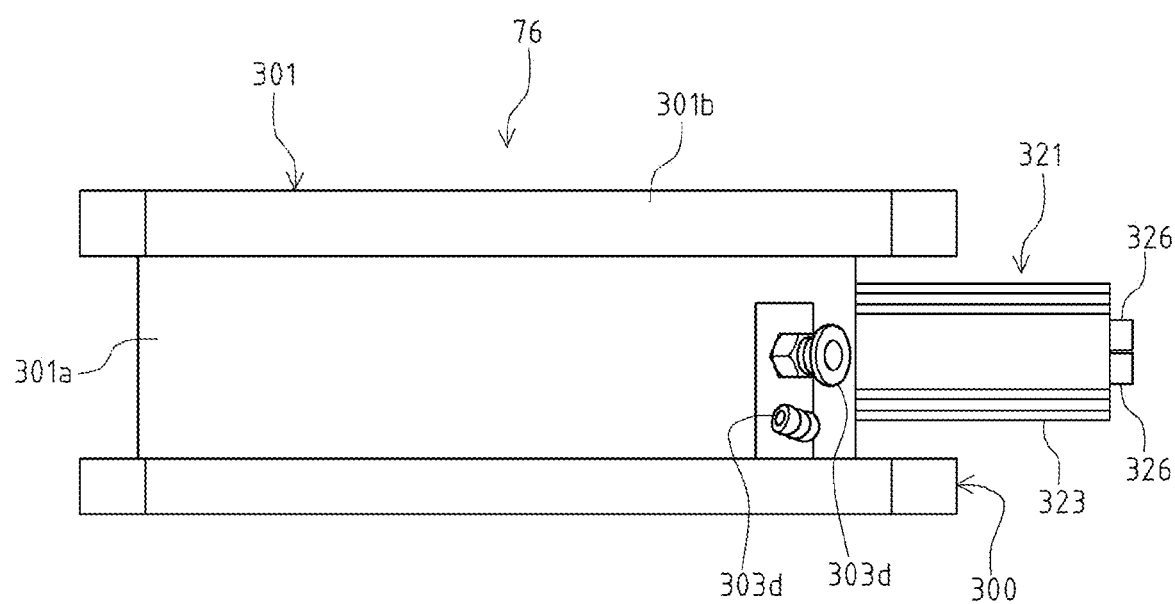
FIG. 53 is a front view of a Z-axis rotation mechanism part according to the embodiment of the present invention.
Figure 54:
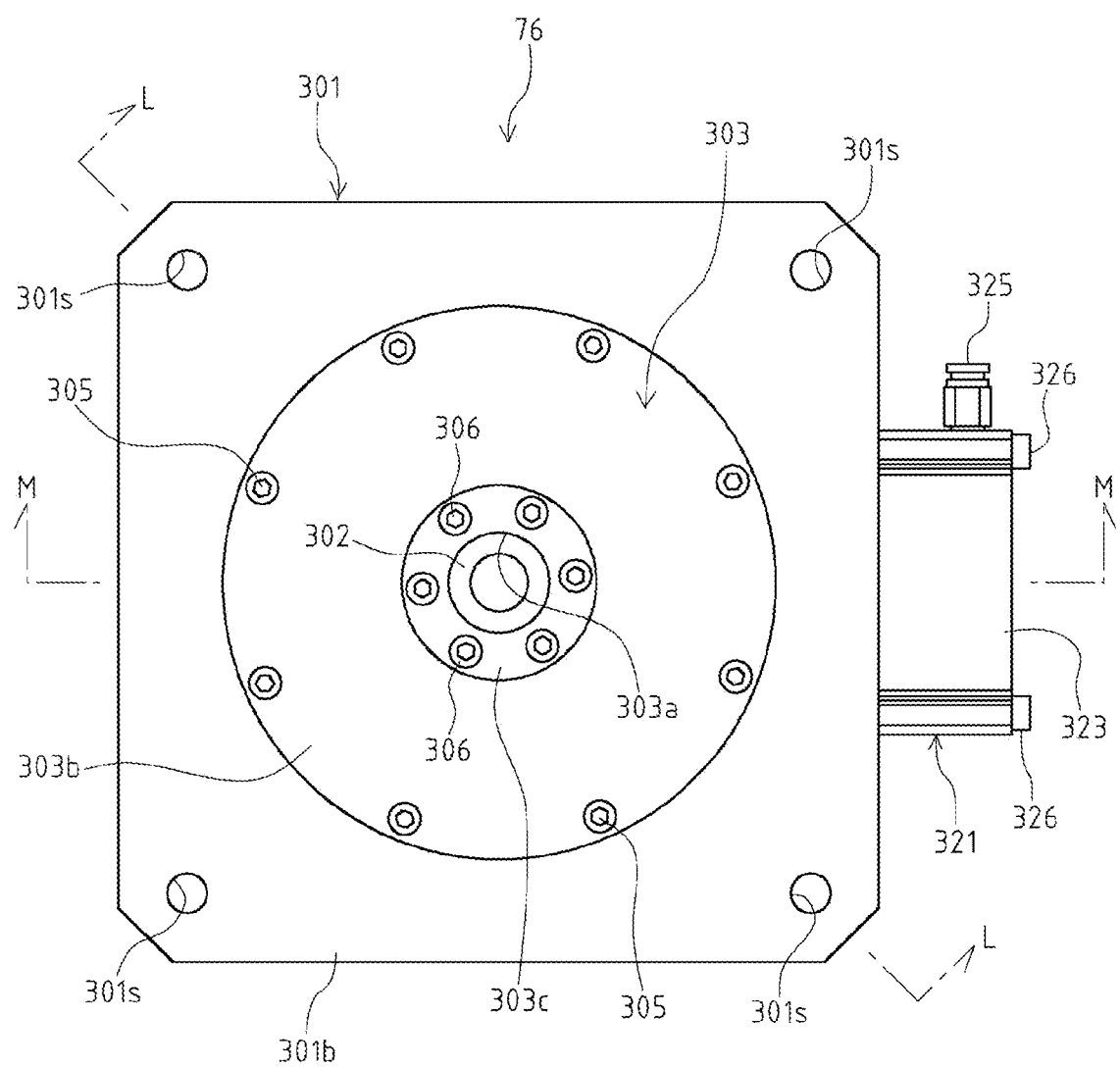
FIG. 54 is a plan view of the Z-axis rotation mechanism part according to the embodiment of the present invention.
Figure 55:
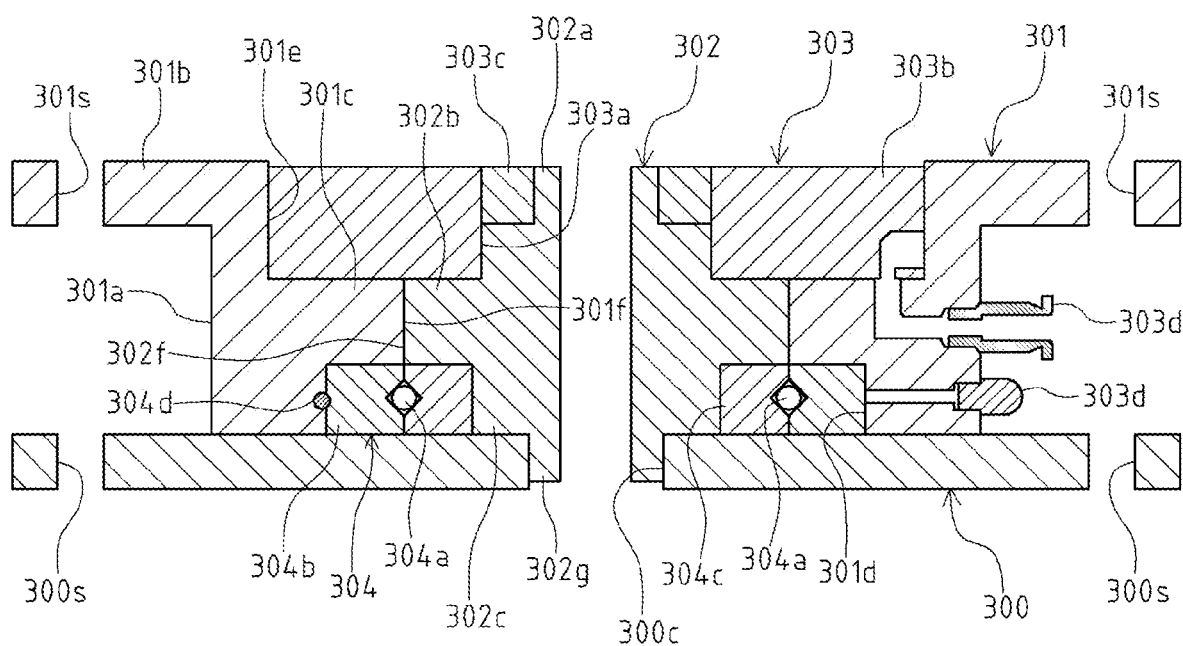
FIG. 55 is an end view of a part cut along the line L-L in FIG. 54.
Figure 56:
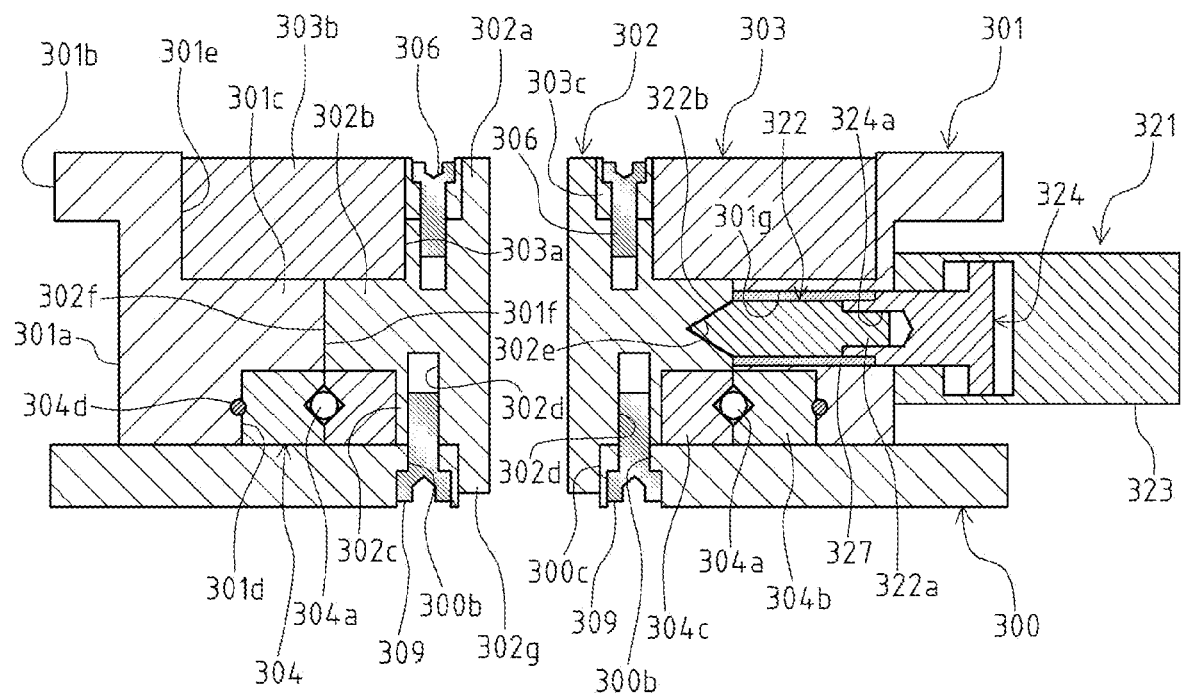
FIG. 56 is an end view of a part cut along the line M-M in FIG. 54.
Figure 57:
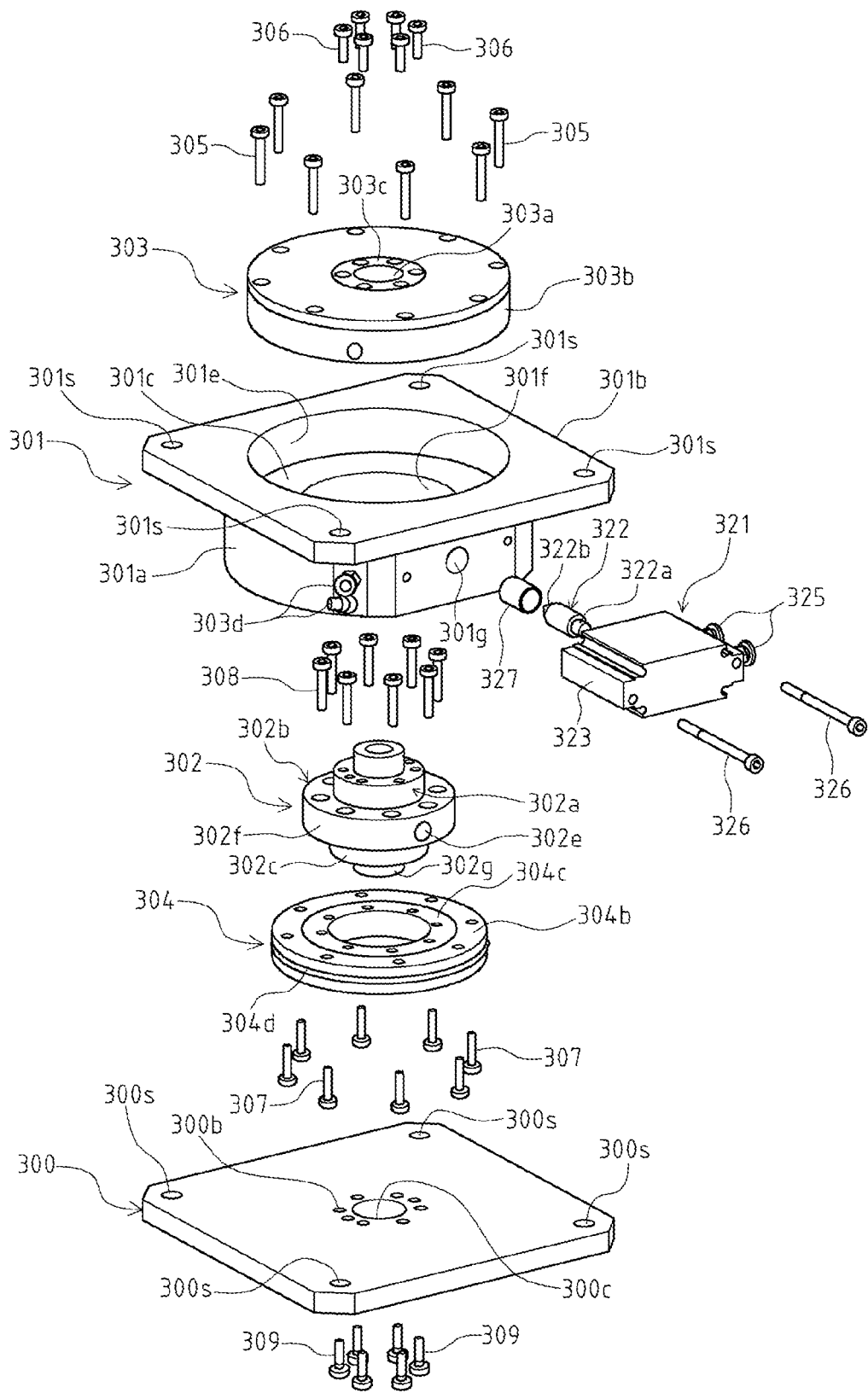
FIG. 57 is an exploded perspective view of the Z-axis rotation mechanism part according to the embodiment of the present invention.
Figure 58:
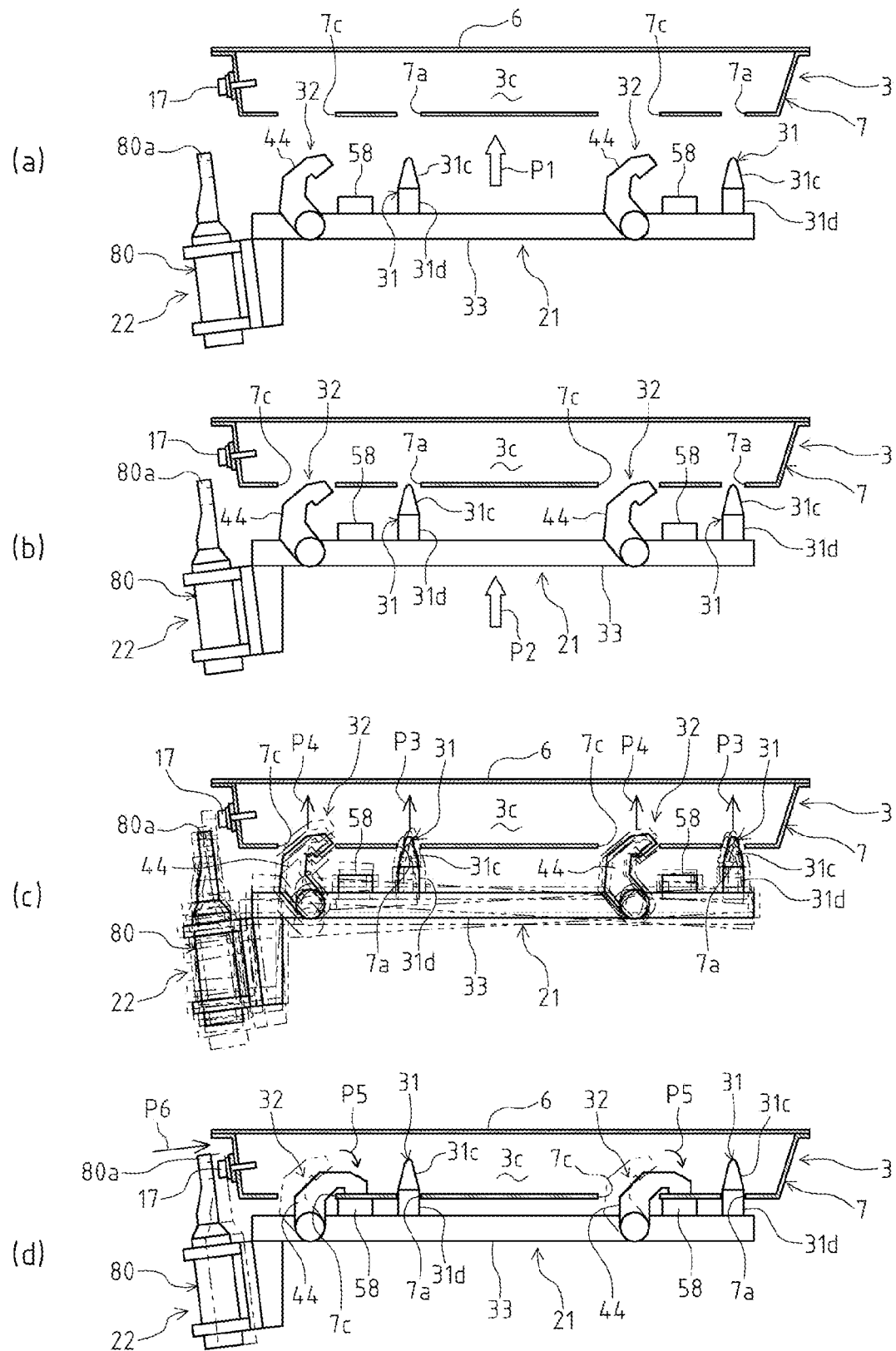
FIG. 58 is an operation explanatory diagram of the door detaching device and the floating unit according to the embodiment of the present invention.

Also, the Y-axis rotation mechanism part 75 has a Y-axis rotation centering mechanism for centering rotation of the second subunit 122 about the Y axis relative to the third subunit 123. As illustrated in FIGS. 51 and 52, the Y-axis rotation centering mechanism has a pair of left and right air cylinders 280, locking pins 281, and locked tubes 282 that receive engagement of the locking pins 281 and lock the second subunit 122 at a predetermined position in the rotational direction about the Y axis by causing the locking pins 281 to be engaged with the engaged tubes 282 through an operation of the air cylinders 280. In other words, the Y-axis rotation centering mechanism restricts the rotation of the second subunit 122 about the Y axis at the predetermined centering position by causing the second subunit 122 provided to be rotatable relative to the third subunit 123 by the rotational shaft Cl to be engaged with the third subunit 123 at a position different from that of the rotational shaft Cl in the X-Z plane.

The air cylinders 280 are single rod-type cylinder mechanisms and have substantially rectangular parallelepiped cylinder bodies 283 and piston rods 284 that reciprocate relative to the cylinder bodies 283. The air cylinders 280 have supply/exhaust nozzles 285 that communicate with supply/exhaust ports that face the side surfaces of the cylinder bodies 283 from the inside thereof and receive air supply from air supply sources, which are not illustrated. The air cylinders 280 are configured to cause the piston rods 284 to reciprocate relative to the cylinder bodies 283 and perform extension/contraction operations through air supply/exhaust to/from the inside of the cylinder bodies 283 through the supply/exhaust nozzles 285.

Each air cylinder 280 is secured on each of both left and right sides of an upper portion of the rear surface 162c of the body plate part 162 with the projecting side of the piston rod 284 on the outward side in the left-right direction. The air cylinders 280 are secured to the body plate part 162 via attachment blocks 286 provided on outward sides of the cylinder bodies 283 in the left-right direction. The attachment blocks 286 cause the piston rods 284 to be inserted into through-holes 286a formed at center parts thereof and are secured to the body plate part 162 with bolts 287.

The locking pins 281 are secured coaxially with the piston rods 284 on the distal end sides thereof. The locking pins 281 form portions with substantially the same diameter as that of the piston rods 284. The piston rods 284 penetrate through the through-holes 286a of the attachment blocks 286 and project outward sides of the attachment blocks 286 in the left-right direction. Cylindrical bushings 288 that have substantially the same inner diameter as the outer diameter of the locking pins 281 and cause the locking pins 281 to penetrate therethrough are inserted and fitted into the through-holes 286a of the attachment blocks 286. With the configuration as described above, the locking pins 281 are configured to appear from the side surfaces 286b on the outward sides of the attachment blocks 286 in the left-right direction via the through-holes 286a of the attachment blocks 286 through an operation of the air cylinders 280.

The locking pins 281 are shaft-shaped members, have an axial direction in the Y direction, and reciprocate in the left-right direction integrally with the piston rods 284 with operations of the air cylinders 280. The locking pins 281 have male screw parts 281a with diameter reduced shapes at end parts on the proximal end side and are screwed into and fixed to female screw parts 284a formed at the piston rods 284 on the distal end sides. Also, the locking pins 281 have conical tapered parts 281b at end parts thereof on the distal end sides.

The left and right locking pins 281 are provided with locked tubes 282 that receive engagement of the locking pins 281 on outward sides of the locking pins 281 in the left-right direction. The locked tubes 282 have cylindrical body parts 282a and flange parts 282b formed at end parts of the body parts 282a on one side in the center axis direction. The locked tubes 282 are secured to the Y-axis rotation support arm parts 207 with bolts 289 penetrating through the flange parts 282b in a state in which the body parts 282a are caused to penetrate through through-holes 207d formed in the Y-axis rotation support arm parts 207 and the flange parts 282b are caused to come into contact with the plate surfaces 207b on the outward sides of the Y-axis rotation support arm parts 207 in the left-right direction. The locked tubes 282 are provided at positions on coaxial cores relative to the locking pins 281 in the Y-axis rotation support arm parts 207.

In the locked tubes 282, engagement fitting recessed parts 282c that receive the tapered parts 281b of the locking pins 281 are formed at end parts of the body parts 282a on the opposite side of the side of the flange parts 282b. The engagement fitting recessed parts 282c are recessed parts with shapes following the conical shapes to conform to the conical outer shapes of the tapered parts 281b. Note that the locked tubes 282 have, at center shaft parts thereof, through-holes 282d opened at the engagement fitting recessed parts 282c on one side and opened outward from the flange parts 282b on the other side and have penetrating shapes as a whole. In the configuration in which the second subunit 122 is supported to be rotatable about the Y axis relative to the third subunit 123, the locked tubes 282 are provided at predetermined positions such that the locked position of the second subunit 122 with the locking pins 281 corresponds to a predetermined center position of the support body part 70 in regard to the rotation angle of the second subunit 122 about the Y axis.

The air cylinders 280 cause the piston rods 284 to be positioned on the outward sides in the left-right direction (projecting sides) and cause the locking pins 281 to be engaged with the locked tubes 282 in the operating state thereof. Here, the locking pins 281 causes the tapered parts 281b thereof to be fitted into the engagement fitting recessed parts 282c of the locked tubes 282 to fix the rotation of the second subunit 122 about the Y axis relative to the third subunit 123 at a predetermined position. The support body part 70 configuring the first subunit 121 secured to the second subunit 122 is centered about the Y axis by the second subunit 122 being secured in this manner. Thus, the material handling device 21 attached to the support body part 70 via the chuck mechanism 60 is centered in regard to the rotation position about the Y axis.

On the other hand, the air cylinders 280 cause the piston rods 284 to be positioned on the inward sides (opposite sides of the projecting sides) in the left-right direction and release the engagement of the locking pins 281 with the locked tubes 282 in the non-operating state thereof. In the engagement released state, the sharp ends of the tapered parts 281b of the locking pins 281 are positioned at portions on the outward side of the engagement fitting recessed parts 282c (inward sides in the left-right direction), and the rotation of the second subunit 122 about the Y axis relative to the third subunit 123 is allowed within a range of clearances (margin) from the conical inner circumferential surfaces that form the engagement fitting recessed parts 282c. In other words, in the engagement released state of the locking pins 281, the locking pins 281 cause the sharp ends of the tapered parts 281b thereof to be positioned inside the engagement fitting recessed parts 282c (to project outward in the left-right direction beyond the inward ends of the body parts 282a in the left-right direction), the rotation of the second subunit 122 about the Y axis is allowed, and the rotation range is restricted up to the rotation range in which the sharp ends of the tapered parts 281b come into contact with the inner circumferential surfaces that form the engagement fitting recessed parts 282c (interferes with the locked tubes 282) on both sides in the circumferential direction with the rotation shaft Cl at the center.

Therefore, a state in which the first subunit 121 secured to the second subunit 122 and supports the material handling device 21 in front of the support body part 70 is floating-supported about the Y axis with the rotational shaft Cl at the center within the rotation range of the second subunit 122 the rotation of which is restricted by the locking pins 281 is obtained by the air cylinders 280 being brought into the non-operating state (see the arrow F3 in FIG. 20).

Also, in the third subunit 123, a state in which the XY-axis support base 201 that is a portion supporting the second subunit 122 is floating-supported in the X direction by the X-direction shift mechanism part 71 at the X-direction moving plate 202 that is a configuration on the side of the rotation support unit 25 relative to the XY-axis support base 201 is obtained. Similarly, in the third subunit 123, a state in which the portion below the X-direction moving plate 202 is floating-supported in the Y direction by the Y-direction shift mechanism part 72 at the Y-direction moving plate 203 that is a configuration on the side of the rotation support unit 25 relative to the X-direction moving plate 202 is obtained. In this manner, a state in which the first subunit 121 secured in front of the second subunit 122 and supporting the material handling device 21 in front of the support body part 70 is floating-supported in each direction of the X direction and the Y direction is obtained (see the arrows F4 and F5 in FIG. 18).

Next, the Z-axis rotation mechanism part 76 will be described with reference to FIGS. 53 to 57. The Z-axis rotation mechanism part 76 has a Z-axis rotation plate 300 with substantially the same shape and dimension as those of the Y-direction moving plate 203 in the third subunit 123 and a base for Z-axis rotation 301 with substantially square outer shape to be superimposed on the Z-axis rotation plate 300 in a plan view. The Z-axis rotation mechanism part 76 rotatably supports the Z-axis rotation plate 300 at the base for Z-axis rotation 301 with a rotational shaft direction in the Z-axis direction. In the Z-axis rotation mechanism part 76, the Z-axis rotation plate 300 is supported at the base for Z-axis rotation 301 with a configuration similar to the support structure of the support body part 70 with respect to the base for X-axis rotation 126 in the X-axis rotation mechanism part 74. In other words, the Z-axis rotation plate 300 is rotatably supported at the base for Z-axis rotation 301 via a rotation shaft 302, a rotation support mechanism 303, and a bearing 304.

The base for Z-axis rotation 301 has a substantially cylindrical body part 301a with a center axis direction in the Z direction and a flange part 301b that is provided above the body part 301a, is provided to project outward in the radial direction from the body part 301a, and forms an outer shape of the base for Z-axis rotation 301 in a plan view. The base for Z-axis rotation 301 forms a hole part penetrating in the center axis direction of the body part 301a as a whole. An inner circumferential protruding part 301c at which a hole diameter (inner diameter) of the hole part of the base for Z-axis rotation 301 is partially reduced is included at the center part in the center axis direction on the inner circumferential side of the body part 301a (see FIGS. 55 and 56).

In the base for Z-axis rotation 301, a cylindrical lower fitting recessed part 301d is formed on the lower side of the base for Z-axis rotation 301 by the inner circumferential protruding part 301c. The lower fitting recessed part 301d is formed into a step-down shape relative to the lower surface of the body part 301a as a recessed part for fitting the bearing 304. Also, a cylindrical upper fitting recessed part 301e is formed on the upper side of the base for Z-axis rotation 301 by the inner circumferential protruding part 301c. The upper fitting recessed part 301e is formed into a step-down shape relative to the upper surface of the flange part 301b as a recessed part for fitting the rotation support mechanism 303.

The rotation shaft 302 has a tubular shaft part 302a with an axial direction in the Z direction and a flange part 302b that serves as a large diameter part formed at an intermediate part of the shaft part 302a in the axial direction. The rotation shaft 302 is provided inside the base for Z-axis rotation 301 in a state in which the flange part 302b is caused to conform to the portion where the inner circumferential protruding part 301c is formed and an outer circumferential surface 302f of the flange part 302b is caused to come into contact with an inner circumferential surface 301f of the inner circumferential protruding part 301c with respect to the base for Z-axis rotation 301 in the axial direction of the rotation shaft 302.

The rotation support mechanism 303 has a disk-shaped outer shape as a whole and has, at a center part, a hole part 303a into which the upper part of the rotation shaft 302 is caused to be inserted. The rotation support mechanism 303 has a donut-shaped body part 303b that forms the outer shape of the rotation support mechanism 303 and an annular attachment flange part 303c provided on the inner circumferential side of the body part 303b. The body part 303b and the attachment flange part 303c are configured to be relatively coaxially rotatable.

In the rotation support mechanism 303, the body part 303b and the attachment flange part 303c interact via an elastic member such as a spring accommodated in the body part 303b. Also, the rotation support mechanism 303 has a passage for supplying/exhausting an air pressure and receives air supply from an air supply source, which is not illustrated, via a supply/exhaust nozzle 303d attached on the outer circumferential side of the body part 301a of the base for Z-axis rotation 301. A supply/exhaust pipe structure (not illustrated) for supplying/exhausting the air pressure is connected to the supply/exhaust nozzle 303d. The rotation support mechanism 303 is configured to free the clamping of the body part 303b with the attachment flange part 303c (enables relative rotation) when the air pressure is supplied and clamp the body part 303b with the attachment flange part 303c (disables the relative rotation) at the time of exhausting.

The rotation support mechanism 303 causes the body part 303b to be secured to the base for Z-axis rotation 301 with bolts 305 at a plurality of locations in a state in which the body part 303b is fitted into the upper fitting recessed part 301e of the base for Z-axis rotation 301. Also, the attachment flange part 303c is secured to the rotation shaft 302 with the upper part caused to be inserted into the hole part 303a of the rotation support mechanism 303 with bolts 306 at a plurality of locations. On the other hand, the Z-axis rotation plate 300 is secured below the rotation shaft 302.

With such a configuration, a non-rotatable state and a rotatable state of the rotation shaft 302 relative to the base for Z-axis rotation 301 are switched through switching of clamping and unclamping operations of the rotation support mechanism 303. In this manner, the rotation of the Z-axis rotation plate 300 about the Z axis relative to the rotation support mechanism 303 is locked at an arbitrary position. In this manner, the Z-axis rotation mechanism part 76 has the rotation support mechanism 303 that functions as a rotation locking mechanism that causes the support body part 70 to stop rotating in the rotational direction in which the support body part 70 supported indirectly at the Z-axis rotation plate 300 is rotatably supported, that is, in the rotational direction about the Z axis. Note that it is possible to use a "Linear Clamper-Zee (registered trademark)" manufactured by Nabeya Bi-tech Kaisha, for example, as the rotation support mechanism 303.

The bearing 304 is an annular member that has an outer wheel 304b and an inner wheel 304c configured to be relatively rotatable via a plurality of rollers 304a. The bearing 304 supports the lower part of the rotation shaft 302 at the base for Z-axis rotation 301.

The bearing 304 causes the outer wheel 304b to be secured to the base for Z-axis rotation 301 with bolts 307 at a plurality of locations in a state in which the lower part of the rotation shaft 302 is caused to penetrate therethrough and the bearing 304 is fitted into the lower fitting recessed part 301d of the base for Z-axis rotation 301 via an O ring 304d or the like fitted onto the outer circumferential surface. On the other hand, the inner wheel 304c is secured to the flange part 302b of the rotation shaft 302, the lower part of which is caused to penetrate therethrough, with bolts 308 at a plurality of locations. As the bearing 304, a cross roller bearing using cylindrical rollers as the rollers 304a is used, for example.

The Z-axis rotation plate 300 is secured, from the lower side, to the rotation shaft 302 rotatably supported at the base for Z-axis rotation 301. The rotation shaft 302 has a boss part 302c that is a diameter reduced portion relative to the flange part 302b below the flange part 302b, and the boss part 302c includes bolt holes 302d formed at a plurality of locations to be opened in the lower surface thereof. Also, the rotation shaft 302 is secured to the Z-axis rotation plate 300 by a bolt 309 penetrating through a hole part 300b formed at the center part of the Z-axis rotation plate 300 in accordance with the bolt hole 302d being screw-inserted into the bolt hole 302d. Note that the boss part 302c is a portion of the rotation shaft 302 onto which the bearing 304 is fitted. In addition, a diameter reduced part 302g is formed at a lower end part of the rotation shaft 302, and the diameter reduced part 302g is fitted into the hole part 300c formed at the center part of the Z-axis rotation plate 300.

With the configuration as described above, the Z-axis rotation plate 300 is rotatably supported about the Z axis relative to the base for Z-axis rotation 301.

In addition, the Z-axis rotation mechanism part 76 has a Z-axis rotation centering mechanism for centering rotation of the Z-axis rotation plate 300 about the Z axis. The Z-axis rotation centering mechanism includes a configuration similar to that of the aforementioned X-axis rotation centering mechanism, has an air cylinder 321 and a locking pin 322, and locks the rotation shaft 302 at a predetermined position in the rotating direction by causing the locking pin 322 to be engaged with the rotation shaft 302 through an operation of the air cylinder 321.

The air cylinder 321 is a single rod-type cylinder mechanism and has a substantially rectangular parallelepiped cylinder body 323 and a piston rod 324 that reciprocates relative to the cylinder body 323. The air cylinder 321 has a supply/exhaust nozzle 325 that communicates with a supply/exhaust port that faces a side surface of the cylinder body 323 from the inside thereof and receives air supply from an air supply source, which is not illustrated. The air cylinder 321 is configured to cause the piston rod 324 to reciprocate relative to the cylinder body 323 and perform extension/contraction operations through air supply/exhaust to/from the inside of the cylinder body 323 through the supply/exhaust nozzle 325.

The air cylinder 321 is secured behind the body part 301a of the base for Z-axis rotation 301 with the projecting side of the piston rod 324 on the front side. The locking pin 322 is coaxially secured to the piston rod 324 on the distal end side. The locking pin 322 forms a portion with substantially the same diameter as that of the piston rod 324. A hole part 301g through which the piston rod 324 and the locking pin 322 are caused to penetrate is formed behind the body part 301a of the base for Z-axis rotation 301. The hole part 301g is formed at a portion of the inner circumferential protruding part 301c of the base for Z-axis rotation 301 in the Z direction. In other words, the outward side of the hole part 301g is opened in the outer circumferential surface of the body part 301a while the inward side of the hole part 301g is opened in the inner circumferential surface 301f of the inner circumferential protruding part 301c.

A planar part with a planar-shaped outer circumferential surface is formed at a rear part of the body part 301a, and the air cylinder 321 is secured to the planar part of the rear part of the body part 301a with a bolt 326 that penetrates through the cylinder body 323 and is screw-inserted into the body part 301a in a state in which the front surface of the cylinder body 323 is caused to come into contact with the planar part. Also, the piston rod 324 projecting forward from the air cylinder 321 and the locking pin 322 secured to the piston rod 324 are inserted into the hole part 301g. A cylindrical bushing 327 that has substantially the same inner diameter as the outer diameter of the locking pin 322 and causes the locking pin 322 to penetrate therethrough is inserted and fitted into the hole part 301g. With the configuration as described above, the locking pin 322 is configured to appear from the inner circumferential surface 301f of the inner circumferential protruding part 301c via the hole part 301g through an operation of the air cylinder 321.

The locking pin 322 is a shaft-shaped member, has an axial direction in the X direction, and reciprocates in the front-back direction integrally with the piston rod 324 with an operation of the air cylinder 321. The locking pin 322 has a male screw part 322a with a reduced diameter shape at an end part on the proximal end side and is screwed into and secured to a female screw part 324a formed in the piston rod 324 on the distal end side. In addition, the locking pin 322 has a conical tapered part 322b at an end part thereof on the distal end side.

On the other hand, an engagement fitting hole 302e that receives the tapered part 322b of the locking pin 322 is formed at one location in the outer circumferential surface of a rear portion of the flange part 302b of the rotation shaft 302. The engagement fitting hole 302e is a recessed part formed into a conical hole shape to conform to the conical outer shape of the tapered part 322b. In the configuration in which the rotation shaft 302 is secured to the Z-axis rotation plate 300, the engagement fitting hole 302e is provided at a predetermined position such that the locked position of the rotation shaft 302 with the locking pin 322 corresponds to a predetermined center position of the Z-axis rotation plate 300 in regard to the rotation angle of the rotation shaft 302 about the Z axis.

The air cylinder 321 causes the piston rod 324 to be positioned on the front side (projecting side) and causes the locking pin 322 to be engaged with the rotation shaft 302 in the operating state thereof. Here, the locking pin 322 causes the tapered part 322b to be fitted into the engagement fitting hole 302e of the rotation shaft 302 and fixes the rotation of the rotation shaft 302 about the Z axis at a predetermined position. The Z-axis rotation plate 300 is centered about the Z axis by the rotation shaft 302 being secured in this manner. Thus, the material handling device 21 attached to the Z-axis rotation plate 300 via the third subunit 123, the second subunit 122, and the first subunit 121 is centered for the rotation position about the Z axis.

On the other hand, the air cylinder 321 causes the piston rod 324 to be positioned on the rear side (the opposite side of the projecting side) and releases the engagement of the locking pin 322 with the rotation shaft 302 in the non-operating state thereof. In the engagement released state, the sharp end of the tapered part 322b of the locking pin 322 is positioned at a portion on the outward side of the engagement fitting hole 302e (the outer circumferential side of the flange part 302b), and the rotation of the rotation shaft 302 is allowed within a range of a clearance (margin) from a conical inner circumferential surface that forms the engagement fitting hole 302e. In other words, in the engagement released state of the locking pin 322, the locking pin 322 causes the sharp end of the tapered part 322b to be positioned inside the engagement fitting hole 302e (to project inward beyond the position of the outer circumferential surface of the flange part 302b), the rotation of the rotation shaft 302 is allowed, and the rotation range is restricted up to a rotation range in which the sharp end of the tapered part 322b comes into contact with the inner circumferential surface of the engagement fitting hole 302e (interferes with the rotation shaft 302) on both sides of the flange part 302b in the circumferential direction.

Therefore, a state in which the Z-axis rotation plate 300 secured to the rotation shaft 302 is floating-supported about the Z axis with an axial center of the rotation shaft 302 at the center within the rotation range of the rotation shaft 302 rotation of which is restricted by the locking pin 322 is obtained by the air cylinder 321 being brought into the non-operating state.

The third subunit 123 is attached below the Z-axis rotation mechanism part 76 including the configuration as described above. Specifically, as illustrated in FIG. 21, the Z-axis rotation mechanism part 76 is attached to the third subunit 123 by causing the Z-axis rotation plate 300 to be secured to the Y-direction moving plate 203. The third subunit 123 is secured to the Z-axis rotation plate 300 with bolts 328 at four corners of the Y-direction moving plate 203 and the Z-axis rotation plate 300 with the Y-direction moving plate 203 aligned with the lower side of the Z-axis rotation plate 300. Therefore, hole parts 203s and 300s for securing with the bolts 328 are formed at the four corners of the Y-direction moving plate 203 and the Z-axis rotation plate 300.

In this manner, a state in which an integral configuration including the three subunits, namely the third subunit 123, the second subunit 122, and the first subunit 121 that supports the material handling device 21 in front of the support body part 70 is floating-supported about the Z axis relative to the base for Z-axis rotation 301 configuring the Z-axis rotation mechanism part 76 is obtained by the third subunit 123 being attached below the Z-axis rotation mechanism part 76 (see the arrow F6 in FIG. 19).

In addition, the rotation support unit 25 is secured above the Z-axis rotation mechanism part 76. Specifically, the Z-axis rotation mechanism part 76 is secured to the attachment plate 28 with bolts 329 at four corners of the flange part 301b and the attachment plate 28 with the flange part 301b of the base for Z-axis rotation 301 aligned with the lower side of the attachment plate 28 of the rotation support unit 25. Therefore, hole parts 301s and 28s for securing with the bolts 329 are formed at the four corners of the flange part 301b and the attachment plate 28. The attachment plate 28 has substantially the same shape and dimension as those of the flange part 301b. In this manner, the floating unit 20 is attached to the robot arm part 4b via the rotation support unit 25.

[Operations in Door Detaching Process]

An example of a series of operations in a door detaching process performed by the door detaching device 1 according to the present embodiment will be described. The detaching of the door 3 from the vehicle body 2 is performed by the door detaching device 1 being operated to move through operations of the robot 4 based on a predetermined program created through teaching, for example.

In the door detaching process, first, the vehicle body 2 after a painting process is transported to a predetermined door detaching position where the detaching of the door 3 is performed by the vehicle body transport device in a state in which the vehicle body 2 is supported by the transport hangers 5 (see FIG. 1). When the vehicle body 2 is transported, the door 3 is in a closed state. Note that in a case in which the vehicle body transport device is of a floor carrier type, the vehicle body 2 placed on the carrier is transported to the door detaching position.

After the vehicle body 2 is stopped at the door detaching position, the door detaching device 1 is caused to move through an operation of the robot arm part 4b, and the door 3 is opened by the door opening arm 23. Here, the robot arm part 4b causes the door detaching device 1 to approach the outward side (the side of the door outer panel 6) of the door 3 in the closed state and causes the door opening arm 23 to lock the door 3. The door opening arm 23 is brought into a locked state by the locking pad 104 of the locking element 103 of the door locking part 102 coming into pressure contact with the opening part 3e of the door 3 (see FIG. 29). In the state in which the door opening arm 23 is locking the door 3, the door 3 is pulled outward through an operation of the robot arm part 4b, and the door 3 is opened to obtain a predetermined opening degree state (a substantially fully opened state, for example) (see FIG. 2).

After the door 3 is opened, the opened state of the door 3 is kept by the door opened position holding device 18 operating and causing the moving support part 19 to abut on the door 3 from the lower side. Then, the robot arm part 4b causes the door detaching device 1 to be turned to the inward side of the door 3 in the opened state and starts to grip the door 3 with the material handling device 21 supported at the robot arm part 4b via the floating unit 20.

When the material handling device 21 grips the door 3, the support body part 70 that supports the material handling device 21 on the front side is in a state in which shift movement in each axial direction of the X axis, the Y axis, and the Z axis and rotation about each axis of the X axis, the Y axis, and the Z axis are locked in the floating unit 20. In other words, in regard to the movement in each axial direction of the X axis, the Y axis, and the Z axis, the support body part 70 is in a non-movable state in each axial direction due to operations of the shift-lock mechanisms 166, 211, and 231, while, in regard to the rotation about each axis of the X axis, the Y axis, and the Z axis, the support body part 70 is in a non-rotatable state for the rotation about each axis due to the rotation support mechanisms 128 and 303 and the brake units 265 of the cylinder mechanisms for Y-axis rotation 78 (hereinafter, this state is referred to as a "locked state"). Also, when the material handling device 21 grips the door 3, each clamping mechanism part 32 included in the material handling device 21 is in a non-operating state and is in a state in which the clamping arm 44 is caused to stand (opened state).

The robot arm part 4b causes the material handling device 21 to approach the door 3 such that the two engagement pins 31 are inserted into the engagement holes 7a on the side of the door 3 in an orientation with the projecting side of the engagement pins 31 facing the side of the door inner panel 7 of the door 3 as illustrated in FIG. 58(a) when the robot arm 4b grips the door 3 (see the arrow P1). Here, an error may occur in the positional relationship between the engagement pins 31 and the engagement holes 7a due to variations in posture of the door 3 in the opened state through operations of the robot 4 set in advance through teaching or the like. Thus, the support body part 70 supporting the material handling device 21 is brought into a floating-supported state within predetermined movement and rotation ranges in each axial direction of the X axis, the Y axis, and the Z axis and about each axis of the X axis, the Y axis, and the Z axis (hereinafter, referred to as a "floating-supported state") through operations of the floating unit 20, and the error in the positional relationship between the engagement pins 31 and the engagement holes 7a is absorbed. Detailed description will be given below.

As illustrated in FIG. 58(b), when the material handling device 21 approaches the door 3 (see the arrow P2), then the distal ends of the two engagement pins 31 reach the opening ranges of the engagement holes 7a. At the time at which the distal ends of the engagement pins 31 reach the engagement holes 7a in this manner, the locked state of the floating unit 20 is released. Note that the timing at which the locked state is released may be immediately before or immediately after the time at which the distal ends of the engagement pins 31 reach the engagement holes 7a. The floating unit 20 is brought into the floating-supported state, and a state in which the material handling device 21 can freely move within the predetermined ranges in each axis direction of the X axis, the Y axis, and the Z axis and about each axis of the X axis, the Y axis, and the Z axis is obtained, by the locked state being released.

With the floating unit 20 being brought into the floating-supported state, the material handling device 21 subsequently approaches the door 3. In this manner, the tapered parts 31c of the engagement pins 31 act as guide parts as illustrated in FIG. 58(c), and the material handling device 21 moves and rotates in the floating state in accordance with the tapered shapes of the tapered parts 31c in the process of insertion of the engagement pins 31 into the engagement holes 7a. In other words, the material handling device 21 causes the two engagement pins 31 to be inserted in to the engagement holes 7a while three-dimensionally moving and rotating to follow the engagement holes 7a at the two locations in accordance with the positions thereof through the floating support achieved by the floating unit 20 and absorbing the positional deviation of the engagement pins 31 relative to the engagement holes 7a at the two locations (see the arrow P3). Therefore, an error in a predetermined dimension based on the opening range of the engagement holes 7a is allowed for the positional relationship between the engagement pins 31 and the engagement holes 7a.

Also, the material handling device 21 causes the clamping mechanism parts 32 that keep the clamping arm 44 in an opened state to be inserted into the door inside space 3c from the opening parts 7c of the door inner panel 7 with insertion of the engagement pins 31 into the engagement holes 7a (see the arrow P4).

As illustrated in FIG. 58(d), the material handling device 21 is brought into a state in which most parts of the engagement pins 31 are caused to be inserted into the engagement holes 7a in a state in which the pad parts 58 of the receiving parts 55 at the four locations for clamping the door inner panel 7 along with the clamping mechanism parts 32 are caused to come into contact with the outer surface 7d of the door inner panel 7. Thereafter, the material handling device 21 causes the clamping mechanism part 32 to operate to cause the clamping arm 44 to rotate (see the arrow P5 in FIG. 58(d)) and is brought into a state in which the door inner panel 7 is gripped with the clamping mechanism part 32 and the pad parts 58 of the receiving parts 55. In other words, a state in which the pressurizing surfaces 51a of the pressurizing parts 51 of the clamping mechanism parts 32 and the abutting surfaces 58a of the pad parts 58 come into close contact with the inner surface 7b and the outer surface 7d of the door inner panel 7, respectively, is obtained. In this manner, the door 3 is brought into a state in which the door 3 is firmly gripped with the material handling device 21. An insertion completed state (completely fitted state) in which the engagement pins 31 are inserted up to the roots thereof into the engagement holes 7a is obtained by the door 3 being brought into the gripped state with the material handling device 21, and in accordance with this, a state in which the two nut runners 80 are positioned to conform to the hinge bolts 17 of the corresponding hinge parts 13 is obtained.

In the insertion process of the engagement pins 31, the floating unit 20 is brought into the locked state again at a predetermined timing after the tubular parts 31d reach the engagement holes 7a, for example, a time at which the gripping of the door 3 with the material handling device 21 is completed. In this manner, a state in which the material handling device 21 is supported in a state secured to the floating unit 20, that is, the attachment plate 28 of the rotation support unit 25 is obtained.

Also, the door detaching device 1 releases the fastening of the hinge bolts 17 using the nut runner units 22 and detaches the hinge bolts 17 at a predetermined timing after the insertion of the engagement pins 31 is completed, for example, a time at which the gripping of the door 3 with the material handling device 21 is completed. The nut runner units 22 cause the two nut runners 80 to move in a predetermined direction with the cylinder mechanisms for the X, Y, and Z directions, cause each engagement drive part 80a to operate to be engaged with the upper and lower hinge bolts 17 (see the arrow P6 in FIG. 58(d)), and release the fastening of the hinge bolts 17 of the hinge parts 13 at the upper and lower two locations with each nut runner 80. The nut runner units 22 detach the hinge bolts 17 by releasing the fastening of the hinge bolts 17 and then causing the two nut runners 80 to retreat.

Also, the moving support part 19 is lowered in the door opened position holding device 18, and the holding state of the door 3 with the door opened position holding device 18 is released at a predetermined timing after the gripping of the door 3 with the material handling device 21 is completed, for example, at a time immediately after the material handling device 21 clamps the door inner panel 7.

A state in which the door 3 is detachable from the vehicle body 2 is obtained by the hinge bolts 17 being detached. After such a state is obtained, the door 3 in a state in which the door 3 is gripped with the material handling device 21 is detached from the vehicle body 2 through operations of the robot arm part 4b. The detached door 3 is placed on and supported by door hangers 290 (see FIG. 1) installed to correspond to the door 3 at four locations on both outward sides of the transport passage of the vehicle body 2 with the transport hangers 5 through operations of the robot arm part 4b.

The door hangers 290 are configured with predetermined frame members on a platform base 291 installed on the floor surface and is provided at a predetermined height position. The door hangers 290 are provided with a plurality of locking parts 290a for supporting the door 3 in a predetermined posture and at a predetermined position.

Also, when the robot arm part 4b supports the door 3 at the door hangers 290, the posture of the door 3 relative to the robot arm part 4b is brought into a predetermined centered posture through a centering operation of the floating unit 20. Here, the floating unit 20 performs, as a centering operation, centering of the support body part 70 in each axial direction and about each axis with the centering mechanism in each direction of the X direction, the Y direction, and the Z direction and the centering mechanism for the rotation about each axis of the X axis, the Y axis, and the Z axis. Also, the position and the posture of the support body part 70 in a state in which the floating unit 20 has performed the centering operation are the original position when the door 3 is detached. Also, the robot arm part 4b with the door 3 placed and moved using the door hanger 290 is returned to a predetermined standby state before the door 3 is detached.

As described above, a series of operations in the door detaching process are performed. Note that the detachment of the door 3 from the vehicle body 2 may be performed at the same time for the four doors 3 included in the vehicle body 2 or may be successively performed in a predetermined order.

According to the floating unit 20 and the door detaching device 1 in the present embodiment as described above, the material handling device 21 can accurately grip the door 3 regardless of variations in posture of the door 3 when the door 3 of the car is automatically gripped through operations of the robot 4.

As vehicle properties of a car, the posture of the door 3 may three-dimensionally change depending on an opening angle of the door 3, and there are variations in posture of the vehicle body 2 itself on the transport line of the vehicle body 2. Examples of indicators of a change in posture of the door 3 include the amount of movement of the door 3 in the rotating direction (the surface fall-down direction in which the door falls down on the right or left side) in a rear view of the vehicle body as illustrated in FIG. 59(a) (see the arrow Q1) and the amount of movement of the door in the rotating direction (the surface rotating direction) in a side view of the vehicle body as illustrated in FIG. 59(b) (see the arrow Q2) with reference to the state in which the door 3 is attached to the vehicle body.

Figure 59:
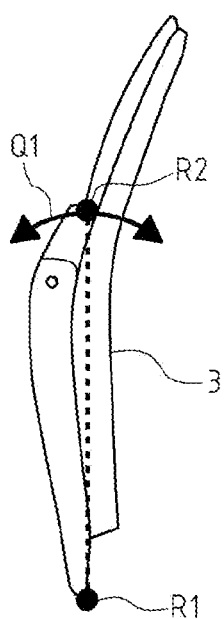
FIG. 59 is an explanatory diagram for a change in posture of a car door due to an opening angle.
Figure 59:
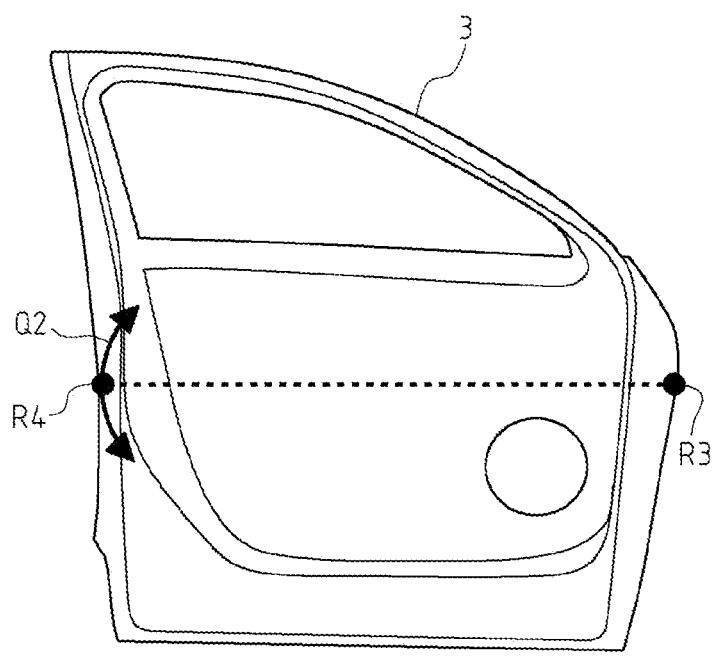

As the amount of change in posture of the door 3, the amount of movement at a predetermined measurement point R2 caused by rotation in the surface fall-down direction (arrow Q1) around a lower end position R1 of the door 3 at the center is measured as illustrated in FIG. 59(a) for surface falling-down of the door 3. Also, for the surface rotation of the door 3, the amount of movement at a predetermined measurement point R4 caused by rotation in the surface rotating direction (arrow Q2) around a front end position R3 of the door 3 at the center is measured as illustrated in FIG. 59(b). Note that the door 3 in each drawing of FIG. 59 is a front door on the left side, where FIG. 59(a) illustrates the door 3 in a rear view, and FIG. 59(b) illustrates the inside of the door 3 in a side view.

Since the posture of the door 3 varies in this manner, there may be a case in which the positions of the engagement holes 7a on the side of the door 3 deviate with respect to the engagement pins 31 of the material handling device 21 caused to move to a predetermined position through operations of the robot 4 when the robot 4 that performs predetermined operations on the basis of the predetermined program created through teaching, for example, grips the door 3 in the configuration in which the robot 4 performs the door opening operation.

Thus, according to the floating unit 20 and the door detaching device 1 according to the present embodiment, it is possible to realize floating support of the support body part 70 that supports the material handling device 21 in each axial direction of the X axis, the Y axis, and the Z axis and in all the directions about each axis of the X axis, the Y axis, and the Z axis with a compact and light-weight configuration. It is thus possible to absorb the positional deviation between the door 3 and the material handling device 21 and to enable smooth gripping of the door 3 with the robot 4 through the floating operation of the floating unit 20 when the door 3 is gripped with the material handling device 21 through operations of the robot 4 for the car door 3 with deviation in the surface fall-down direction (see FIG. 59(*a*)) and deviation in the direction of surface rotation (see FIG. 59(*b*)) depending on the opening angle with respect to the vehicle body 2 as a gripping target.

As a result, it is possible to prevent the engagement pins 31 of the material handling device 21 from interfering with the door 3 and to avoid scratching occurring in the door 3. Also, it is possible to prevent an unintended load from acting on the door 3 without the door 3 being gripped normally with the material handling device 21. In this manner, it is possible to avoid disadvantages that the door 3 interferes with components (a fender and a pillar, for example) in the surroundings thereof with off-loading caused by the fastening of the hinge bolts 17 being released, for example, and there are adverse influences such as scratching on these components.

In this manner, according to the floating unit 20 and the door detaching device 1 according to the present embodiment, it is possible to cause the material handling device 21 to follow the door 3 and to absorb variations in all directions even if the posture of the door 3 three-dimensionally varies. Therefore, it is possible to precisely grip the door 3 with the robot 4 in accordance with a car model or the like without causing scratching in vehicle components such as the door 3 and to obtain high general versatility.

In addition, although there is a technique of gripping a door with a dual-armed robot provided with two arms and detaching the door through cooperative operations of the two arms in the related art, there is a concern that robot teaching becomes complicated and costs increases in regard to such a technique. In this regard, according to the floating unit 20 and the door detaching device 1 according to the present embodiment, it is possible to detach the door 3 with the one robot arm part 4*b*, thereby to simplify the teaching of the robot 4, and to reduce costs.

Also, all the X-direction shift mechanism part 71, the Y-direction shift mechanism part 72, and the Z-direction shift mechanism part 73 configuring the floating unit 29, the X-axis rotation mechanism part 84, the Y-axis rotation mechanism part 75, and the Z-axis rotation mechanism part 76 according to the present embodiment have locking mechanisms in each moving direction or each rotational direction. According to such a configuration, it is possible to bring the support body part 70 into a locked state for the movement in each axial direction of the X axis, the Y axis, and the Z axis and the rotation about each axis of the X axis, the Y axis, and the Z axis and thereby to improve operability for the operations of the material handling device 21 using the robot 4.

Also, all the X-direction shift mechanism part 71, the Y-direction shift mechanism part 72, and the Z-direction shift mechanism part 73 configuring the floating unit 20, the X-axis rotation mechanism part 74, the Y-axis rotation mechanism part 75, and the Z-axis rotation mechanism part 76 according to the present embodiment have centering mechanisms. With such a configuration, it is possible to always keep the relative positions of the robot arm part 4*b* and the door 3 constant by causing the centering mechanisms to operate when the robot 4 moves and places the door 3. It is thus possible to reliably move and place the door 3, when for example, the door hangers 290 is caused to support the door 3 detached through operations of the robot arm part 4*b*.

Also, in the floating unit 20 according to the present embodiment, the Y-axis rotation mechanism part 75 includes a configuration in which the cylinder mechanisms for Y-axis rotation 78 with an extension/contraction direction in a direction inclined with respect to the Z direction are caused to rotate the support body part 70 about the Y axis, for the rotational support of the support body part 80 about the Y axis.

According to such a configuration, it is possible to prevent the material handling device 21 in the floating state from being suspended due to its own weight for the rotational support about the Y axis which the weight of the material handling device 21 itself significantly affects, in the configuration in which the material handling device 21 is supported in front of the support body part 70. In other words, a satisfactory floating-supported state with no slanting of the rotational support about the Y axis in the gravity direction is obtained through operation control (specifically, air pressure control) of the cylinder mechanisms for Y-axis rotation 78, and it is possible to prevent the material handling device 21 from being suspended.

It is thus possible to prevent the weight of the material handling device 21 and the like themselves from serving as a load and acting on the door 3 via the engagement pins 31 inserted into the engagement hole 7*a*, that is, it is possible to prevent the state in which the material handling device 21 and the like impart their own weight on the door 3 via the engagement pins 31, in regard to the gripping of the door 3 with the material handling device 21. Therefore, it is possible to obtain a satisfactory positional relationship between the material handling device 21 with the engagement pins 31 inserted into the engagement holes 7*a* and the door 3, thereby to prevent deformation and scratching of the engagement holes 7*a*, and to realize a smooth detaching operation of the door 3. Also, it is possible to reduce the influence of the weight of the material handling device 21 and the like themselves and thereby to smoothly and reliably perform the operation of switching between the locked state and the floating-supported state of the floating unit 20 and the centering operation.

Also, the door detaching device 1 according to the present embodiment includes a configuration in which the nut runner units 22 are attached to the support body part 70 of the floating unit 20. According to such a configuration, it is possible to perform an operation of moving the nut runner units 22 for detaching the hinge bolts 17 with a single robot 4 that performs an operation of moving the material handling device 21 via the floating unit 20. Since there is thus no need to separately provide a robot or the like for performing an operation of moving the nut runner units 22, it is possible to realize a simple configuration.

Also, according to the configuration in which the nut runner units 22 are attached to the support body part 70 of the floating unit 20, it is possible to easily position the engagement drive parts 80a of the nut runners 80 relative to the heads of the hinge bolts 17 regardless of variations in posture of the door 3. In other words, since the support body part 70 in the floating-supported state serves as a common support part for the material handling device 21 and the nut runner units 22, it is possible to floating-support the nut runner units 22 along with the material handling device 21. In this manner, since the relative positions of the engagement pins 31 and the nut runners 80 are easily defined, it is possible to automatically position the nut runners 80 relative to each hinge bolt 17 and to easily position the hinge bolts 17 and sockets by the insertion of the engagement pins 31 into the engagement holes 7a being completed and by the material handling device 21 being brought into the state in which the door 3 is clamped.

Also, in the case of the door detaching technique using the dual-armed robot as described above, for example, in regard to the positioning of the nut runners 80 relative to the hinge bolts 17, there is a concern that positional deviation between the hinge bolts and the sockets of the nut runners is likely to occur and fitting of the sockets into the hinge bolts is likely to fail only through operations of the robot based on teaching. Thus, although core matching between the hinge bolts and the sockets using a sensor such as an optical sensor is conceivable, an increase in number of devices and machines including the sensor and the like leads to a complicated device configuration, which is unfavorable in terms of costs.

On the other hand, according to the floating unit 20 and the door detaching device 1 in the present embodiment, it is possible to automatically position the nut runners 80 relative to the hinge bolts 17 as described above, thereby to precisely position the sockets of the nut runners 80 relative to the hinge bolts 17 with the robot 4 in accordance with a car model or the like, and to obtain high general versatility.

Also, the door detaching device 1 according to the present embodiment includes the door opening arm 23 that moves along with the floating unit 20 through operations of the robot 4. With such a configuration, it is possible to automatically open the door 3 through operations of the robot 4 that performs an operation of moving the material handling device 21 when the door 3 is detached. In this manner, since there is no need to separately provide a robot or the like to open the door 3, it is possible to realize a simple configuration. Also, since there is no need for an operator to open the door 3, it is possible to reduce a burden on the operator.

The above description of the embodiment is one example of the present invention, and the present invention is not limited to the aforementioned embodiment. Therefore, it is a matter of course that various modifications can be made in accordance with design and the like without departing from the technical idea according to the present disclosure even if the modifications are not included in the aforementioned embodiment. Also, the effects described in the present disclosure are just illustrative effects and are not limited thereto, and there may be other effects.

Although the material handling device 21 supported by the floating unit 20 grips the car door 3 as a component to be gripped in the aforementioned embodiment, the component to be gripped by the component gripping device according to the present invention is not particularly limited. The support device for a component gripping device according to the present invention can be widely applied as a configuration for supporting a component gripping device for automating an operation of detaching, attaching, and the like of a component using a robot.

REFERENCE SIGNS LIST

1 Door detaching device (vehicle door detaching device)
2 Vehicle body
3 Door (component)
6 Door outer panel
7 Door inner panel
7a Engagement hole
20 Floating unit (support device for component gripping device)
21 Material handling device (component gripping device)
22 Nut runner unit (fastening release unit)
23 Door opening arm (door opening device)
31 Engagement pin (engagement part)
32 Clamping mechanism part (gripping part)
70 Support body part
71 X-direction shift mechanism part (first shift mechanism part)
72 Y-direction shift mechanism part (second shift mechanism part)
73 Z-direction shift mechanism part (third shift mechanism part)
74 X-axis rotation mechanism part (first rotation mechanism part)
75 Y-axis rotation mechanism part (second rotation mechanism part)
76 Z-axis rotation mechanism part (third rotation mechanism part)
78 Cylinder mechanism for Y-axis rotation
80 Nut runner (fastening release device)
81 Base support plate
96 Projecting piece part for attachment
102 Door locking part
128 Rotation support mechanism
166 Shift-lock mechanism
211 Shift-lock mechanism
231 Shift-lock mechanism
265 Brake unit
303 Rotation support mechanism

The invention claimed is:

1. A support device for a component gripping device that is for supporting a component gripping device including an engagement part to be engaged with a predetermined component, the component gripping device gripping the component in a state in which the engagement part is caused to be engaged with the component, the support device for a component gripping device comprising:
   a support body part that supports the component gripping device;
   a first shift mechanism part that supports the support body part such that the support body part is movable in a first direction;
   a second shift mechanism part that supports the support body part such that the support body part is movable in a second direction that perpendicularly intersects the first direction;
   a third shift mechanism part that supports the support body part such that the support body part is movable in a third direction that perpendicularly intersects the first direction and the second direction;
   a first rotation mechanism part that supports the support body part such that the support body part is rotatable with a center axis direction in the first direction;
   a second rotation mechanism part that supports the support body part such that the support body part is rotatable with a center axis direction in the second direction; and a third rotation mechanism part that supports the support body part such that the support body part is rotatable with a center axis direction in the third direction.

2. The support device for a component gripping device according to claim 1,
wherein each of the first shift mechanism part, the second shift mechanism part, and the third shift mechanism part includes a shift-lock mechanism that causes the support body part to stop moving in a direction in which each of the first shift mechanism part, the second shift mechanism part, and the third shift mechanism part movably supports the support body part, and
each of the first rotation mechanism part, the second rotation mechanism part, and the third rotation mechanism part includes a rotation locking mechanism that causes the support body part to stop rotating in a rotational direction in which each of the first rotation mechanism part, the second rotation mechanism part, and the third rotation mechanism part rotatably supports the support body part.

3. The support device for a component gripping device according to claim 1,
wherein the third direction is an up-down direction, and the second rotation mechanism part includes a cylinder mechanism provided to have an extension/contraction direction which is an inclined direction inclined relative to the third direction, and the support body part rotatably supported by a predetermined rotational shaft along the second direction is floating-supported for rotation about the rotational shaft through an extension/contraction operation of the cylinder mechanism.

4. The support device for a component gripping device according to claim 2,
wherein the third direction is an up-down direction, and the second rotation mechanism part includes a cylinder mechanism provided to have an extension/contraction direction which is an inclined direction inclined relative to the third direction, and the support body part rotatably supported by a predetermined rotational shaft along the second direction is floating-supported for rotation about the rotational shaft through an extension/contraction operation of the cylinder mechanism.

5. A vehicle door detaching device that is for detaching a door attached to a vehicle body, the vehicle door detaching device comprising:
a component gripping device including an engagement part to be engaged with the door and a gripping part that is for gripping the door, the component gripping device gripping the door with the gripping part in a state in which the engagement part is caused to be engaged with the door; and
a support device for a component gripping device that is for supporting the component gripping device,
wherein the support device for a component gripping device includes
a support body part that supports the component gripping device,
a first shift mechanism part that supports the support body part such that the support body part is movable in a first direction,
a second shift mechanism part that supports the support body part such that the support body part is movable in a second direction that perpendicularly intersects the first direction,
a third shift mechanism part that supports the support body part such that the support body part is movable in a third direction that perpendicularly intersects the first direction and the second direction,
a first rotation mechanism part that supports the support body part such that the support body part is rotatable with a center axis direction in the first direction,
a second rotation mechanism part that supports the support body part such that the support body part is rotatable with a center axis direction in the second direction, and
a third rotation mechanism part that supports the support body part such that the support body part is rotatable with a center axis direction in the third direction.

6. The vehicle door detaching device according to claim 5, further comprising:
a fastening release unit that includes
an attachment base that is to be attached to the support device for a component gripping device, and
a fastening release device that is movably supported at the attachment base, is engaged with a fastening component for supporting the door at the vehicle body, and releases fastening of the fastening component.

7. The vehicle door detaching device according to claim 5, further comprising:
a door opening device that includes a locking part for the door and opens the door by moving along with the support device for a component gripping device in a state in which the locking part is caused to be locked at a predetermined portion of the door.

8. The vehicle door detaching device according to claim 6, further comprising:
a door opening device that includes a locking part for the door and opens the door by moving along with the support device for a component gripping device in a state in which the locking part is caused to be locked at a predetermined portion of the door.

* * * * *